US00RE38679E

(19) United States
(12) Reissued Patent
Matsuo et al.

(10) Patent Number: US RE38,679 E
(45) **Date of Reissued Patent: *Dec. 28, 2004**

(54) DATA PROCESSOR AND METHOD OF PROCESSING DATA

(75) Inventors: Masahito Matsuo, Tokyo (JP); Toyohiko Yoshida, Toyko (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 09/848,253

(22) Filed: May 4, 2001

Related U.S. Patent Documents

Reissue of:
(64) Patent No.: 5,901,301
Issued: May 4, 1999
Appl. No.: 08/699,944
Filed: Aug. 20, 1996

(30) Foreign Application Priority Data

Feb. 7, 1996 (JP) ..... 8-021453

(51) Int. Cl.[7] ..... G06F 9/30

(52) U.S. Cl. ..... 712/212; 710/7; 712/24; 712/1

(58) Field of Search ..... 712/212, 24, 225, 712/221, 215, 1; 710/7, 21, 22; 711/100

(56) References Cited

U.S. PATENT DOCUMENTS

| | | | | | |
|---|---|---|---|---|---|
| 4,819,152 | A | * | 4/1989 | Deerfield | 711/217 |
| 5,134,711 | A | * | 7/1992 | Asthana | 712/17 |
| 5,201,039 | A | * | 4/1993 | Sakamura | 711/201 |
| 5,299,321 | A | * | 3/1994 | Iizuka | 712/212 |
| 5,481,734 | A | * | 1/1996 | Yoshida | 712/225 |
| 5,485,629 | A | * | 1/1996 | Dulong | 712/24 |
| 5,530,817 | A | * | 6/1996 | Masabuchi | 712/24 |
| 5,630,083 | A | * | 5/1997 | Carbine | 712/212 |
| 5,664,136 | A | * | 9/1997 | Witt | 712/208 |
| 5,761,470 | A | | 6/1998 | Yoshida | 712/210 |
| 5,812,810 | A | * | 9/1998 | Sager | 712/216 |
| 5,881,312 | A | * | 3/1999 | Dulong | 710/7 |

FOREIGN PATENT DOCUMENTS

| | | | |
|---|---|---|---|
| EP | 427245 A | * | 5/1991 |
| JP | 53-44130 | * | 4/1978 |
| JP | 57-113144 | * | 7/1982 |
| JP | 60-134938 | * | 7/1985 |
| JP | 60-138640 | * | 7/1985 |
| JP | 7 176 380 | | 7/1995 |

OTHER PUBLICATIONS

Lewis C. Eggebrecht, SAMS, pp. 59 to 62 and 67 to 68, Interfacing to the IBM Personal Computer, 1990.*

Kouhei Nadahara, Ichiro Kuroda, Masayuji Daito, Takahashi Nakayama, NEC Corporation Low–Power Multimedia RISC 8207 IEEE Micro, 15(1995) Dec., No. 6 Los Alamito, CA US pp. 20–29.*

Erdem Hokenek, member IEEE, Robert K. Motoye, member IEEE, and Peter W. Cook, member IEEE Second–Generation RISC Floating Point with Multiply–Add Fused 8107 IEEE Journal of Solid–State Circuits, 25(1990)Oct., No. 5, New York, US pp. 1207–1212.*

(List continued on next page.)

*Primary Examiner*—Eric Coleman
(74) *Attorney, Agent, or Firm*—Oblon, Spivak, McClelland, Maier & Neustadt, P.C.

(57) ABSTRACT

A second decoder (114) of an instruction decode unit (119) decodes an operation code for a multiply-add operation, and a second operation unit (117) receives two data stored in a register file (115) to perform the multiply-add operation. In parallel with the operations of the second decoder (114) and the second operation unit (117), a first decoder (113) of the instruction decode unit (119) decodes an operation code for 2 data load, and an operand access unit (104) causes two data (e.g., n bits each) stored in an internal data memory (105) to be transferred in parallel in the form of combined 2n-bit data to a first operation unit (116). Then, two predetermined registers of the register file (115) store the respective n-bit data from the first operation unit (116).

48 Claims, 44 Drawing Sheets

OTHER PUBLICATIONS

Atsuchi Inoue and Kenji Takeda, Toshiba Corporation R&D of Superscalar Processors 8345 Computer Architecture News 21(1993) Mar., No. 1, New York US pp. 4–11.*

Brad Burgess et al., Digest of Papers, COMPCON 94, pp. 300–306, 1994, The Power PC™ 603 Microprocessor: A High Performance, Low Power, Superscalar RISC Microprocessor.

M68HC16 Family, CPU16, Central Processor Unit, Reference Manual, pp. 3–1–3–7, 6–178–6–181, 6–286–6–287, 11–8–11–11, 1993, Motorola Inc.

DSP 56000 Digital Signal Processor Family Manual, pp. 2–2–5–9; MAC, X:Y, REP instructions; 1992 Motorola, Inc.

Power PC™ 603, RISC Microprocessor User's Manual, pp. 1–1, 11–175, 1994 IBM Microelectronics and Motorola, Inc.

M. Nakajima, etal , Semiconductor Research Ctr, Matsushita elec. Ind. Co., Ltd. OHMEGA: A VLSI Superscalar Processor Architecture for Numerical Applications 8345 Computer News $18^{th}$ Ann. Int. Symp. Comp.. Arch. 19(1991)May No. 3, NY U.S. pp. 160–168.*

* cited by examiner

FIG. 15

```
; initialize
    ldi   r12,#h'2400   ; start address of data
    ldi   r14,#h'2000   ; start address of coef

    ld2w  r0,@r12+
    ld2w  r6,@r14+                                  501
    ld2w  r2,@r12+     ||    nop
    ld2w  r8,@r14+     ||    clra    a0

    repi #42,loopend

    ld2w  r4,@r12+     ||    mac     a0,r0,r6
    ld2w  r10,@r14+    ||    mac     a0,r1,r7
    ld2w  r0,@r12+     ||    mac     a0,r2,r8
    ld2w  r6,@r14+     ||    mac     a0,r3,r9      502
    ld2w  r2,@r12+     ||    mac     a0,r4,r10
loopend:
    ld2w  r8,@r14+     ||    mac     a0,r5,r11

    mac   a0,r0,r6
    mac   a0,r1,r7
    mac   a0,r2,r8                                  503
    mac   a0,r3,r9
    rachi r0,a0,#1
```

FIG. 17

| INSTRUCTION ADDRESS | | FM (0 1) | (a) (2 16) | (b) (17 31) | |
|---|---|---|---|---|---|
| I1: | h'1000 | 00 | ld2w r4, @r12+ | mac a0, r0, r6 | 511 |
| I2: | h'1001 | 00 | ld2w r10, @r14+ | mac a0, r1, r7 | 512 |
| I3: | h'1002 | 00 | ld2w r0, @r12+ | mac a0, r2, r8 | 513 |
| I4: | h'1003 | 00 | ld2w r6, @r14+ | mac a0, r3, r9 | 514 |
| I5: | h'1004 | 00 | ld2w r2, @r12+ | mac a0, r4, r10 | 515 |
| I6: | h'1005 | 00 | ld2w r8, @r14+ | mac a0, r5, r11 | 516 |

FIG. 21

```
    ldi   r12, #h'2400   ; start address of data
    ldi   r14, #h'2000   ; start address of coef

    ld2w  r6, @r14+    ||   mv      r13, r12
    ld2w  r4, @r12+
    ld2w  r10, @r14+
    mulx  a0, r0, r6                                  606
    mv    r1, r4
    ld2w  r6, @r14+    ||   mac     a0, r4, r10
    ld2w  r8, @r14+    ||   mac     a0, r5, r11
    ld2w  r10, @r14+   ||   mv2w    r2, r4
    ld2w  r4, @r12-    ||   rachi   r0, a0, #1

    repi #n, loopend

    st2w  r0, @r12+    ||   mulx    a0, r0, r6
    add   r12, #4      ||   mac     a0, r2, r8
    mv    r1, r4       ||   mac     a0, r3, r9
    ld2w  r6, @r14+    ||   mac     a0, r4, r10          607
    ld2w  r8, @r14+    ||   mac     a0, r5, r11
    ld2w  r10, @r14+   ||   mv2w    r2, r4
loopend:
    ld2w  r4, @r12-    ||   rachi   r0, a0, #1

    st2w  r0, @r12+    ||   mulx    a0, r0, r6
    add   r12, #4      ||   mac     a0, r2, r8
    mv    r1, r4       ||   mac     a0, r3, r9
    ld2w  r6, @r14+    ||   mac     a0, r4, r10          608
    ld2w  r8, @r14     ||   mac     a0, r5, r11
    rachi r0, a0, #1
    st2w  r0, @r12     ||   mulx    a0, r0, r6
    mac   a0, r4, r8
    mac   a0, r5, r9
    rachi r0, a0, #1
```

FIG. 22

| INSTRUCTION ADDRESS | | FM (0–1) | (a) (2–16) | (b) (17–31) | |
|---|---|---|---|---|---|
| I1: | h'1000 | 00 | st2w r0, @r12+ | mulx a0, r0, r6 | 611 |
| I2: | h'1001 | 00 | add r12, #4 | mac a0, r2, r8 | 612 |
| I3: | h'1002 | 00 | mv r1, r4 | mac a0, r3, r9 | 613 |
| I4: | h'1003 | 00 | ld2w r6, @r14+ | mac a0, r4, r10 | 614 |
| I5: | h'1004 | 00 | ld2w r8, @r14+ | mac a0, r5, r11 | 615 |
| I6: | h'1005 | 00 | ld2w r10, @r14+ | mv2w r2, r4 | 616 |
| I7: | h'1006 | 00 | ld2w r4, @r12- | rachi r0, a0, #1 | 617 |

FIG. 25

```
                A                          B
I1:   sub    r3, r7      ||   mulx    a0, r4, r10
I2:   add    r8, r6      ||   mulx    a1, r4, r11
I3:   add    r9, r7      ||   msu     a0, r5, r11
I4:   st2w   @r12+, r2   ||   mac     a1, r5, r10
I5:   st2w   @r14+, r8   ||   mv2w    r8, r2
I6:   ld2w   r4, @r14    ||   rachi   r6, a0, #1
I7:   ld2w   r2, @r12    ||   rachi   r7, a1, #1
I8:   sub    r0, r6      ||   sub     r1, r7
I9:   add    r8, r6      ||   mulx    a0, r4, r10
I10:  add    r9, r7      ||   mulx    a1, r4, r11
I11:  st2w   @r12+, r0   ||   msu     a0, r5, r11
I12:  st2w   @r14+, r8   ||   mac     a1, r5, r10
I13:  ld2w   r4, @r14    ||   mv2w    r8, r2
I14:  ld2w   r0, @r12    ||   rachi   r6, a0, #1
I15:  sub    r2, r6      ||   rachi   r7, a1, #1
```

FIG. 26

```
                A                          B
I1:  sub    r1, r5       ||   sub     r0, r4
I2:  ld2w   r4, @r14+    ||   absadd  a0, r0
I3:  ld2w   r0, @r12+    ||   absadd  a0, r1
I4:  sub    r3, r7       ||   sub     r2, r6
I5:  ld2w   r6, @r14+    ||   absadd  a0, r2
I6:  ld2w   r2, @r12+    ||   absadd  a0, r3
```

FIG.29

```
; initialize
    ldi   R12,#h'2000
    ldi   R14,#h'2400

; pre-processing of loop
    ld2w  r0,@r12+                                  701
    ld2w  r4,@R14+
    ld2w  r2,@r12+      ||    nop
    ld2w  r6,@R14+      ||    clra    a0

; loop
    repi  #n,repend
    sub   r0,r4         ||    sub     r1,r5
    ld2w  r4,@R14+      ||    mac     a0,r0,r0
    ld2w  r0,@r12+      ||    mac     a0,r1,r1      702
    sub   r2,r6         ||    sub     r3,r7
    ld2w  r6,@R14+      ||    mac     a0,r2,r2
repend:
    ld2w  r2,@r12+      ||    mac     a0,r3,r3

; post-processing of loop
    sub   r0,r4         ||    sub     r1,r5
    sub   r2,r6         ||    mac     a0,r0,r0
    sub   r3,r7         ||    mac     a0,r1,r1      703
    mac   a0,r2,r2
    mac   a0,r3,r3
    rachi r0,a0,#1
```

FIG. 30

| INSTRUCTION | ADDRESS | FM (0 1) | (A) (2 16) | (B) (17 31) | |
|---|---|---|---|---|---|
| I1: | h'1000 | 00 | sub r0, r4 | sub r1, r5 | 704 |
| I2: | h'1001 | 00 | ld2w r4, @R14+ | mac a0, r0, r0 | 705 |
| I3: | h'1002 | 00 | ld2w r0, @r12+ | mac a0, r1, r1 | 706 |
| I4: | h'1003 | 00 | sub r2, r6 | sub r3, r7 | 707 |
| I5: | h'1004 | 00 | ld2w r6, @R14+ | mac a0, r2, r2 | 708 |
| I6: | h'1005 | 00 | ld2w r2, @r12+ | mac a0, r3, r3 | 709 |

FIG. 33

| INSTRUCTION ADDRESS | FM (0 1) | (A) (2 16) | (B) (17 31) | |
|---|---|---|---|---|
| I1: h'1000 | 00 | ld2w r4, @r12+ | daadd a0, r0, r6 | 761 |
| I2: h'1001 | 00 | ld2w r10, @R14+ | daadd a0, r1, r7 | 762 |
| I3: h'1002 | 00 | ld2w r0, @r12+ | daadd a0, r2, r8 | 763 |
| I4: h'1003 | 00 | ld2w r6, @R14+ | daadd a0, r3, r9 | 764 |
| I5: h'1004 | 00 | ld2w r2, @r12+ | daadd a0, r4, r10 | 765 |
| I6: h'1005 | 00 | ld2w r8, @R14+ | daadd a0, r5, r11 | 766 |

FIG. 38
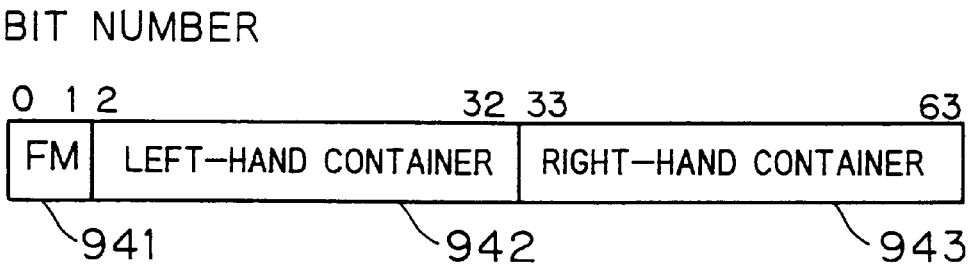
FIG. 39
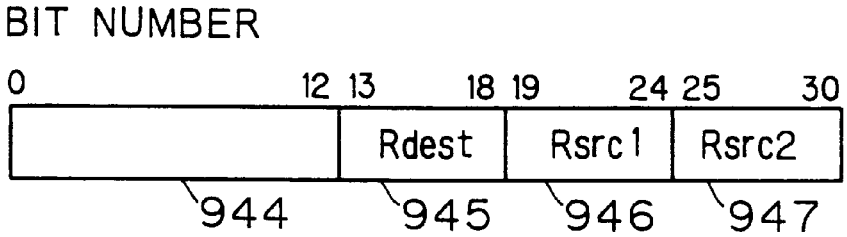
FIG. 40
```
ld2w   r4,@r14+   ||   mac   r12,r0,r6
ld2w   r10,@r15+  ||   mac   r12,r1,r7
ld2w   r0,@r14+   ||   mac   r12,r2,r8
ld2w   r6,@r15+   ||   mac   r12,r3,r9
ld2w   r2,@r14+   ||   mac   r12,r4,r10
ld2w   r8,@r15+   ||   mac   r12,r5,r11
```

DATA PROCESSOR AND METHOD OF PROCESSING DATA

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a data processor for high-speed digital signal processing and a method of processing data for high-speed digital signal processing.

2. Description of the Background Art

Digital signal processors (DSPs) having an architecture suitable for signal processing have been used as data processors designed specifically for high-speed digital signal processing. These DSPs execute processing frequently used in signal processing such as a multiply-add operation at high speeds. An example of a DSP is Motorola DSP56000. The DSP56000 includes two address pointers, two data memories, and a multiply-add operation unit. Parallel loading of data (e.g., the load of coefficients and data) from two 1-word memories specified respectively by the address pointers, updating of the two address pointers, and the execution of the combined multiply-add operation allows the multiply-add operation to be executed with a high throughput (See DSP56000 Digital Signal Processor Family Manual, 1992). In this manner, the DSP normally has two memories. Data are distributed to either of the memories. Some DSPs use a 2-port RAM for efficient data transfer.

An example of microprocessors incorporating the DSP function includes Motorola CPU16. The CPU16 may repeatedly perform the multiply-add operation and 2-word load in response to one RMAC instruction. However, the CPU16 wherein one multiply-add operation requires 12 cycles is difficult to achieve the performance competing with the DSPs (CPU16 Reference Manual, 1993).

In recent years, some microprocessors have been intended for implementing signal processing by means of software as the operating frequency improves. To improve the arithmetic performance, some of the microprocessors additionally provide the multiply-add operation instructions and make the most of sophisticated parallel processing techniques such as superpipeline and superscalar to achieve DSP-level performance. For example, PowerPC603 (Motorola and IBM) may execute a single-precision floating-point multiply-add operation with one clock cycle throughput by using 3-stage pipeline processing. This requires the amount of hardware and significantly complicated control. To perform one multiply-add operation for each clock cycle, one clock cycle requires 2-word data. The PowerPC603 may load a maximum of one word for each clock cycle, resulting in an insufficient supply of operands (Proceedings of COMPCON 1994: "The PowerPC603 Microprocessor: A High Performance, Low Power, Superscalar RISC Microprocessor", PowerPC603 RISC Microprocessor User's Manual, 1994).

The DSPs which must include two memories have a complicated memory construction and require very cumbersome data management for distribution of data between the two memories. The use of a 2-port RAM adds to the area and costs of the data processor. Additionally, the DSP is in general an accumulator machine and is difficult to execute complicated data processing.

The microprocessors which require one memory have a relatively simple memory construction. However, the microprocessors are not efficient in signal processing unlike the DSPs wherein hardware directly represents the flow of signal processing. To achieve the DSP-level performance, the state-of-the art microprocessors require an increased amount of hardware, adding to the costs of the data processor. Further, the microprocessors are difficult to reduce power consumption because of the need for operation at high frequencies.

SUMMARY OF THE INVENTION

According to a first aspect of the present invention, a data processor comprises: a first memory portion for storing an instruction including a first operation code and a second operation code; a second memory portion for storing data; an instruction decode unit for receiving the instruction stored in the first memory portion, the instruction decode unit including first and second decoders for decoding the first and second operation codes in parallel, respectively; a register file portion including a plurality of registers for storing data to transfer data from and to the second memory portion; an operation unit for receiving first data stored in a first register of the register file portion to perform an arithmetic operation using the first data in response to a control signal, the control signal being the first operation code decoded by the first decoder of the instruction decode unit; and an operand access unit operated in parallel with the operation unit for causing second and third data stored in the second memory portion to be transferred in parallel and stored in second and third registers of the register file portion, respectively, in response to a control signal, the control signal being the second operation code decoded by the second decoder of the instruction decode unit.

Preferably, according to a second aspect of the present invention, the second and third data each are n bit (n is a natural number) in length, and the second and third data are combined together into 2n-bit data when the second and third data are transferred to the register file portion.

According to a third aspect of the present invention, a data processor comprises: a first memory portion for storing an instruction including a first operation code and a second operation code; a second memory portion for storing data; an instruction decode unit for receiving the instruction stored in the first memory portion, the instruction decode unit including first and second decoders for decoding the first and second operation codes in parallel, respectively; a register file portion including a plurality of registers for storing data to transfer data from and to the second memory portion; an operation unit for receiving first data stored in a first register of the register file portion to perform an arithmetic operation using the first data in response to a control signal, the control signal being the first operation code decoded by the first decoder of the instruction decode unit; and an operand access unit operated in parallel with the operation unit for causing second and third data stored respectively in second and third registers of the register file portion to be transferred in parallel and stored in the second memory portion in response to a control signal, the control signal being the second operation code decoded by the second decoder of the instruction decode unit.

Preferably, according to a fourth aspect of the present invention, the second and third data each are n bit (n is a natural number) in length, and the second and third data are combined together into 2n-bit data when the second and third data are transferred to the second memory.

Preferably, according to a fifth aspect of the present invention, the operation unit includes a multiplier for multiplying together the first data and fourth data stored in a fourth register of the register file portion, and an adder for adding at least two data together, the adder adding together the result of multiplication of the multiplier and data stored in a register of the register file portion to cause a register of the register file portion to store the result of addition.

Preferably, according to a sixth aspect of the present invention, the operation unit includes a multiplier for multiplying together the first data and fourth data stored in a fourth register of the register file portion, and an adder for adding at least two data together, the adder adding together the result of multiplication of the multiplier and data stored in a register of the register file portion to cause a register of the register file portion to store the result of addition.

Preferably, according to a seventh aspect of the present invention, the operation unit includes a multiplier for multiplying together the first data and fourth data stored in a fourth register of the register file portion, an adder for adding at least two data together, and an accumulator for holding a result of an operation, the adder adding together the result of multiplication of the multiplier and the data held in the accumulator to cause the accumulator to hold the result of addition.

Preferably, according to an eighth aspect of the present invention, the operation unit includes a multiplier for multiplying together the first data and fourth data stored in a fourth register of the register file portion, an adder for adding at least two data together, and an accumulator for holding a result of an operation, the adder adding together the result of multiplication of the multiplier and the data held in the accumulator to cause the accumulator to hold the result of addition.

According to a ninth aspect of the present invention, a data processor comprises: a memory portion for storing data; an instruction decode unit for receiving a first instruction including first and second operation codes and a second instruction including third and fourth operation codes and to be processed after the first instruction to decode the first and second operation codes and the third and fourth operation codes in parallel; a register file portion connected to the memory portion and including a plurality of registers each for storing data or an operand address; an operation unit for performing an arithmetic operation of the data stored in the register file portion; and a memory access portion operated in parallel with the operation unit for causing the operand address stored in the register file portion to be applied to the memory portion and for updating the operand address, wherein, in a first processing, the instruction decode unit receives the first instruction, and executed is parallel processing of (a) the operation unit to receive first data stored in a first register of the register file portion to perform an arithmetic operation in response to a control signal which is outputted from the instruction decode unit decoding the first operation code, and (b) the memory access portion to cause a first operand address stored in a second register of the register file portion to be applied to the memory portion to cause second data stored in the memory portion to be transferred to a third register of the register file portion in response to a control signal which is outputted from the instruction decoded unit decoding the second operation code and to update the first operand address to write a second operand address into the second register in response to the control signal, and wherein, in a second processing, the instruction decode unit receives the second instruction, and executed is parallel processing of (c) the operation unit to receive the second data stored in the third register of the register file portion to perform an arithmetic operation in response to a control signal which is outputted from the instruction decode unit decoding the third operation code, and (d) the memory access portion to cause the second operand address stored in the second register of the register file portion to be applied to the memory portion to cause third data stored in the memory portion to be transferred to a fourth register of the register file portion in response to a control signal which is outputted from the instruction decode unit decoding the fourth operation code and to update the second operand address to write a third operand address into the second register in response to the control signal, the first processing and the second processing being executed by pipeline control.

A tenth aspect of the present invention is intended for a method of processing data by a data processor which includes a memory portion for storing data, a register file portion connected to the memory portion and including a plurality of registers each for storing data or an operand address, an operation unit for receiving the data stored in the register file portion to perform an arithmetic operation, and a memory access portion for causing the operand address stored in the register file portion to be applied to the memory portion. According to the present invention, the method comprises the steps of: (a) transferring first and second data stored in a first area of the memory portion in parallel to write the first and second data into first and second registers of the register file portion, respectively; (b) transferring third and fourth data stored in a second area of the memory portion in parallel to write the third and fourth data into third and fourth registers of the register file portion, respectively; (c) applying the first data stored in the first register and the third data stored in the third register to the operation unit to perform an arithmetic operation of the first and third data by the operation unit; and (d) applying the second data stored in the second register and the fourth data stored in the fourth register to the operation unit to perform an arithmetic operation of the second and fourth data by the operation unit.

Preferably, according to an eleventh aspect of the present invention, the method further comprises the steps of: (e) transferring fifth and sixth data stored in a third area of the memory portion in parallel to write the firth and sixth data into fifth and sixth registers of the register file portion, respectively; and (f) transferring seventh and eighth data stored in a fourth area of the memory portion in parallel to write the seventh and eighth data into seventh and eighth registers of the register file portion, respectively, wherein one of the steps (c) and (d) is executed in parallel with at least one of the steps (e) and (f).

Preferably, according to a twelfth aspect of the present invention, the third area is the same as the first area, and the fourth area is the same as the second area.

Preferably, according to a thirteenth aspect of the present invention, the first and second data each are n bits (n is a natural number) in length, and the first and second data are combined together into 2n-bit data when the first and second data are transferred to the register file portion.

Preferably, according to a fourteenth aspect of the present invention, the step (c) comprises the steps of: multiplying the first and third data together; and adding data stored in a ninth register to the result of multiplication to store the result of addition as ninth data in the ninth register, and the step (d) comprises the steps of: multiplying the first and fourth data together; and adding the ninth data stored in the ninth register to the result of multiplication to store the result of addition in the ninth register.

In accordance with the first aspect of the present invention, the data processor comprises the instruction decode unit including the first and second decoders, the register file, the operation unit, and the operand access unit. The first and second operation codes are decoded and executed in parallel, and the arithmetic operation and the access of two data to the memory are executed in parallel, achieving high-speed data processing. In particular, a DSP-level signal processing performance of a microprocessor is implemented.

The simple construction may reduce the costs of the data processor.

The parallel processing of the multiply-add operation instruction and the access of two data to the memory allows one multiply-add operation to be performed per clock cycle.

In accordance with the data processor of the ninth aspect of the present invention, a plurality of instructions including the operation code for specifying the application of a memory operand to the register file while updating an address by using the register contents as the address, and the operation code for specifying the execution of the arithmetic operation with reference to the register value are processed by means of pipeline processing technique. This permits the arithmetic operations to be executed without operand interference by means of software, improving the processing performance.

In accordance with the tenth aspect of the present invention, the method of processing data comprises loading the first and second data in parallel from the memory to the register, loading the third and fourth data in parallel from the memory to the register, performing the arithmetic operation of the first and third data, and performing the arithmetic operation of the second and fourth data. The access to the memory and the arithmetic operation are executed efficiently by using one memory, improving the performance of the data processor. In particular, digital signal processing performance is greatly improved under simple control.

It is therefore an object of the present invention to provide an inexpensive high-performance microprocessor-type data processor which readily reduces power consumption under relatively simple control.

It is another object of the present invention to provide a data processor having DSP-level digital signal processing performance.

It is still another object of the present invention to provide a method of processing data which may achieve high-performance data processing control.

These and other objects, features, aspects and advantages of the present invention will become more apparent from the following detailed description of the present invention when taken in conjunction with the accompanying drawings.

BRIEF DESCRIPTION OF THE DRAWINGS

[FIG. 1 illustrates a set]

FIG. 15 illustrates a program of a 256 tap FIR filter for the data processor according to the first preferred embodiment of the present invention;

FIG. 17 illustrates the contents of an internal instruction memory corresponding to a loop part of the program of the FIR filter for the data processor according to the first preferred embodiment of the present invention;

FIG. 21 illustrates a program of the IIR filter for the data processor according to the first preferred embodiment of the present invention;

FIG. 22 illustrates the contents of the internal instruction memory corresponding to a loop part of the program of the IIR filter for the data processor according to the first preferred embodiment of the present invention;

FIG. 25 illustrates a loop part of a program of an IFFT for the data processor according to the first preferred embodiment of the present invention;

FIG. 26 illustrates a loop part of a program of a subtract-absolute-add operation for the data processor according to the first preferred embodiment of the present invention;

FIG. 29 illustrates a program of a subtract-square-add operation for the data processor according to the second preferred embodiment of the present invention;

FIG. 30 illustrates the contents of the internal instruction memory corresponding to a loop part of the program of the subtract-square-add operation for the data processor according to the second preferred embodiment of the present invention;

FIG. 33 illustrates the contents of the internal instruction memory corresponding to the loop part of the program of the subtract-absolute-add operation for the data processor according to the second preferred embodiment of the present invention;

FIG. 38 illustrates an instruction format for the data processor according to the fourth preferred embodiment of the present invention;

FIG. 39 illustrates a basic format of containers of an instruction for the data processor according to the fourth preferred embodiment of the present invention; and FIG. 40 illustrates a loop part of the program of the FIR filter for the data processor according to the fourth preferred embodiment of the present invention.

DESCRIPTION OF THE PREFERRED EMBODIMENTS

First Preferred Embodiment

A data processor according to a first preferred embodiment of the present invention will be described below. The data processor of the first preferred embodiment is a 16-bit processor whose addresses and data are 16 bits in length.

FIG. 1 illustrates a set of registers for the data processor of this preferred embodiment. The data processor employs big endian bit and byte ordering wherein the most significant bit is the bit 0.

Sixteen general-purpose registers R0 to R15 are provided for storing data and address values therein. The general-purpose registers R0 to R14 are designated by the numerals 1 to 15 in FIG. 1, respectively. The general-purpose register R13 (designated at 14 in FIG. 1) is allocated as a link (LINK) register for storing a return address for a subroutine jump. The general-purpose register R15 is a register for a stack pointer (SP) including an interruption stack pointer (SPI) 16 and a user stack pointer (SPU) 17. A processor status word (PSW) to be described later switches between the interruption stack pointer (SPI) 16 and the user stack pointer (SPU) 17. The SPI 16 and the SPU 17 are generically referred to as an SP hereinafter. The number of each of the registers is specified in a 4-bit register specification field unless otherwise specified. The data processor of this preferred embodiment includes an instruction for processing a pair of registers, e.g. R0 and R1. In this case, the pair of registers are specified in such a manner that an even-numbered register is specified thereby to indirectly specify the corresponding register having the odd number which equals the even number plus one.

Figure 1A:
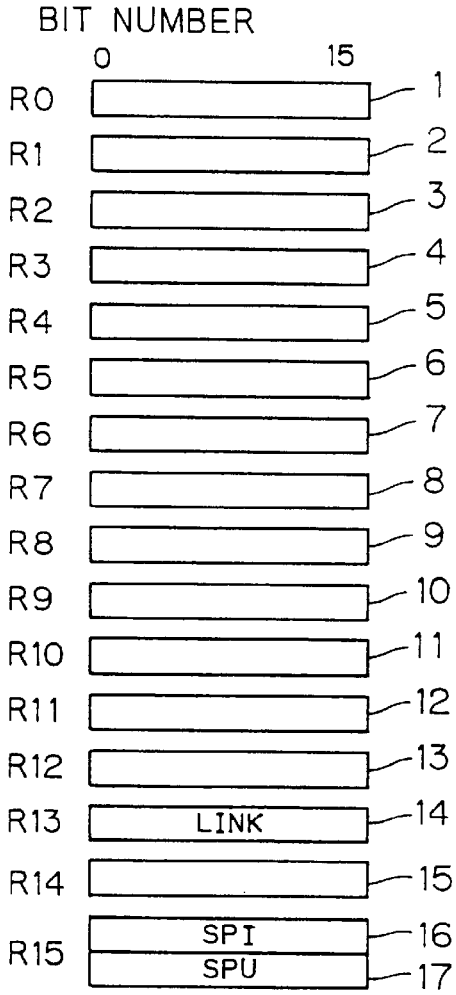
*FIGS. 1A through 1D illustrate sets* of registers for a data processor according to a first preferred embodiment of the present invention.
Figure 1B:
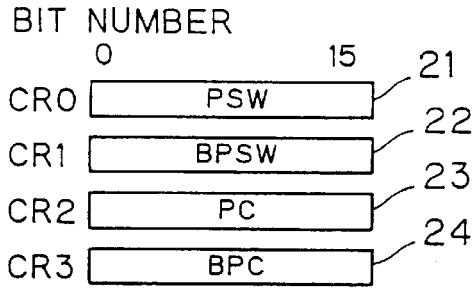
Figure 1C:
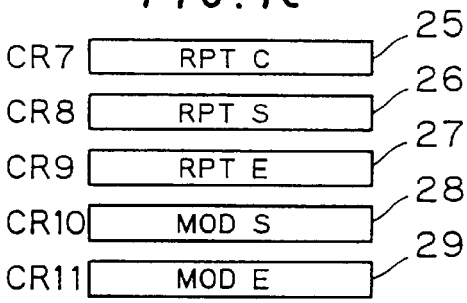
Figure 1D:
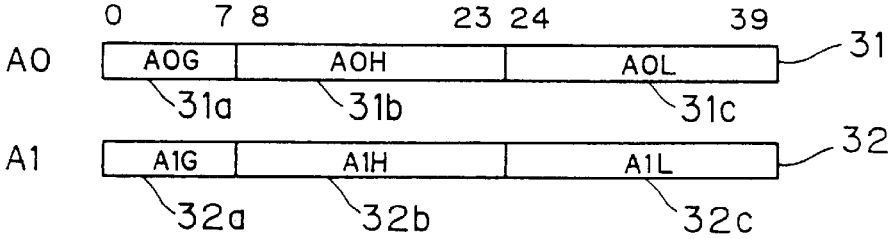
Figure 2:
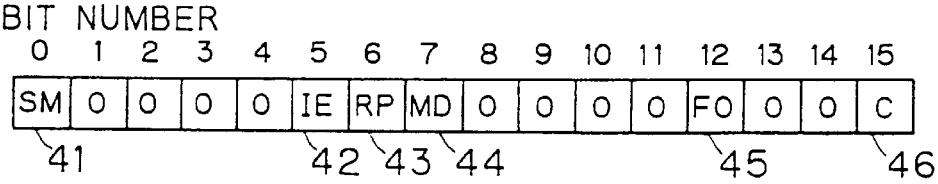
FIG. 2 illustrates a processor status word for the data processor according to the first preferred embodiment of the present invention.

The reference numerals 21 to 29 designate 16-bit control registers. The number of each of the control registers is represented by 4 bits, similar to those of the general-purpose registers. The control register CR0 designated at 21 is a register for the processor status word (PSW) including a bit for specifying the operating mode of the data processor and a flag indicative of the result of operations. FIG. 2 illustrates the construction of the PSW 21. The reference numeral 41 designates an SM bit (bit 0) indicative of a stack mode for specifying the corresponding relationship when the general-purpose register R15 is specified as above described. The SM bit 41 indicates an interruption mode when it is "0". Then, the SPI is used as the general-purpose register RIS. The SM bit 41 indicates a user mode when it is "1". Then, the SPU is used as the general purpose-register R15. The reference numeral 42 designates an IE bit (bit 5) for specifying an interruption enable state. When the IE bit is "0", the interruption is masked (ignored if asserted). When the IE bit is "1", the interruption is accepted. A repeat function for achieving zero-overhead loop processing is implemented in the data processor of this preferred embodiment. The reference numeral 43 designates an RP bit (bit 6) indicative of a repeat state. The RP bit indicates no repeat being executed when it is "0". The RP bit indicates a repeat being executed when it is "1". A modulo addressing function which is addressing for accessing a circular buffer is implemented in the data processor of this preferred embodiment. The reference numeral 44 designates an MD bit (bit 7) for specifying a modulo enable state. When the MD bit is "0", the modulo addressing is disabled. When the MD bit is "1", the modulo addressing is enabled. The reference numeral 45 designates an execution control flag (bit 12) to which the result of a comparison instruction or the like is set. The reference numeral 46 designates a carry flag (bit 15) to which a carry is set when addition and subtraction instructions are executed.

The control register CR2 designated at 23 in FIG. 1 is a register for a program counter (PC) indicative of the instruction address being executed. The length of the instruction processed by the data processor of this preferred embodiment is basically fixed at 32 bits. The program counter 23 holds a word address wherein 32 bits make up one word.

The control register CR1 designated at 22 in FIG. 1 is a register for a backup processor status word (BPSW), and the control register CR3 designated at 24 in FIG. 1 is a register for a backup program counter (BPC). The control registers CR1 and CR3 are registers for saving and holding the values of the PSW 21 and PC 23 being executed if an exception or an interruption is detected, respectively.

The control registers 25 to 27 are repeat-associated registers which allow a user to read and write the values thereof so that an interruption is accepted during a repeat. The control register CR7 designated at 25 in FIG. 1 is a register for a repeat counter (RPT_C) for holding the count value indicative of the subsequent repeat count. The control register CR8 designated at 26 in FIG. 1 is a register for a repeat start address (RPT_S) for holding the first instruction address in the block to be repeated. The control register CR9 designated at 27 in FIG. 1 is a register for a repeat end address (RPT_E) for holding the last instruction address in the block to be repeated.

The control registers 28 and 29 are provided to execute modulo addressing. The control register CR10 designated at 28 in FIG. 1 holds a modulo start address (MOD_S), and the control register CR11 designated at 29 in FIG. 1 holds a modulo end address (MOD_E). Both of the control registers CR10 and CR11 hold the first and last word (16 bits) addresses. When the modulo addressing is used during an increment, the lower address is set to the MOD_S 28, and the higher address is set to the MOD_E 29. If the initial value held in the register to be incremented coincides with the address held in the MOD_E 29, the value held in the MOD_S 28 is written back to the register as an incremented result.

The reference numerals 31 and 32 designate 40-bit accumulators A0 and A1 for holding the result of a multiply-add operation in an integer format. The accumulators A0 and A1 designated at 31 and 32 in FIG. 1 comprise areas A0H (31b) and A1H (32b) for holding the high-order 16 bits of the result of the multiply-add operation, areas A0L (31c) and A1L (32c) for holding the low-order 16 bits of the result of the multiply-add operation, and 8 guard bit areas A0G (31a) and A1G (32a) for holding bits overflown out of the high order bit of the result of the multiply-add operation, respectively.

Figure 3:
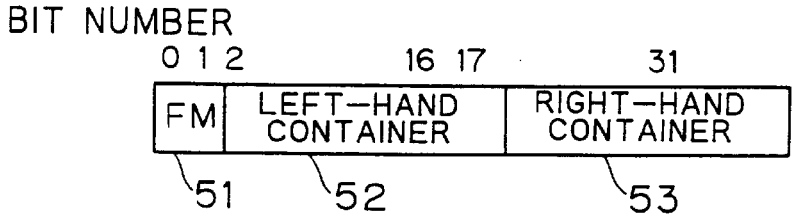
FIG. 3 illustrates an instruction format for the data processor according to the first preferred embodiment of the present invention.

The data processor of the first preferred embodiment processes a 2-way VLIW (very long instruction word) instruction set. FIG. 3 illustrates an instruction format for the data processor of the first preferred embodiment. The length of the instruction is basically fixed at 32 bits, and the instruction is aligned in 4-byte (32-bit) boundary. Each 32-bit instruction code comprises 2 format specification bits (FM bits) 51 indicative of the format of the instruction, a 15-bit left-hand container 52, and a 15-bit right-hand container 53. Each of the containers 52 and 53 may store therein a 15-bit short-format sub-instruction. Further, the containers 52 and 53 together may store therein a 30-bit long-format sub-instruction. For purposes of simplification, the short-format sub-instruction and long-format sub-instruction are referred to hereinafter as a short instruction and a long instruction, respectively.

The FM bits 51 may specify the format of the instruction and the order of two short instructions to be executed. If the FM bits 51 are "11", the FM bits 51 indicate that the containers 52 and 53 hold the long instruction. If they are not "11", the FM bits 51 indicate that each of the containers 52 and 53 holds the short instruction. If the indication is that two short instructions are held, the FM bits 51 specify the order of execution. If the FM bits 51 are "00", the FM bits 51 indicate that two short instructions are executed in parallel. If they are "01", the FM bits 51 indicate that the short instruction held in the right-hand container 53 is executed after the short instruction held in the left-hand container 52 is executed. If they are "10", the FM bits 51 indicate that the short instruction held in the left-hand container 52 is executed after the short instruction held in the right-hand container 53 is executed. In this manner, the first preferred embodiment allows encoding into one 32-bit instruction including two short instructions to be executed sequentially, improving encoding efficiency.

Figure 4:
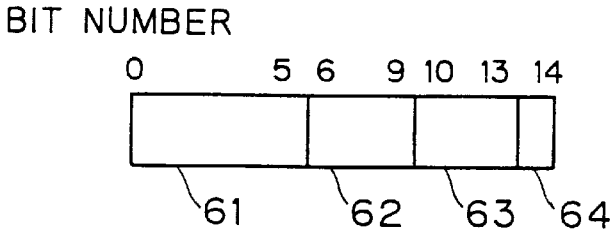
FIG. 4 illustrates a short format of a 2-operand instruction for the data processor according to the first preferred embodiment of the present invention.
Figure 5:
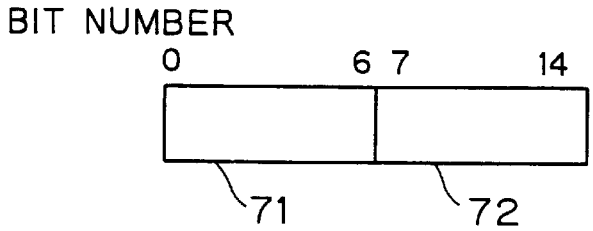
FIG. 5 illustrates a short format of a branch instruction for the data processor according to the first preferred embodiment of the present invention.
Figure 6:
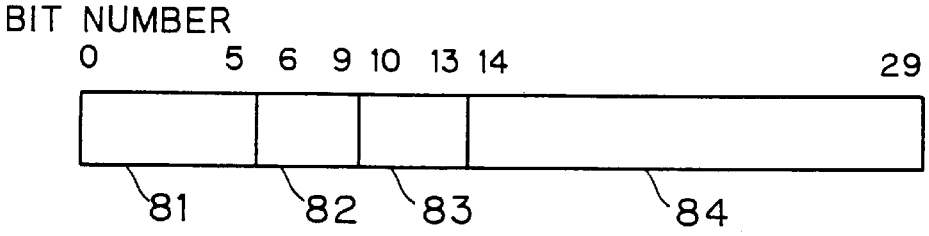
FIG. 6 illustrates a long format of a 3-operand instruction or a load/store instruction for the data processor according to the first preferred embodiment of the present invention.
Figure 7:
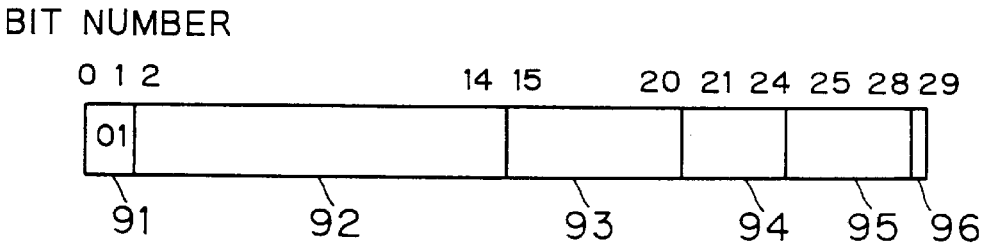
FIG. 7 illustrates a format of an instruction having an operation code in its left-hand container for the data processor according to the first preferred embodiment of the present invention.

FIGS. 4 to 7 illustrate typical instruction encodings. FIG. 4 shows the instruction encoding of a short instruction having two operands. Fields 61 and 64 are operation code fields. The field 64 specifies an accumulator number in some cases. Fields 62 and 63 specify the positions to hold the operand value by using a register number or an accumulator number. The field 63 specifies a 4-bit short immediate value in some cases. FIG. 5 shows the instruction encoding of a short-format branch instruction including an operation code field 71 and an 8-bit branch displacement field 72. The branch displacement is specified by a word (32 bits) offset, like the PC value. FIG. 6 shows a format of a 3-operand instruction having a 16-bit displacement or immediate value or a load/store instruction which includes an operation code field 81, fields 82 and 83 for specifying a register number like the short format, and an extended data field 84 for specifying the 16-bit displacement or immediate value. FIG. 7 shows a format of an instruction having an operation code in its right-hand container 53 wherein a 2-bit field 91 indicates "01". The reference numerals 93 and 96 designate operation code fields, and 94 and 95 designate fields for specifying a register number or the like. The reference numeral 92 designates reserved bits used for the operation code or register number as required.

Further, there are provided some operations having special instruction encodings, for example, an instruction wherein all 15 bits constitute an operation code such as a NOP (no operation) instruction, and a one-operand instruction.

Sub-instructions for the data processor of this preferred embodiment are a RISC-like instruction set. Only the load/store instruction accesses the memory data, and the operation instruction performs an arithmetic operation on an operand in the register/accumulator or using an immediate operand. There are five operand data addressing modes: a register indirect mode, a register indirect mode with post-increment, a register indirect mode with post-decrement, a push mode, and a register relative indirect mode whose mnemonics are "@Rsrc", "@Rsrc+", "@Rsrc−", "@-SP", "@(disp16, Rsrc)", respectively, when Rsrc is a register number for specifying a base address, and disp16 is the 16-bit displacement value. The address of the operand is specified by a byte address.

All of the modes except the register relative indirect mode have the instruction format shown in FIG. 4. The field 63 specifies a base register number, and the field 62 specifies the number of a register into which a value loaded from the memory is written or the number of a register for holding the value to be stored. In the register indirect mode, the value of the register specified as the base register serves as the operand address. In the register indirect mode with post-decrement, the value of the register specified as the base register serves as the operand address, and the value in the base register is post-incremented by the size (the number of bytes) of the operand and written back. In the register indirect mode with post-decrement, the value of the register specified as the base register serves as the operand address, and the value in the base register is post-decremented by the size (the number of bytes) of the operand and written back. The push mode is usable only when the store instruction is provided and the base register is the register R15. In the push mode, the stack pointer (SP) value pre-decremented by the size (the number of bytes) of the operand serves as the operand address, and the decremented value is written back to the SP.

The register relative indirect mode has the instruction format shown in FIG. 6. The field 83 specifies a base register number, and the field 82 specifies the number of a register into which the value loaded from the memory is written or the number of a register for holding the value to be stored. The field 84 specifies a displacement value for the position at which the operand is stored from the base address. In the register relative indirect mode, the 16-bit displacement value added to the value in the register specified as the base register serves as the operand address.

The post-increment type register indirect mode and the post-decrement type register indirect mode may use a modulo addressing mode by setting the MD bit 44 in the PSW 21 to "1".

Jump target addressing of a jump instruction includes register indirect addressing for specifying the jump target address by using a register value, and PC relative indirect addressing for specifying the jump target address by using a branch displacement of the jump instruction from the PC. PC relative indirect addressing includes short format addressing for specifying the branch displacement when using 8 bits, and long format addressing for specifying the branch displacement when using 16 bits. Further, the data processor has a repeat instruction which achieves loop processing without overhead.

Figure 8:
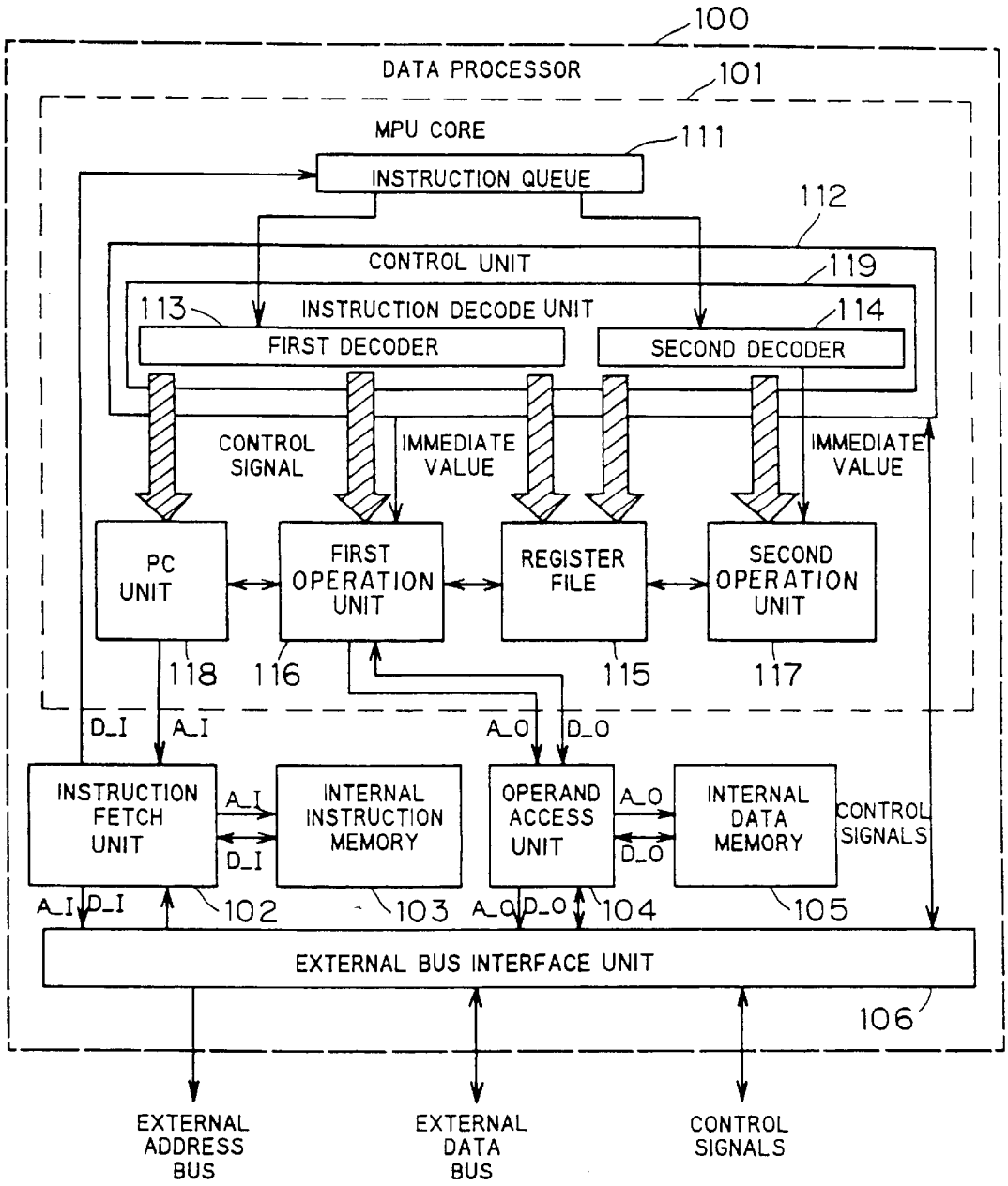
FIG. 8 is a functional block diagram of the data processor according to the first preferred embodiment of the present invention.

FIG. 8 is a functional block diagram of a data processor 100 according to the first preferred embodiment of the present invention. The data processor 100 comprises an MPU core 101, an instruction fetch unit 102 for accessing instruction data in response to a request from the MPU core 101, an internal instruction memory 103, an operand access unit 104 for accessing operand data in response to a request from the MPU core 101, an internal data memory 105, and an external bus interface unit 106 for arbitrating external memory requests from the instruction fetch unit 102 and operand access unit 104, where the external memory requests access a memory external to the data processor 100.

The MPU core 101 includes an instruction queue 111, a control unit 112, a register file 115, a first operation unit 116, a second operation unit 117, and a PC unit 118.

The instruction queue 111 holds 2 entries of 32-bit instruction codes and a valid bit, and is controlled in a FIFO (first-in first-out) order. The instruction queue 111 temporarily holds instruction data fetched by the instruction fetch unit 102 to transmit the instruction data to the control unit 112.

The control unit 112 performs all control of the MPU core 101, for example, control of the instruction queue 111, pipeline control, execution of instructions, and interface with the instruction fetch unit 102 and operand access unit 104. The control unit 112 includes an instruction decode unit 119 for decoding an instruction code transmitted from the instruction queue 111. The instruction decode unit 119 includes two decoders, that is, first and second decoders 113 and 114. The first decoder 113 decodes the instruction to be executed in the first operation unit 116, and the second decoder 114 decodes the instruction to be executed in the second operation unit 117. In a first cycle of decoding of a 32-bit instruction, the first decoder 113 analyzes an instruction code in the left-hand container 52, and the second decoder 114 analyzes an instruction code in the right-hand container 53. The data in the FM bits 51, and the bit 0 and bit 1 of the left-hand container 52 are analyzed by both of the first and second decoder 113 and 114. The data in right-hand container 53 is sent to the first decoder 113 to extract the extended data but is not analyzed. Thus, the instruction to be executed first must be located in a position corresponding to a operation unit for executing the instruction. If two short instructions are executed in sequential order, the instruction to be executed later is transmitted to both of the first and second decoders 113 and 114, and an executable decode result becomes valid. If an instruction is executable by both of the first and second decoders 113 and 114, only the decoded result in the first decoder 113 is validated, and the decoded result in the second decoder 114 is invalidated.

The register file 115 includes the registers 1 to 17 and is connected to the first operation unit 116, second operation unit 117, and PC unit 118 by a plurality of buses.

Figure 9:
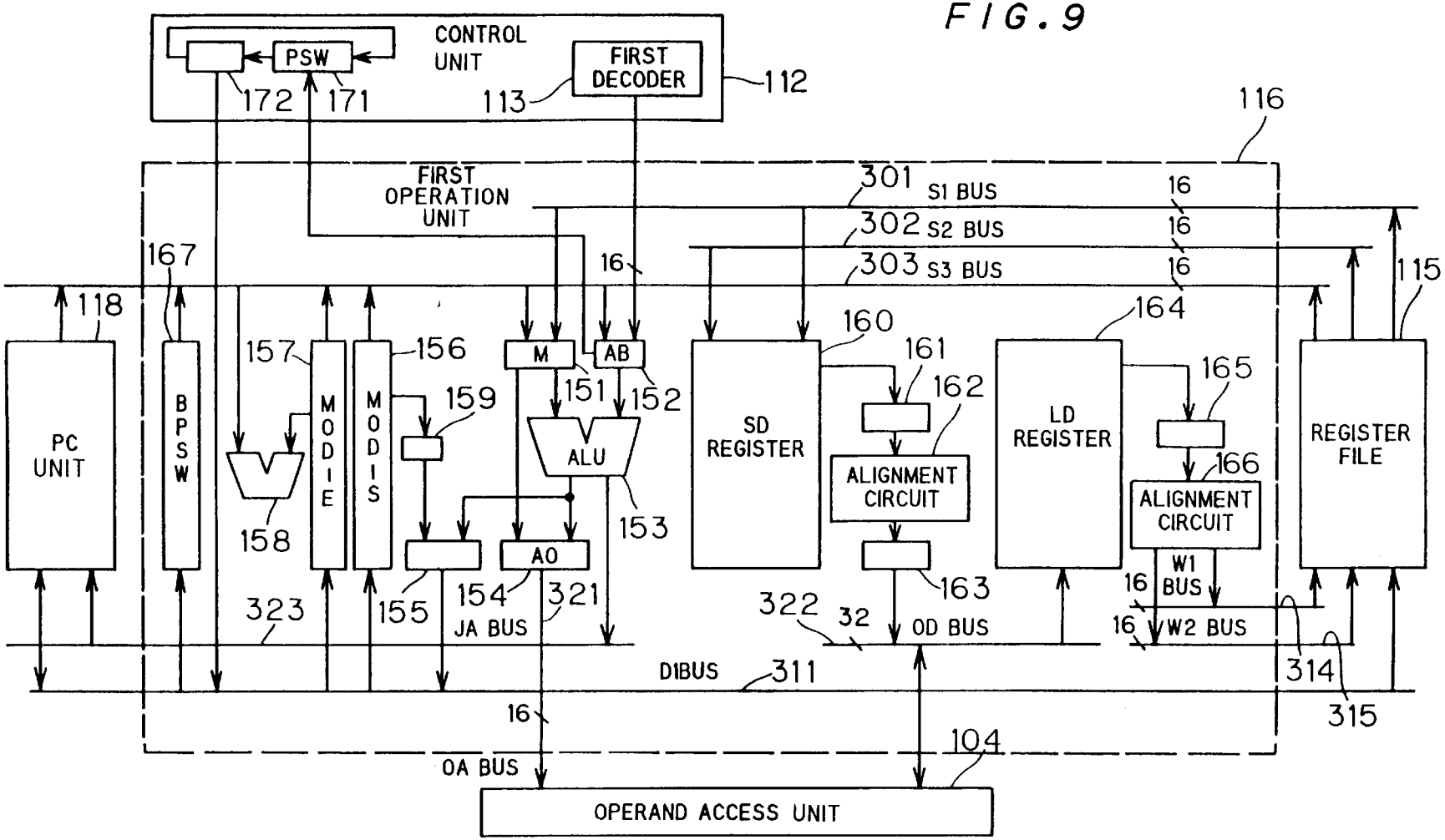
FIG. 9 is a detailed block diagram of a first operation unit for the data processor according to the first preferred embodiment of the present invention.

FIG. 9 is a detailed block diagram of the first operation unit 116. The first operation unit 116 is connected to the register file 115 by an S1 bus 301, an S2 bus 302, and an S3 bus 303 to read data from the registers through the three buses 301, 302 and 303. The S2 bus 302 is connected to only odd-numbered registers, and the S1 bus 301 and S2 bus 302 together may transmit 2-word data from the pair of registers in parallel. The first operation unit 116 is also connected to the register file 115 through a D1 bus 311, a W1 bus 314, and a W2 bus 315 to write data into the registers through the three buses 311, 314 and 315. The W1 bus 314 is connected to only the even-numbered registers, and the W2 bus 315 is connected to only the odd-numbered registers. The W1 bus 314 and W2 bus 315 together may transmit 2-word data to the pair of registers in parallel.

An AA latch 151 and an AB latch 152 are input latches for an ALU 153. The AA latch 151 receives a register value read through the S1 bus 301 or S3 bus 303 and has a zero clear function. The AB latch 152 receives a register value read through the S3 bus 303 or a 16-bit immediate value generated by decoding in the first decoder 113, and has a zero clear function. The ALU 153 mainly performs transfer, comparison, arithmetic and logic operations, calculation/transfer of operand addresses, increment/decrement of the base address values of the operand addresses, and calculation/transfer of the jump target addresses. The results of operations and address modifications are written back to the register specified by the instruction in the register file 115 through a selector 155 and the D1 bus 311. An AO latch 154 is a latch for holding operand addresses, and selectively holds and outputs the result of address calculation in the ALU 153 or the base address value held in the AA latch 151 to the operand access unit 104 through an OA bus 321. For calculation or transfer of the jump target address, the output from the ALU 153 is transferred to the PC unit 118 through a JA bus 323.

An MOD_S 156 and an MOD_E 157 are control registers corresponding to the control registers CR10 (28) and CR11 (29) of FIG. 1, respectively. A comparator 158 compares the value in the MOD_E 157 with the base address value on the S3 bus 303. With the modulo addressing enabled in the register indirect mode with post-increment/decrement, the value in the MOD_S 156 which is held in the latch 159 is written back to the base address register in the register file 115 through the selector 155 and the D1 bus 311.

A store data (SD) register 160 includes two 16-bit registers and temporarily holds store data outputted to the S1 bus 301 or to both of the S1 bus 301 and S2 bus 302. Data held in the SD register 160 is transferred to an alignment circuit 162 through a latch 161. The alignment circuit 162 aligns the data into 32-bit form in accordance with the operand address to output the data to the operand access unit 104 through a latch 163 and an OD bus 322.

The data loaded by the operand access unit 104 is applied to a load data (LD) register 164 including two 16-bit registers through the OD bus 322. The value in the LD register 164 is transferred to an alignment circuit 166 through a latch 165. The alignment circuit 166 aligns the data to output data to be transferred to the even-numbered registers to the W1 bus 314 and data to be transferred to the odd-numbered registers to the W2 bus 315. When 1-word data are loaded, load data are outputted to one of the W1 bus 314 and the W2 bus 315. When 2-word data are loaded, the load data are outputted to both of the W1 bus 314 and the W2 bus 315. The outputted data are written into the specified register in the register file 115.

A PSW 171 in the control unit 112 is a register for holding the value in the control register CR0 (21) of FIG. 1. A PSW updating unit 172, including a latch, updates the value in the PSW 171 in response to the result of an operation or by the execution of an instruction. To transfer a value to the PSW 171, only assigned bits are transferred from the AB latch 152 to the control unit 112. To read a value from the PSW 171, the value is outputted from the PSW updating unit 172 to the D1 bus 311 and is written to the register file 115. A BPSW 167 is a register corresponding to the control register CR1 (22) of FIG. 1. During exception processing, the value in the PSW 21 outputted to the D1 bus 311 is written to the BPSW 167. The value in the BPSW 167 is read to the S3 bus 303 and transferred to the PSW 171 or the register file 115.

Figure 10:
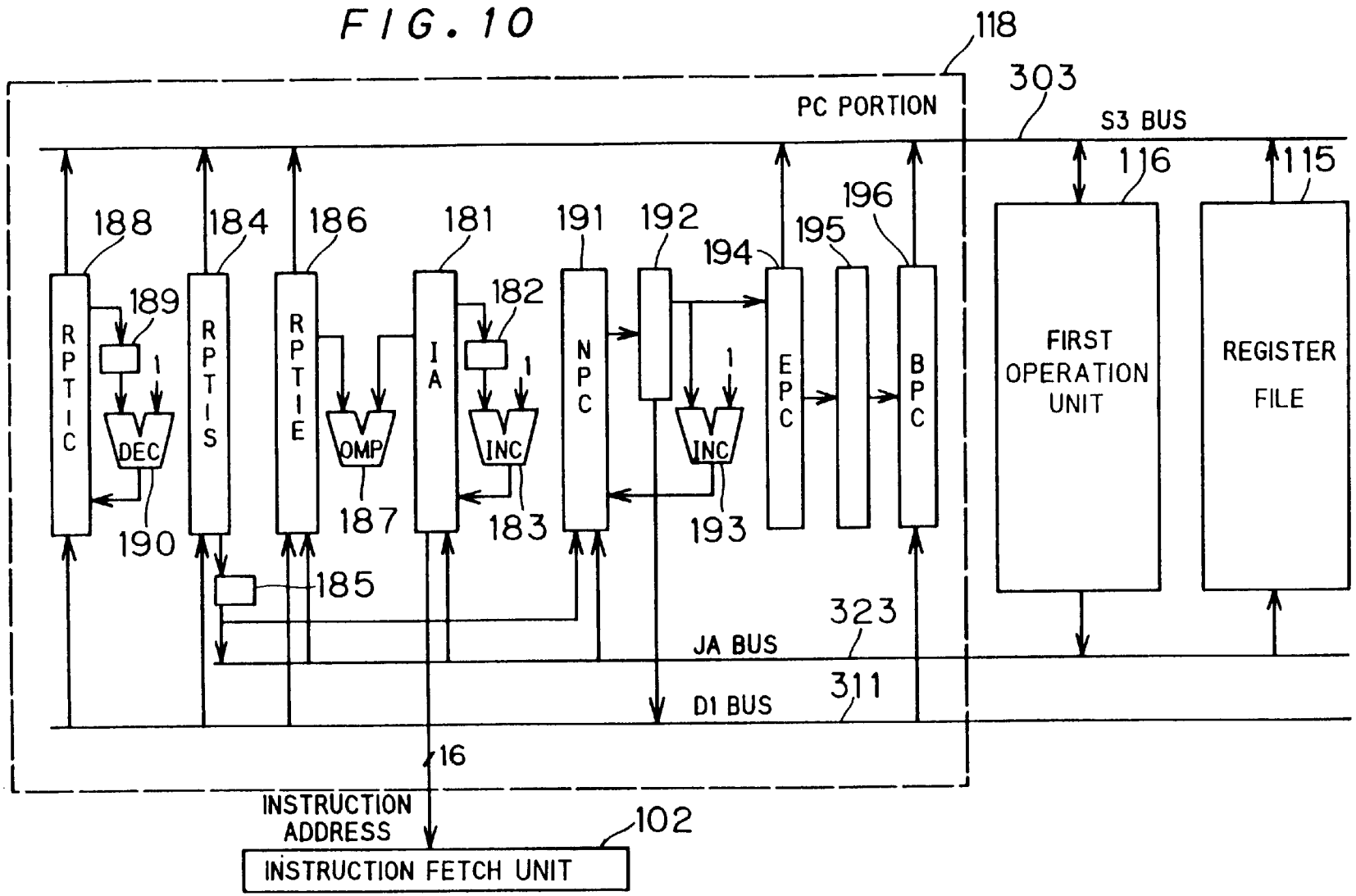
FIG. 10 is a detailed block diagram of a PC unit for the data processor according to the first preferred embodiment of the present invention.

FIG. 10 is a detailed block diagram of the PC unit 118. An instruction address (IA) register 181 holds the address of the next instruction to be fetched and outputs the address of the next instruction to the instruction fetch unit 102. When a subsequent instruction is to be fetched, the address value transferred from the IA register 181 through a latch 182 is incremented by 1 in an incrementor 183 and then written back to the IA register 181. If the sequence is changed by a jump or repeat, the IA register 181 receives the jump target address transferred by the JA bus 323.

RPT_S 184, RPT_E 186, and RPT_C 188 are repeat control registers and correspond to the control registers CR8 (26), CR9 (27), and CR7 (25) in the register set of FIG. 1, respectively. RPT_E 186 holds the address of the last instruction in the block to be repeated. The last address is calculated in the first operation unit 116 during repeat instruction processing and applied to RPT_E 186 through the JA bus 323. A comparator 187 compares the value the value of the end address in the repeat block held in RPT_E with the value of a fetch address held in the IA register 181. If the value in RPT_C 188 for holding a repeat count is not "1" during repeat processing and the two addresses coincide with each other, a start address of the block to be repeated which is held in RPT_S 184 is transferred to the IA register 181 through a latch 185 and the JA bus 323. Each time the instruction at the last address of the block to be repeated is executed, the value in RPT_C 188 is decremented by 1 by a decrementor 190 through a latch 189. If the result of decrement equals zero, the RP bit 43 in the PSW 21 is cleared and the repeat processing is terminated. RPT_S 184, RPT_E 186, and RPT_C 188 have an input port from the D1 bus 311 and an output port to the S3 bus 303. By using these buses, initialization caused by repeat instruction processing, and saving and returning operations are performed.

An execution stage PC (EPC) 194 holds the PC value of the instruction being executed, and a next instruction PC (NPC) 191 calculates the PC value of the instruction to be executed next. If a jump occurs during execution, the NPC 191 receives the value on the JA bus 323 to which the jump target address is transferred. If a branch occurs during a repeat, the NPC 191 receives the first address in the block to be repeated from the latch 185. In other cases, the value in the NPC 191 transferred through a latch 192 is incremented by an incrementor 193 and then written back to the NPC 191. In the case of a subroutine jump instruction, the value in the latch 192 is outputted as a return address to the D1 bus 311 and then written back to the register R13 defined as the link register in the register file 115. If the next instruction is to be executed, the value in the latch 192 is transferred to the EPC 194. If the PC value of the instruction being executed is to be referred to, the value in the EPC 194 is outputted to the S3 bus 303 and transferred to the first operation unit 116. A BPC 196 corresponds to the control register CR3 (23) in the register set of FIG. 1. If an exception or interruption is detected, the value in the EPC 194 is transferred to the BPC 196 through a latch 195. The BPC 196 has an input port from the D1 bus 311 and an output port to the S3 bus 303, and transfer to/from the register file 115 is performed.

Figure 11:
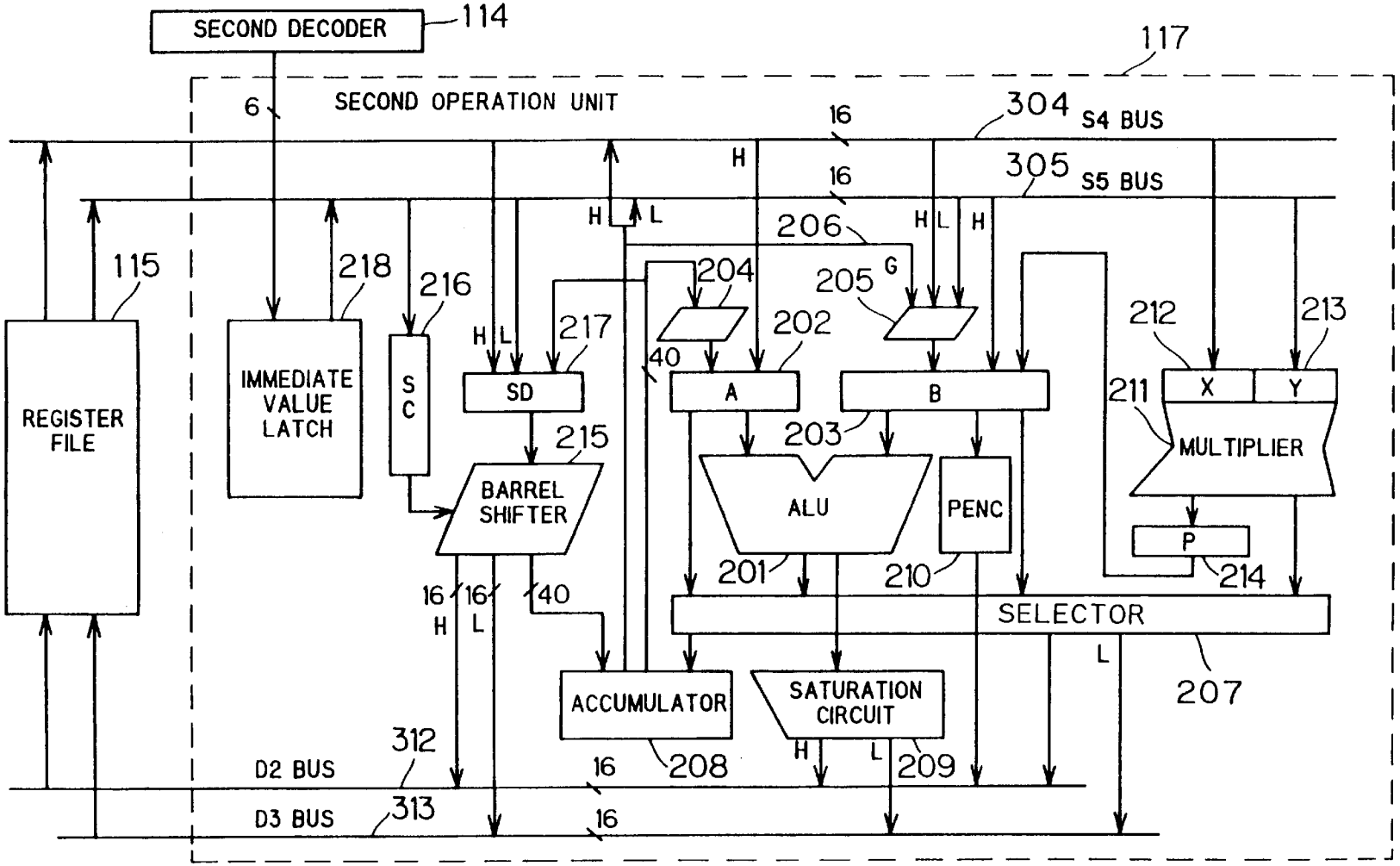
FIG. 11 is a detailed block diagram of a second operation unit for the data processor according to the first preferred embodiment of the present invention.

FIG. 11 is a detailed block diagram of the second operation unit 117. The second operation unit 117 is connected to the register file 115 by an S4 bus 304 and an S5 bus 305 to read data from the registers through the two buses 304 and 305. The S4 bus 304 and S5 bus 305 together may transfer 2-word data from the pair of registers in parallel. The second operation unit 117 is also connected to the register file 115 by a D2 bus 312 and a D3 bus 313 to write data into the registers through the two buses 312 and 313. The D2 bus 312 is connected to all registers, but the D3 bus 313 is connected to only the odd-numbered registers. The D2 bus 312 and D3 bus 313 together may transfer 2-word data to the pair of registers in parallel.

Accumulators 208 correspond to the two 40-bit accumulators A0 and A1 designated as 31 and 32 in FIG. 1.

The reference numeral 201 designates a 40-bit ALU including a guard bit adder for the accumulator which is 8 bits long (bit 0 to bit 7), an arithmetic and logic unit which is 16 bits long (bit 8 to bit 23), and an adder for adding the low-order 16 bits of the accumulator which is 16 bits long (bit 24 to bit 39). The ALU 201 performs addition and subtraction of up to 40 bits and a logic operation of 16 bits.

An A latch 202 and a B latch 203 are input latches for the ALU 201. The A latch 202 receives the data on the S4 bus 304 at the bit 8 to bit 23 positions, receives the value in the accumulator 208 intactly through a shifter 204, or receives the value in the accumulator 208 arithmetically 16 bits right-shifted through the shifter 204. A shifter 205 receives the value in the accumulator 208 through an interconnecting line 206 (8 guard bits), the S4 bus 304 (high-order 16 bits) and the S5 bus 305 (low-order 16 bits) or receives the value in the register subjected to sign extension into 40 bits through only the S5 bus 305 or through the S4 and S5 buses 304 and 305. Then, the shifter 205 receives the value arithmetically shifted by any amount ranging from 3 bits left-shift to 1 bit right-shift. The B latch 203 receives the data on the S5 bus 305 at the bit 8 to bit 23 positions or receives the output from a multiplier 211 through the P latch 214 or the output from the shifter 205. The A latch 202 and the B latch 203 have the function to clear the data therein to zero and to set the data therein to a constant value.

If a destination operand indicates the accumulator 208, the output from the ALU 201 is written into the accumulator 208 through a selector 207. If the designation operand indicates the register, the output from the ALU 201 is written into the register file 115 through the selector 207 and either the D2 bus 312 only (1-word data) or both of the D2 bus 312 and D3 bus 313 (2-word data). A saturation circuit 209 receives the output from the ALU 201 and has the function of clipping its output to a maximum or minimum value expressible as 16 bits or 32 bits with reference to the guard bits to output data containing high-order 16 bits or both high-order and low-order 32 bits. The output from the saturation circuit 209 may be written into the register file 115 through only the D2 bus 312 (1-word data) or through both of the D2 bus 312 and D3 bus 313 (2-word data). For calculation of absolute values and execution of maximum and minimum value setting instructions, the outputs of the A latch 202 and the B latch 203 are connected to the input of the selector 207.

A priority encoder (PENC) 210 receives the value in the B latch 203. The PENC 210 generates the shift count value required to normalize the input data as fixed point format, and outputs the results to the register file 115 through the D2 bus 312.

An X latch 212 and a Y latch 213 receive 16-bit values on the S4 bus 304 and S5 bus 305, respectively, and have the function of zero extension or sign extension of the 16-bit values to 17 bits.

The multiplier 211 is a 17-bit×17-bit multiplier for multiplying the value stored in the X latch 212 by the value stored in the Y latch 213. If the multiplier 211 receives a multiply-add instruction or a multiply-subtract instruction, the result of multiplication is applied to a P latch 214 and transmitted to the B latch 203. If the multiplier 211 receives a multiply instruction and the destination operand is the accumulator 208, the result of multiplication is written into the accumulator 208 through the selector 207.

A barrel shifter 215 may perform an up-to-16-bits left and right arithmetic/logic shift on 40-bit or 16-bit data. A shift data (SD) latch 217 receives as shift data the value in the accumulator 208 or the value in the register applied through the S4 bus 304. A shift count (SC) latch 216 receives as a shift count the immediate value of the register value through the S5 bus 305. The barrel shifter 215 performs a shift specified by the operation code on the data in the SD latch 217 by the shift count specified by the SC latch 216. The result of the shift operation is written back to the accumulator 208 or to the register file through the D2 bus 312. The shifter 215 has a 2-word transfer function. Specifically, the shifter 215 outputs the 2-word data received through the S4 bus 304 and S5 bus 305 to the D2 bus 312 and D3 bus 313 through the SD latch 217 and shifter 215 to write back the 2-word data into the register file 115. The shifter 215 may perform 1-word transfer.

An immediate value latch 218 extends a 6-bit immediate value generated by the second decoder 114 into a 16-bit value and then holds the 16-bit value to transfer the 16-bit value to an arithmetic unit through the S5 bus 305.

Figure 12:
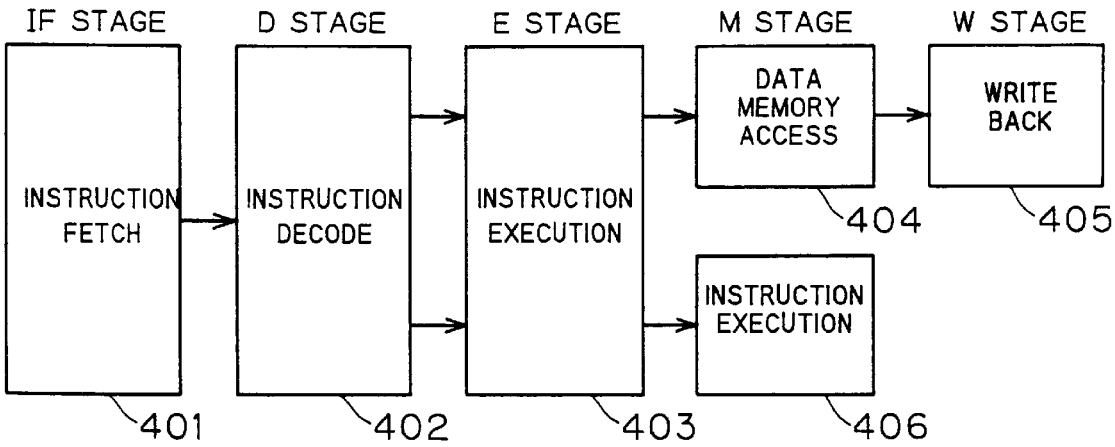
FIG. 12 illustrates pipeline processing for the data processor according to the first preferred embodiment of the present invention.

Pipeline processing in the data processor will be described below according to the first preferred embodiment of the present invention. FIG. 12 illustrates the pipeline processing. The data processor of the first preferred embodiment performs 5-stage pipeline processing including an instruction fetch (IF) stage 401 for fetching instruction data, an instruction decode (D) stage 402 for analyzing instructions; an instruction execution stage (E) 403 for executing operations; a memory access (M) stage 404 for accessing a data memory, and a write back (W) stage 405 for writing operands loaded from a memory into a register. For multiply-add/multiply-subtract operations, further 2-stage pipeline including multiplication and addition is used to execute instructions. The latter stage processing is referred to as an instruction execution 2 (E2) stage 406.

At the IF stage 401, a fetch of instructions, management of the instruction queue 111, and repeat control mainly are performed. The IF stage 401 controls the operations of the instruction fetch unit 102, the internal instruction memory 103, the external bus interface unit 106, the instruction queue 111, the IA register 181, latch 182, incrementor 183 and comparator 187 in the PC unit 118, and units for performing the stage control, the instruction fetch control, control of PC unit 118 and control of the instruction queue 11 in the control unit 113. The IF stage 401 is initialized by a jump at the E stage 403.

The fetch address is held in the IA register 181. If a jump occurs at the E stage 403, the IA register 181 receives the jump target address through the JA bus 323 to perform initialization. When the instruction data are fetched sequentially, the incrementor 182 increments the address. The sequence switching control is performed if the comparator 187 detects a coincidence between the value in the IA register 181 and the value in the RPT_E 186 during repeat processing and the value in the RPT_C 188 is not "1". Then, the value held in the RPT_S 184 is transferred to the IA register 181 through the latch 185 and JA bus 323.

The value in the IA register 181 is sent to the instruction fetch unit 102 which in turn fetches the instruction data. If the corresponding instruction data are stored in the internal instruction memory 103, an instruction code is read from the internal instruction memory 103. In this case, the instruction fetch is completed within one clock cycle. If the corresponding instruction data are not stored in the internal instruction memory 103, an instruction fetch request is sent to the external bus interface unit 106. The external bus interface unit 106 arbitrates between the instruction fetch request and a request from the operand access unit 104. When the external bus interface unit 106 accepts the instruction fetch request from the instruction fetch unit 102, the external bus interface unit 106 reads out the instruction data from an external memory, and transmits the fetched instruction to the instruction fetch unit 102. The external bus interface unit 106 requires a minimum of 2 clock cycles to access the external memory. The instruction fetch unit 102 transfers the received instruction to the instruction queue 111. The instruction queue 111 is a 2-entry queue and outputs the instruction code received under FIFO control to the instruction decoders 113 and 114.

At the D stage 402, the instruction decode unit 119 analyzes operation code and generates execution control signals to control the first operation unit 116, the second operation unit 117, and the PC unit 188 to execute instructions. The D stage 402 is initialized by a jump at the E stage 403. If the instruction code sent from the instruction queue 111 is invalid, the D stage 402 is placed in an idle cycle and waits for an valid instruction code to be received. If the E stage 403 is not permitted to start the next processing, the execution control signals are invalidated, and the D stage 403 waits for the termination of processing of the preceding instruction at the E stage 403. For example, such a condition occurs when the instruction being executed at the E stage 403 is a memory access instruction and the preceding memory access is not terminated at the M stage 404.

Figure 13:
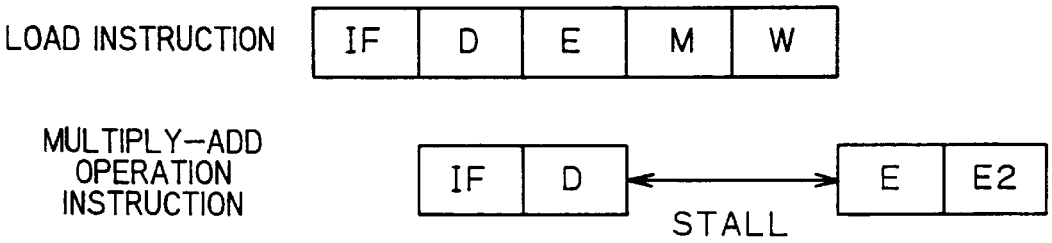
FIG. 13 illustrates a pipeline state when a load operand interference occurs in the data processor according to the first preferred embodiment of the present invention.
Figure 14:
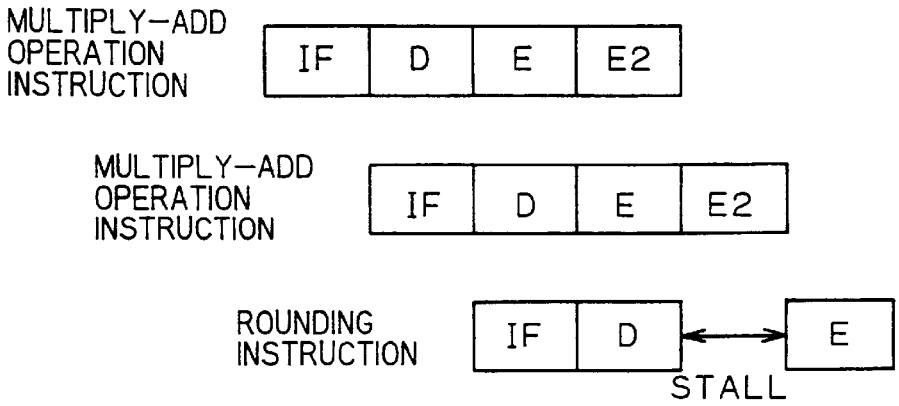
FIG. 14 illustrates a pipeline state when an arithmetic hardware interference occurs in the data processor according to the first preferred embodiment of the present invention.

The D stage 402 also performs division of two instructions to be sequentially executed, sequence control of a 2-cycle execution instruction, a conflict check on a load operand using a scoreboard register (not shown), and a conflict check on a operation unit in the second operation unit 117. If any of these conflicts are detected, the output of the control signal is inhibited until the conflict is cancelled. FIG. 13 illustrates an example of the load operand conflict. If immediately after a load instruction a multiply-add operation refers to an operand to be loaded by the load instruction, the start of execution of the multiply-add operation instruction is inhibited until the load to the register is completed. In this case, a 2-clock-cycle stall occurs if the memory access is terminated within one clock cycle. FIG. 14 illustrates an example of an hardware resource conflict on the second operation. If a rounding instruction which uses an adder is immediately after a multiply-add operation instruction, the start of execution of the rounding instruction is inhibited until the operation of the preceding instruction is terminated. In this case, a 1-clock-cycle stall occurs. No stalls occur if the multiply-add operation instructions are executed successively.

The first decoder 113 mainly generates operation control signals for control of the: first operation unit 116, control of parts of the PC unit 118 which are not controlled by the IF stage 401, read control of the register file 115 to the S1 bus 301, S2 bus 302, and S3 bus 303, and write control thereof from the D1 bus 311. The first decoder 113 also generates the instruction-dependent information to be used in the M stage 404 and the W stage 405, and this control information is sent through the pipeline. The second decoder 114 mainly generates an execution control signals in the second operation unit 117.

The E stage 403 performs processing of almost all instruction executions except the memory access and addition of the multiply-add/multiply-subtract operation instructions, such as an arithmetic operation, comparison, data transfer between registers including control registers, operand address calculation of the load/store instructions, calculation of the jump target address of the jump instruction, jump processing, EIT (exception, interruption, trap) detection, and jump to an EIT vector table.

With interrupts enables, an interrupt is detected at the end of a 32-bit instruction without fail. No interrupt is serviced between two short instructions to be sequentially executed in the 32-bit instruction.

The completion of the execution of the E stage 403 must stall when the instruction being processed at the E stage 403 is an operand access instruction and a preceding memory access at the M stage 404 has not completed. Stage control is performed in the control unit 112.

At the E stage 403, the first operation unit 116 performs arithmetic and logic operations, comparison, and transfer. The ALU 153 calculates the address of the memory operand including modulo control and a branch target address. The value in the register specified as the operand by an instruction is transferred to the first operation unit 116. Extended data, such as an immediate or displacement value, is also transferred to the first operation unit 116 from the first decoder 113 if necessary. Arithmetic and logical operations are performed by ALU 153, and an operation result is written back to the register file 115 through the D1 bus 311. If the load/store instruction is provided, the result of the arithmetic operation is transmitted to the operand access unit 104 through the AO latch 154 and OA bus 321. If the jump instruction is provided, the jump target address is transmitted to the respective units through the JA bus 323. The store data are read from the register file 115 through the S1 bus 301 and S2 bus 302 and are held and aligned. Then, the store data are transferred to the operand access unit 104 through the OD bus 322. The PC unit 118 manages the PC value of the instruction being executed and calculates the next instruction address. Data transfer between the control register (except the accumulator) and the register file 115 is carried out by both of the first operation unit 116 and the PC unit 118.

At the E stage 403, the second operation unit 116 executes all operations except addition of the multiply-add operation, such as arithmetic and logic operations, comparison, transfer, and shift. The value of an operand is transferred from the register file 115, immediate value register 218, and accumulator 208 to respective operation units through the S4 bus 304, S5 bus 305 and other exclusive paths, and is subjected to a specified operation. The result of the operation is written back to the accumulator 208, or to the register file 115 through the D2 bus 312 and the D3 bus 313.

The control signal generated in the second decoder 114 for execution of the addition and subtraction of the multiply-add/multiply-subtract operation is held under control of the E stage 403.

In the M stage 404, operand memory access is performed according to the address sent from the first operation unit 116. The operand access unit 104 reads/writes data from/to the internal data memory 105 or an on-chip IO (not shown) in one clock cycle if the operand is in the internal data memory 105 or the on-chip IO. The operand access unit 104 outputs a data access request to the external bus interface unit 106 if the operand is not in the internal data memory 105 or the on-chip IO (not shown). The external bus interface unit 106 accesses data in the external memory, and transfers the read data to the operand access unit 104 if a load instruction is executed. The external bus interface unit 106 requires a minimum of two clock cycles to access the external memory. If the load instruction is executed, the operand access unit 104 transfers the read data to the LD register 164 through the OD bus 322. The M stage 404 control is performed in the control unit 112.

In the W stage, alignment of loaded operands, zero/sign extension of byte data, and writing to the register file 115 are performed.

At the E2 stage 406, the ALU 201 executes the addition and subtraction of the multiply-add/multiply-subtract operation.

The data processor of this preferred embodiment uses for internal control an a clock signal generated by multiplying an input clock signal by four for an internal clock signal. Each of the pipeline stage requires a minimum of one internal clock cycle to terminate processing thereof. The details of the clock control are not directly related to the present invention and hence are not described.

An example of processing of the respective sub-instructions is discussed below. The processing of operation instructions such as addition, subtraction, logic operation, and comparison, and register-to-register transfer instructions is terminated in three stages: the IF stage 401, the D stage 402, and the E stage 403. The operations and data transfer are executed at the E stage 403.

The multiply-add/multiply-subtract instruction requires 2 clock cycles for execution of multiplication at the E stage 403 and addition and subtraction at the E2 stage 406, that is, substantially 4-stage processing.

The load instruction requires five stages: the IF stage 401, the D stage 402, the E stage 403, the M stage 404, and the W stage 405 to terminate the processing. The store instruction requires four stages: the IF stage 401, the D stage 402, the E stage 403, and the M stage 404 to terminate the processing.

An instruction which requires 2 cycles for execution directs that the first and second instruction decoders 113 and 114 perform the processing in two cycles. Each of the first and second instruction decoders 113 and 114 outputs an execution control signal for each cycle, and executes the operation in two cycles.

One long instruction performs the above described processing. Two instructions to be executed in parallel perform the above described processing in accordance with the instruction that takes a greater number of clock cycles to execute the instruction in the E stage 403. For example, a combination of the instruction to be executed in two cycles and the instruction to be executed in one cycle requires two cycles. Two short instructions to be executed sequentially are decoded sequentially in the D stage 402 and executed sequentially in the E stage 403. For example, two addition instructions to be terminated at the E stage 403 are divided into respective instruction processes at the D stage 402 and executed over 2 cycles at the E stage 403.

An example of processing is described below on the basis of some programs.

FIG. 15 illustrates an exemplary program of a 256-tap FIR (finite impulse response) filter (frame processing) of the data processor according to the first preferred embodiment. The symbol "| |" in FIG. 15 indicates that two short instructions are executed in parallel. The FIR filter executes the following calculation:

$$\sum_{i=0}^{255} (A[i] * D[i])$$

where A[i] is a coefficient array and D[i] is a data array. This calculation includes 256 multiply-add operations. The coefficient and the data each are 16 bits in length.

In FIG. 15, initialization is designated at 501, loop processing at 502, and post-processing at 503. The loop processing without overhead is implemented by a repeat (repi) instruction. A block of 6 instructions between the instruction next to the repi instruction and the instruction specified by the label "loopend" is executed 42 times. The repi instruction is a long instruction including an operation code, a 16-bit displacement for specifying the last address of the repeat block in the PC relative mode, and an 8-bit immediate value for specifying the repeat count, and requires two clock cycles for execution. In the first cycle, the instruction address next to the repi instruction is transferred from the latch 192 to RPT_S 184 and the latch 185 through the D1 bus 311. The address of the repi instruction is transferred from the EPC 194 through the S3 bus 303 to the AA latch 151, and the displacement value specified by the instruction is applied from the first decoder 113 to the AB latch 152. The ALU 153 adds the data in the AA latch 151 and AB latch 152 together to transfer the result of the addition which is the last instruction address of the block to be repeated to RPT_E 186 through the JA bus 323. In the second cycle, the 8-bit immediate value which is zero-extended into 16 bits is applied from the first decoder 113 to the AB latch 152 and is then transferred to RPT_C 188 through the ALU 153 and D1 bus 311. The RP bit 43 in the PSW 21 is set to "1". In this manner, initialization required for repeat processing is terminated. The registers R0 to R5 are used as a buffer for data; the registers R6 to R11 are used as a buffer for coefficients; the register R12 is used as a data pointer; and the register R14 is used as a pointer for coefficients.

Figure 16:
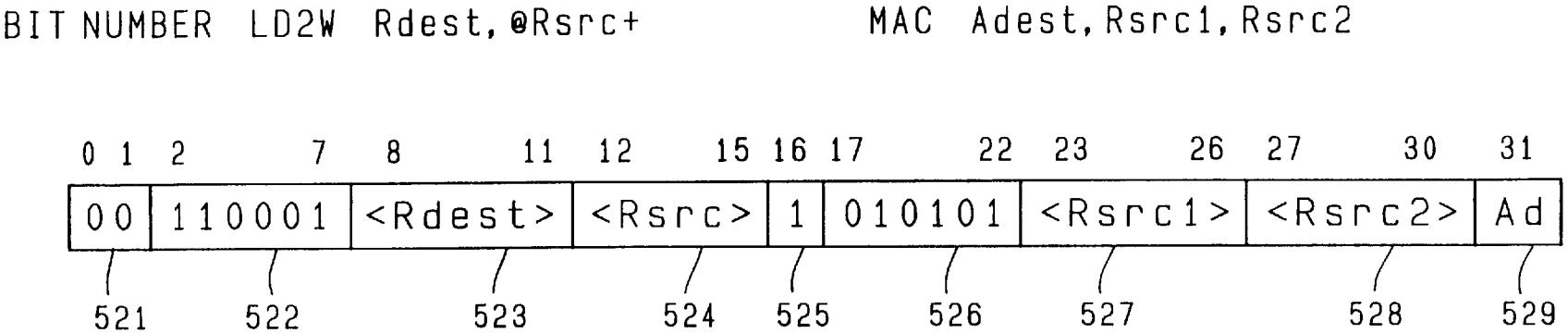
FIG. 16 illustrates a bit pattern when a 2-word load instruction and a multiply-add operation instruction are executed in parallel in the data processor according to the first preferred embodiment of the present invention.

The processing in the loop is described in detail hereinafter. Each instruction includes the load instruction and the multiply-add operation instruction, and the two short instructions are executed in parallel. In FIG. 15, the "LD2W Rdest, @Rsrc+" indicates that 2-word (32-bit) data are fetched using the contents of the register specified by Rsrc as an operand address, and the fetched operand value is written to a pair of registers specified by Rdest (e.g., a pair of registers R0 and R1 when Rdest indicates R0). The value of Rsrc plus 4 (byte size of the operand) is written back. "MAC Adest, Rsrc1, Rsrc2" indicates the multiply-add operation instruction. The value in the register specified by Rsrc1 and the value in the register specified by Rsrc2 are multiplied together as signed values, and the result of multiplication is added to the value in the accumulator specified by Adest. The result of the addition is written back to the accumulator. FIG. 16 illustrates a bit pattern when these two instructions are executed in parallel. These instructions are allocated as instructions corresponding to the bit allocation of the short instruction having two operands of FIG. 4. The reference numeral 521 designates FM bits which are "00" since two instructions are executed in parallel. The reference numerals 522 and 525 designate operation codes of an LD2W instruction with post-increment, and 526 designates an operation code of a MAC instruction. The reference numerals 523, 524, 527, and 528 designate areas for specifying the register numbers of Rdest, Rsrc, Rsrc1, and Rsrc2 for holding operands, respectively. Rdest may specify only even-numbered registers. The reference numeral 529 designates an area Ad for specifying the accumulator number of Adest. FIG. 17 illustrates the contents of the internal instruction memory corresponding to the loop part. For simplicity, the contents of the memory are expressed as mnemonics. The 32-bit instructions are referred to as I1 (511), I2 (512) and the like, and the short instructions are referred to as I1a (512(a)), I1b (512(b)) and the like. The six instructions I1 (511) to I6 (516) are repeatedly executed 42 times in the loop.

Figure 18:
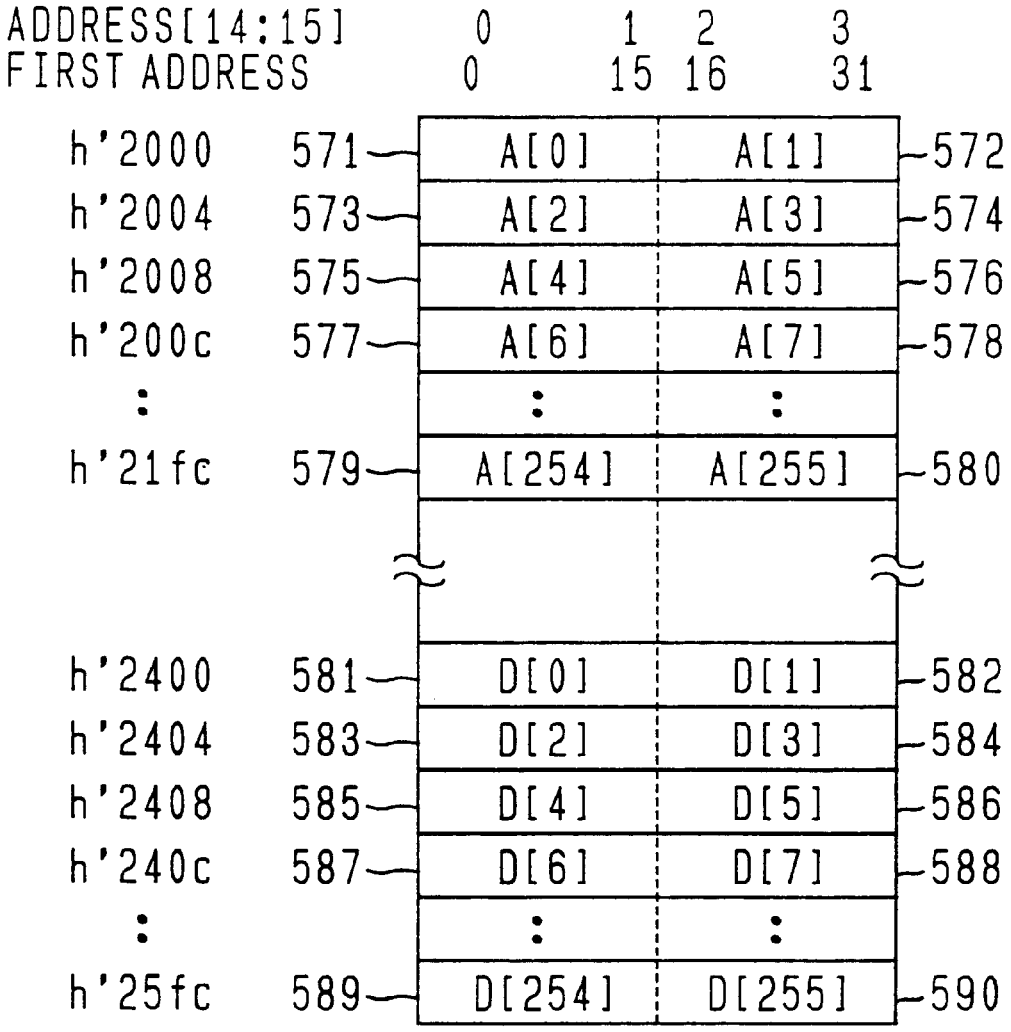
FIG. 18 illustrates mapping of an internal data memory in relation to coefficients and data in the program of the FIR filter for the data processor according to the first preferred embodiment of the present invention.

FIG. 18 illustrates mapping of the internal data memory with respect to the coefficients A[i] and data D[i]. Each area of the internal data memory holds 256 data entries. For the coefficients A[i], 16-bit data are held in 256-word (512-byte) areas at the addresses 2000 to 21ff in hexadecimal. For the data D[i], 16-bit data are held in 256-word (512-byte) areas at the addresses 2400 to 25ff in hexadecimal.

Figure 19:
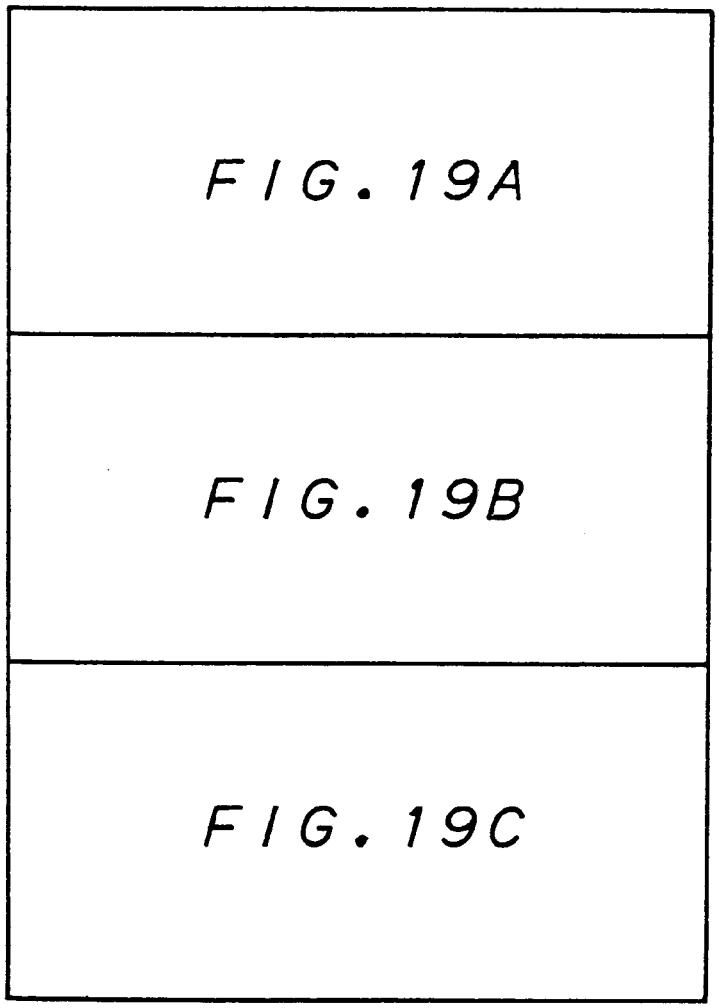
FIG. 19 shows respective positions of FIGS. 19A to 19C.
Figure 19A:
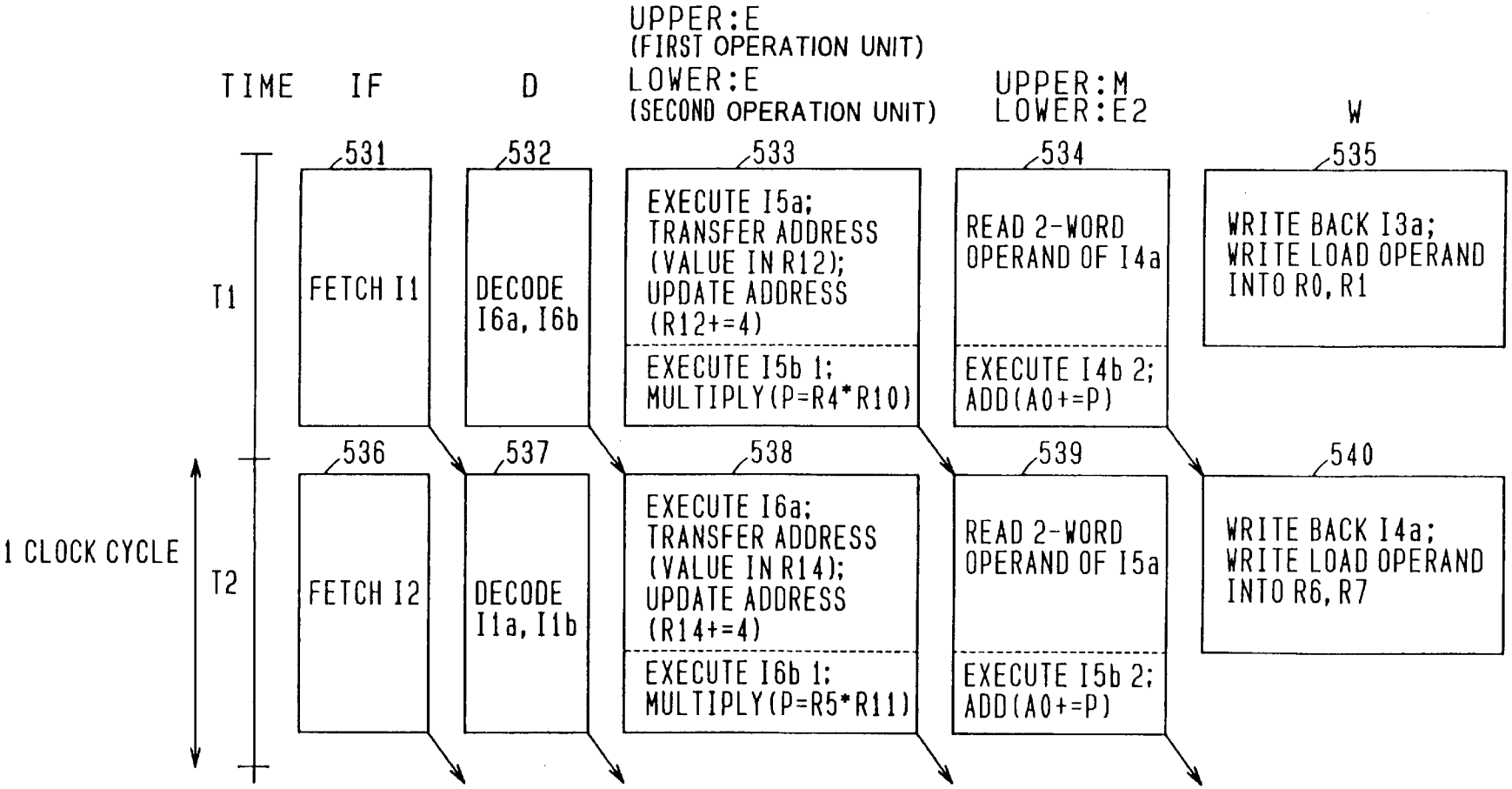
FIGS. 19A to 19C illustrate a flow of processing in a loop of the program of the FIR filter for the data processor according to the first preferred embodiment of the present invention.
Figure 19B:
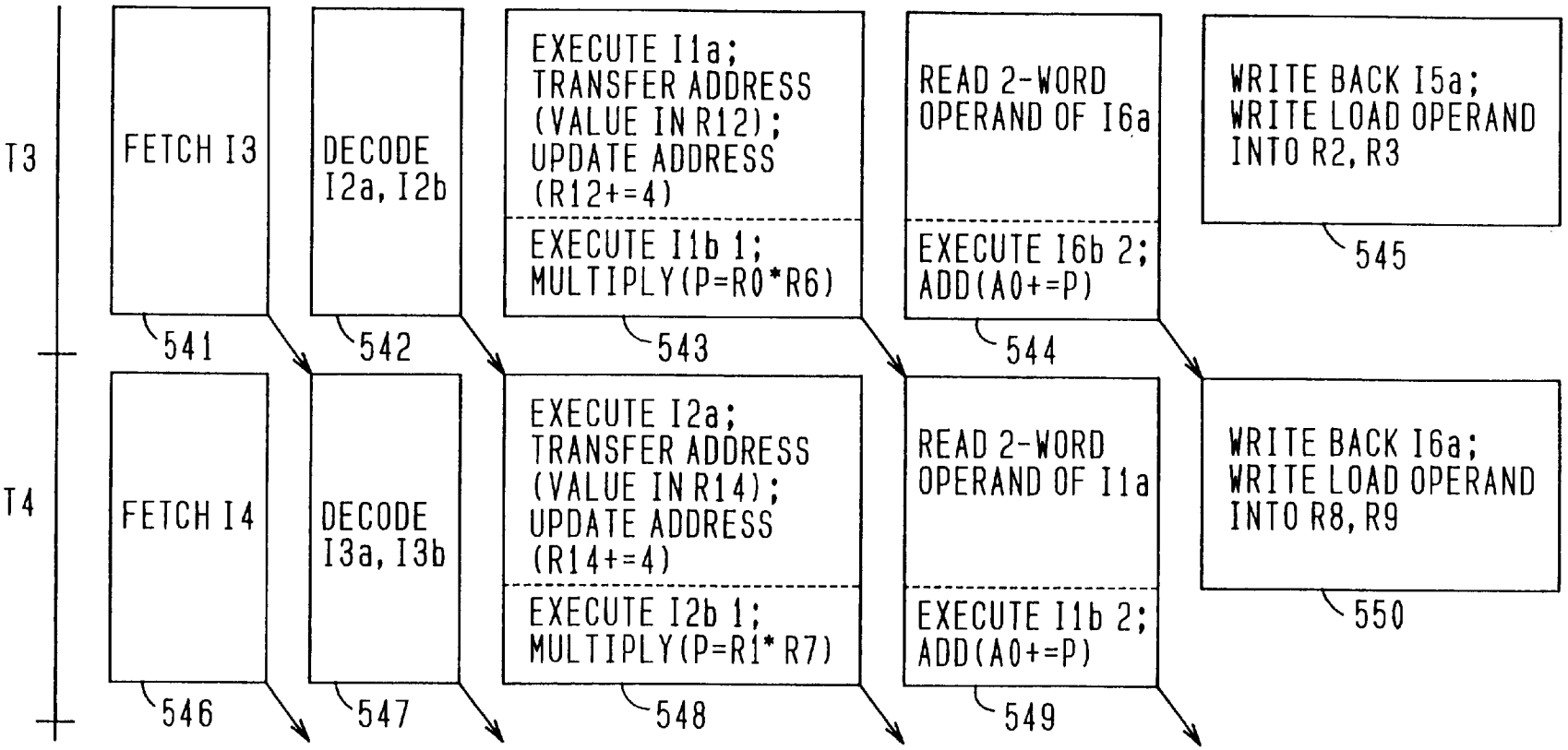
Figure 19C:
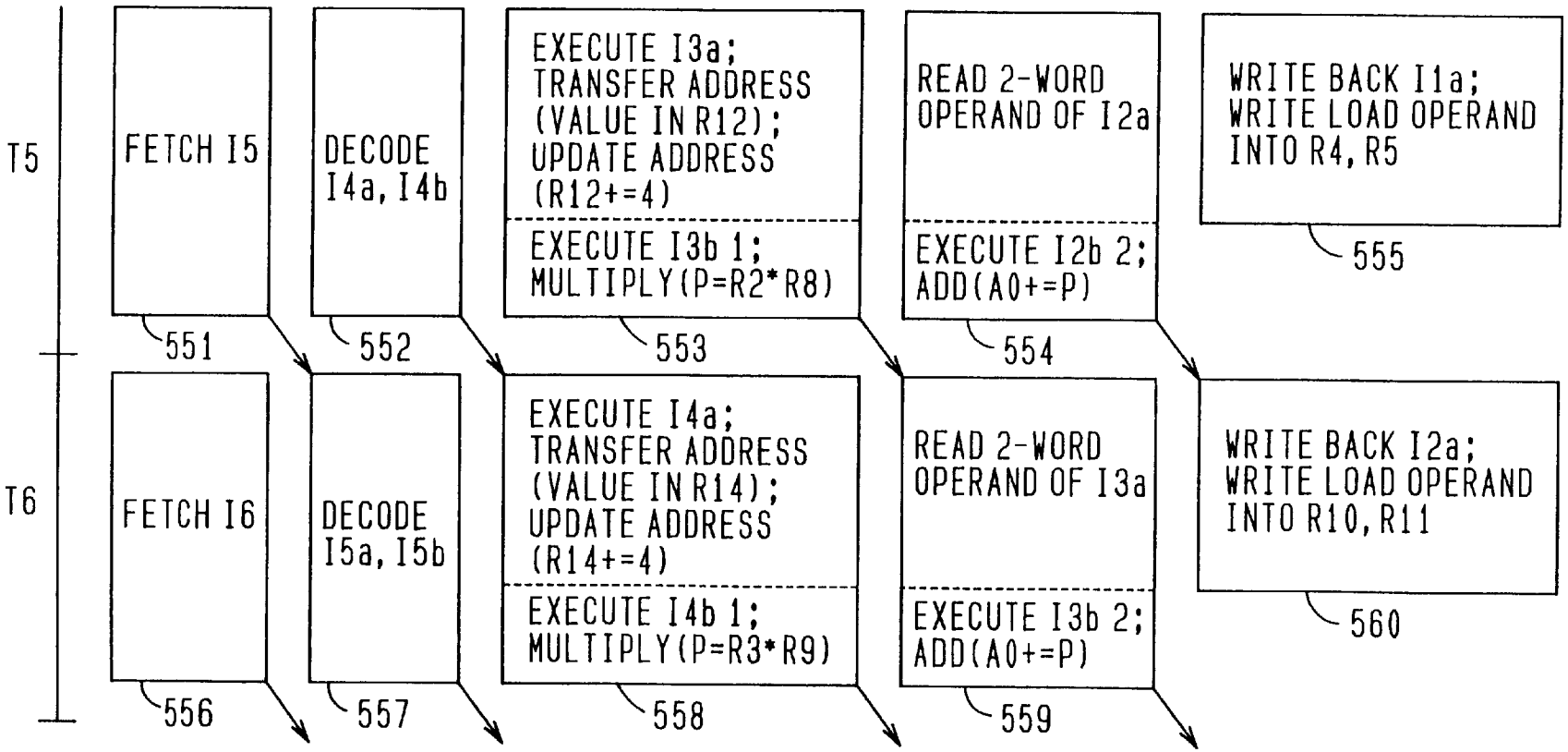

FIG. 19 (FIGS. 19A to 19C) illustrates a flow of processing in the loop wherein the pipeline stages are depicted as the abscissa with time as the ordinate. All instructions are stored in the internal instruction memory 103, and all operand data are stored in the internal data memory 105. One clock cycle is required to complete the processing at one stage. When repeating the processing continued, T1 follows T6.

An example is given below based on the processing of 11 (511). At the IF stage 401, 11 (511) is fetched during T1 period (531). The contents of the IA register 181 are transferred to the instruction fetch unit 102. The comparator 187 compares the value in the IA register 181 with the value in the RPT_E 186. Since a mismatch occurs, the value in the IA register 181 is incremented by the incrementor 182 and written back. The instruction fetch unit 102 accesses the internal instruction memory 103 to transmit the read 32-bit instruction data to the instruction queue 111. The instruction queue 111 transmits the instruction data transferred thereto within the same cycle to the first decoder 113 and the second decoder 114.

At the D stage 402, 11 (511) is decoded during T2 period (537). The first decoder 113 decodes the LD2W instruction of I1a (511(a)) to produce the control signal, and the second decoder 114 decodes the MAC instruction of I1b (511(b)) to produce the control signal. The control signals from the first and second decoders 113 and 114 are outputted to the first and second operation units 116 and 117, respectively. The immediate value which is "4" is transmitted to the first operation unit 116. At the D stage 401, a conflict check is performed on the operands and arithmetic units, but no interference occurs. The value of the read operand of the MAC instruction has already been loaded. The MAC instruction of I1b (511(b)) is executed during T3 period (543). Writing a value to the register R0 has been completed during T1 period (535), and writing a value to the register R6 has been completed during T2 period (540).

At the E stage 403, 11 (511) is executed during T3 period (543). The first operation unit 116 produces the operand address of the LD2W instruction of I1a (511(a)) and updates the value of the address pointer. The value in the register R12 of the register file 115 which is the operand address is transferred through the S3 bus 303 to the AA latch 151. The value in the AA latch 151 is intactly outputted to the operand access unit 104 through the AO latch 154 and OA bus 321. The immediate value outputted form the first decoder 113 is transferred to the AB latch 152. The ALU 153 performs addition to write back the result of addition to the register R12 of the register file 115 through the selector 155 and D1 bus 311. The second operation unit 117 performs multiplication of the MAC instruction of I1b (511(b)). The value in the register R0 of the register file 115 is applied to the X register 212 through the S4 bus 304, and the value in the register R6 of the register file 115 is applied to the Y register 213 through the S5 bus 305. Both of the values are handled as signed values and multiplied together. The result of multiplication is applied to the P register 214.

At the M and E2 stages 404 and 406, 11 (511) is subjected to memory access and addition during T4 period (549), respectively. The operand access unit 104 loads the 4-byte data from the internal data memory 105 at the address transmitted from the first operation unit 116 to transfer the fetched value to the LD register 164 through the OD bus 322. The second operation unit 117 performs addition of the MAC instruction of I1b (511(b)). The value in the accumulator 208 (A0) is not shifted by the shifter 204 but is applied to the A latch 202. The value in the P register 214 is subjected to sign extension into 40 bits and applied to the B latch 203. The ALU 201 adds the values in the A and B latches 202 and 203 together to write back the result of addition to the accumulator 208 (A0).

At the W stage 405, writing back to the register is performed during T5 period (555). The first operation unit 116 outputs the data held in the LD register 164 to the W1 bus 314 and W2 bus 315 through the latch 161 and alignment circuit 166. Since the operand is aligned in 4 bytes, the high-order 2 bytes are outputted to the W1 bus 314, and the low-order 2 bytes are outputted to the W2 bus 315. The data on the W1 bus 314 are written into the register R4 of the register file 115, and the data on the W2 bus 315 are written into the register R5 of the register file 115.

The pipeline processing of one 32-bit instruction for each clock cycle achieved one multiply-add operation for each clock cycle. In this manner, the loaded data value is written two words at a time into the registers R0 and R1 of the register file 115 during T1 period 535 at the W stage 405, and the loaded coefficient value is written two words at a time into the registers R6 and R7 of the register file 115 during T2 period 540 at the W stage 405. The value in the register R0 of the register file 115 for holding the data and the value in the register R6 of the register file 115 for holding the corresponding coefficient are referred to and multiplied together during T3 period 543 at the E stage 403. The value in the register R1 of the register file 115 for holding the data and the value in the register R7 of the register file 115 for holding the corresponding coefficient are referred to and multiplied together during T4 period 548 at the E stage 403. Such pipeline processing by means of software without operand interference improves efficiency.

The repeat processing is not illustrated in detail in FIG. 19, but is described below briefly. At the IF stage 401, the fetch address is compared with the last address of the repeat block. A match occurs during T6 period 556 at the IF stage 401. The counter value of RPT_C 188 which is not "1" indicates further repetition of the processing, and the processing sequence is changed. The value in the latch 185 which is the start address of the block to be repeated is transferred to the IA register 181 through the JA bus 323. The instruction at the start address of the block to be repeated is fetched during T7 (not shown) period corresponding to T1 period 531 at the IF stage 401. The last instruction address match detection result of the repeat block is transferred through the pipeline. During T2 period 538 at the E stage 403 wherein 16 is executed, the decrementor 190 decrements the value in the repeat counter RPT_C 188 by one independently of the instruction to be executed. If the value in RPT_C 188 before decrement is "1", the RP bit in the PSW is cleared to zero, and the repeat is disabled.

Figure 20:
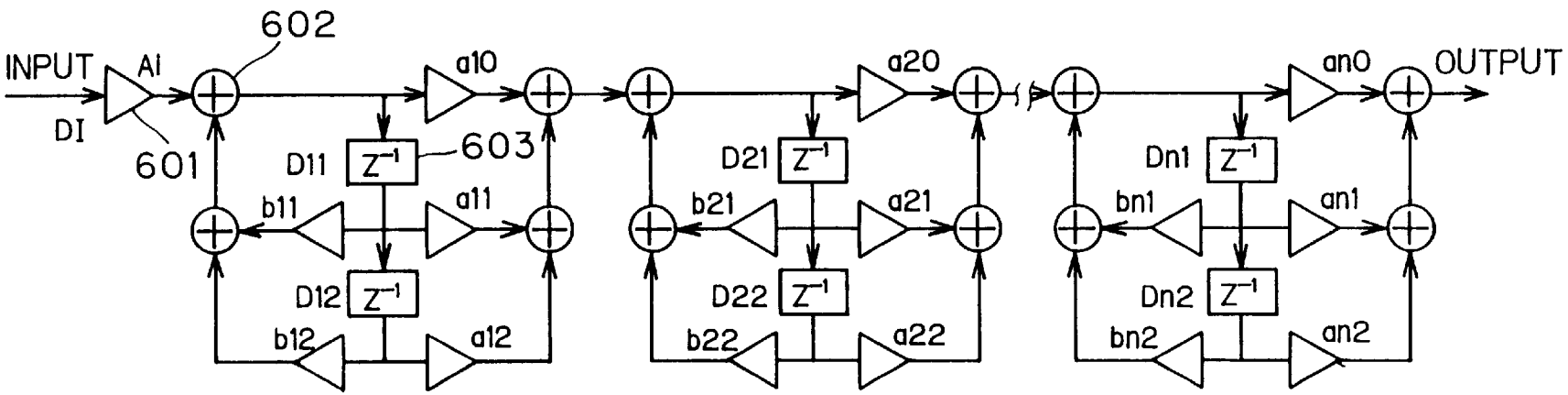
FIG. 20 illustrates signal lines of an n-stage secondary direct-form type-II IIR filter.

An n-stage second-order direct-form type II (n biquad) IIR (infinite impulse response) filter is described below. FIG. 20 illustrates the signal flow graph of the filter. In FIG. 20, 601 represents the multiplication of coefficients, 602 represents the addition of input data, and 603 represents a unit delay. Five multiply-add operations are executed within the loop. In this case, it is necessary to write the data of last two operations into the memory during the loop period. The data and coefficient each are 16 bits in length. FIG. 21 illustrates an example of a program of the IIR filter for the data processor of the first preferred embodiment. Initialization is performed at 606, the loop processing at 607, and the post-processing at 608. The loop processing without overhead is implemented by the repeat instruction.

Processing in the loop is described in detail herein. FIG. 22 illustrates the contents of the internal instruction memory corresponding to the loop part. Six instructions I1 (611) to I7 (617) are executed repeatedly 42 times within the loop. An ST2W instruction at 611(a) directs that the memory stores the values in the two registers R0 and R1. The value in the register R12 serving as the base address is post-incremented. An MULX instruction at 611(b) directs that the values in the two registers R0 and R6 as signed values are multiplied together and the result of multiplication is written back into the accumulator. The result of multiplication is written back into the accumulator 208 within the same cycle through the selector 207. An ADD instruction at 612(a) directs that the ALU 201 adds 4 to the contents of the register R12. An MV instruction at 613(b) directs that the value of r4 is copied to r1. An MV2W instruction at 616(b) transfers two words, that is, transfers the values in the registers R4 and R5 to the registers R2 and R3, respectively. Since the data are transferred through the barrel shifter 215 in this case, a hardware resource does not interfere with the immediately preceding multiply-add operation instruction. An RACHI instruction at 617(b) directs that the value in the accumulator A0 is 1 bit left-shifted, rounded to upper 16 bits, limited on the basis of the value of the guard bits to a maximum value h'7fff expressible in 16 bits if an overflow occurs and to a minimum value h'8000 expressible in 16 bits if an underflow occurs, and written back to the register R0. This operation is executed by using the ALU 201 and saturation circuit 209.

The register R0 holds input data to the next stage. The register R1 is used as update data Di1 (i is an integer not more than n). The registers R2 to R5 are used as a buffer for holding the data. The registers R6, and R8 to R11 are used as a buffer for coefficients. The register R12 is used as a data pointer. The register R14 is used as a pointer for coefficients. The register R7 holds invalid data to maintain 32-bit alignment of the coefficient data.

Figure 23:
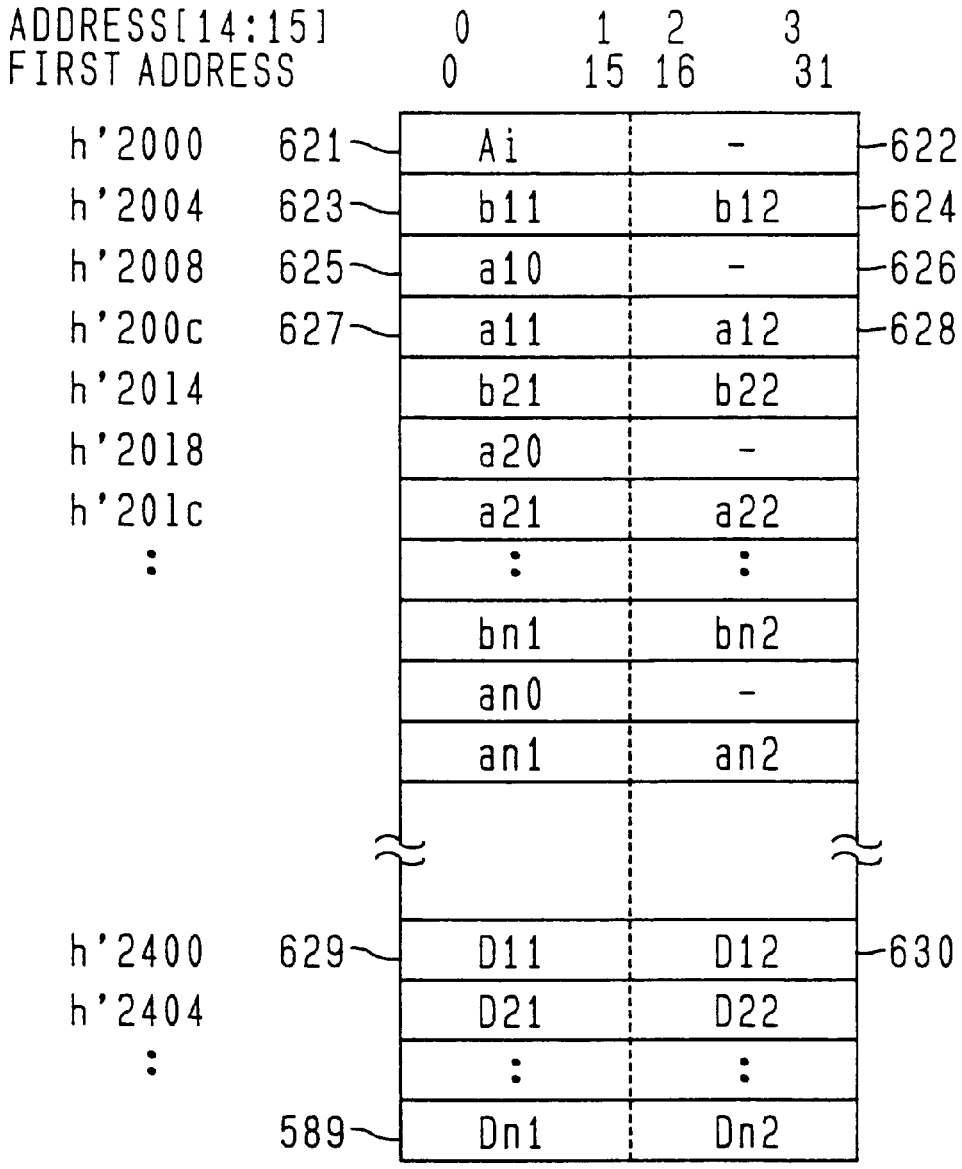
FIG. 23 illustrates mapping of the internal data memory in relation to coefficients and data in the program of the IIR filter for the data processor according to the first preferred embodiment of the present invention.

FIG. 23 illustrates mapping of the internal data memory with respect to the coefficients and data. The respective data are 16 bits in length. Five coefficients are provided per stage and two data are provided per stage in the arrangement of FIG. 20. A coefficient Ai (621) is to be multiplied by an input value. The reference numerals 622 and 626 designate dummy areas for efficient access to the coefficients.

Figure 24:
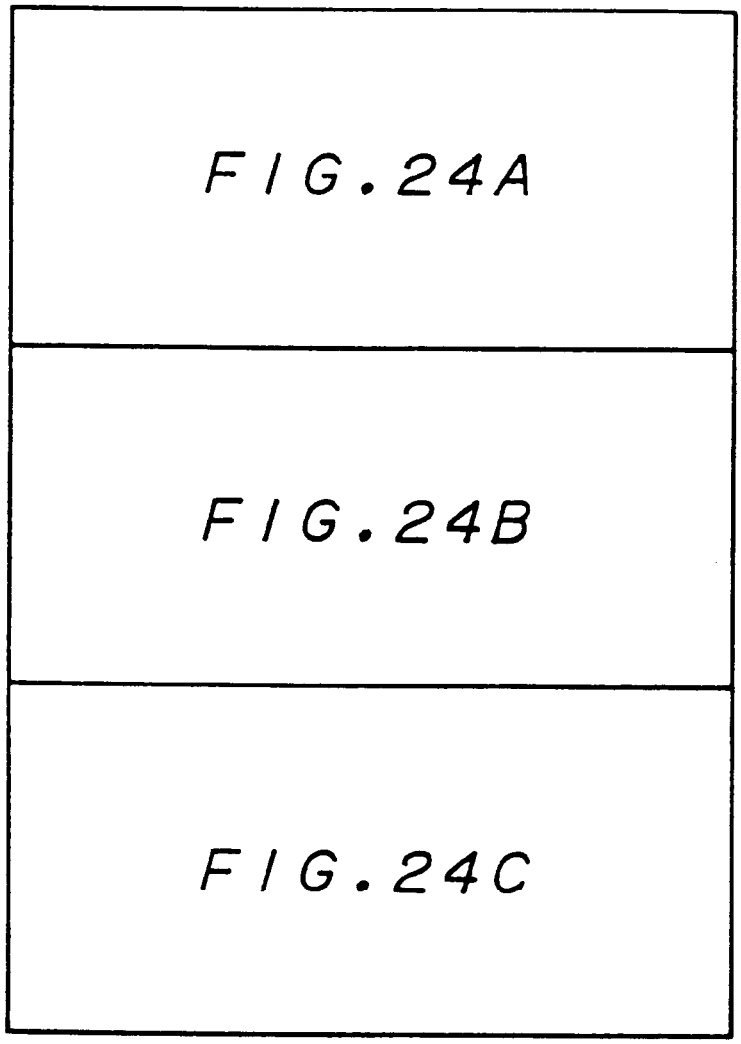
FIG. 24 shows respective positions of FIGS. 24A to 24C.
Figure 24A:
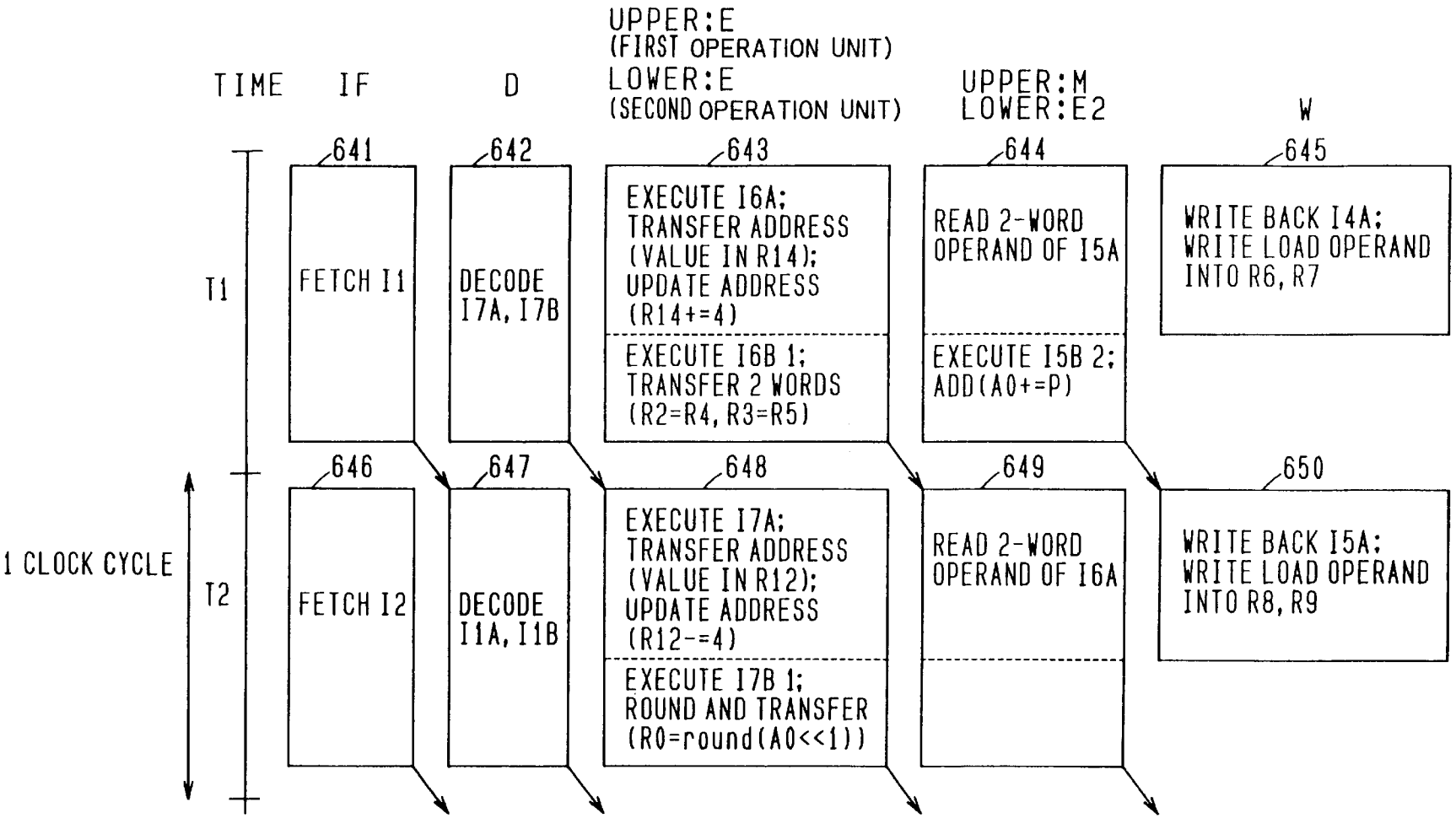
FIGS. 24A to 24C illustrate a flow of processing in a loop of the program of the IIR filter for the data processor according to the first preferred embodiment of the present invention.
Figure 24B:
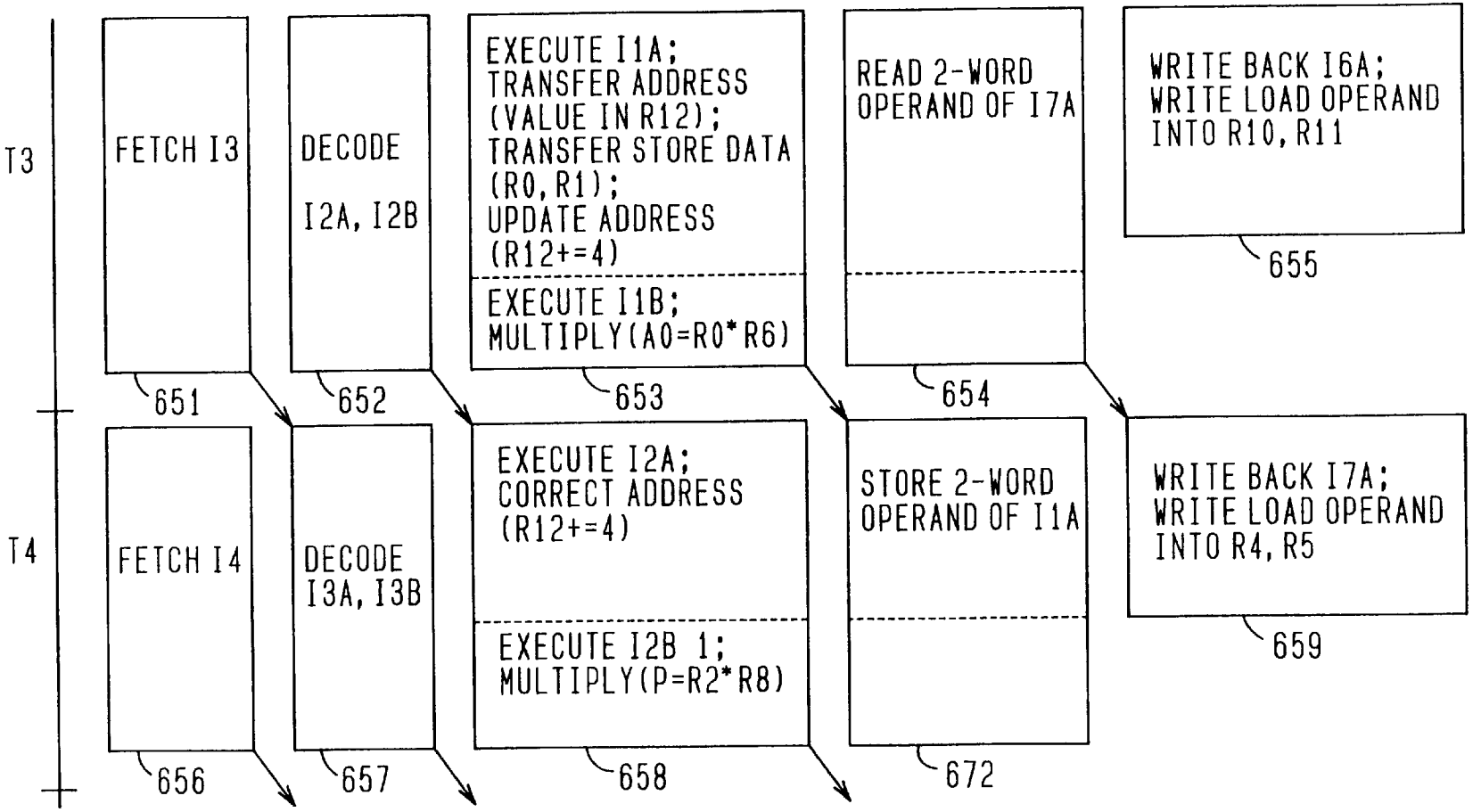
Figure 24C:
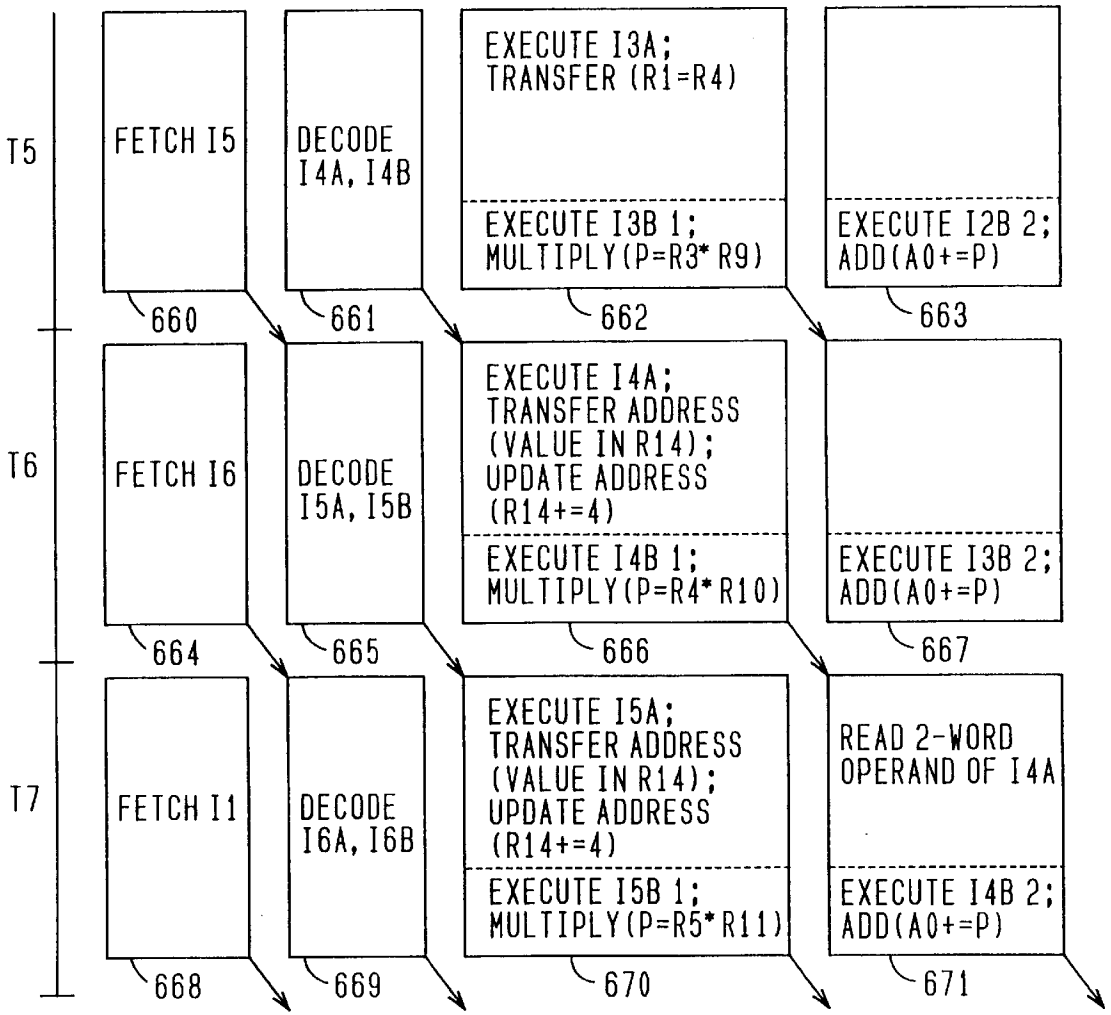

FIG. 24 (FIGS. 24A to 24C) illustrates a flow of processing within the loop wherein the pipeline stages are depicted as the abscissa with time as the ordinate. All instructions are stored in the internal instruction memory 103, and all operand data are stored in the internal data memory 105. One clock cycle is required to complete the processing at one stage. During the repeat processing continued, T1 follows T7. As is the case with the above described FIR filter, the fetched data are referred to at least 2 cycles later. The instruction at 611 directs that multiplication is executed simultaneously as two words are stored for data updating. The MV2W instruction directs that the contents of data are transferred every two word at a time (at 643) so that the same register number is used each time the loop is repeated. The value in the register R4 loaded at 659 during T4 period and the value in the register R10 loaded at 655 during T3 period are multiplied together at 666 during T6 period, and the value in the register R5 loaded at 659 during T4 period and the value in the register R11 loaded at 655 during T3 period are multiplied together at 670 during T7 period. Such processing allows 7 cycles to be required to implement the processing of the second-order direct-form type-II IIR filter at one stage.

An example of IFFT (inverse fast Fourier transform) is described below. Unit processing is as follows:

```
tmp__r=(b__r * c__r)-(b__i * c__i);

tmp__i=(b__r * c__i)+(b__i * c__r);

A__r=a__r-tmp__r;

A__i=a__i-tmp__i;

B__r=a__r+tmp__r;

B__r=a__i+tmp__i;
```

where a and b are complex variables of input data, A and B are complex variables of output data (update data), tmp is a temporary complex variable, c is a complex constant, "__r" is a real part, and "__i" is an imaginary part.

FIG. 25 illustrates an example of a program in a loop part when two unit processings of the IFFT form one loop. The registers R0, R1, and R2, R3 hold a and A. The registers R4 and R5 hold b. The registers R6 and R7 hold tmp. The registers R8 and R9 hold a and B. The registers R10 and R11 hold c. The even-numbered registers hold the real part, and the odd-numbered registers hold the imaginary part. The register R12 holds the address of a. The register R14 holds the address of b.

The symbol "msu" indicates the multiply-subtract instruction which directs that the result of multiplication is subtracted from the accumulator. This is because the square of i (complex number) equals −1.

In this case, 15 cycles are required to implement two unit processings with respect to two pairs of complex numbers. The thirty sub-instructions include four 2-word load instructions, four 2-word store instructions, four additions, four subtractions, four multiplications, two multiply-add operations, two multiply-subtract operations, four rounding instructions, and two 2-word transfer instructions, providing very high efficiency of operations.

FIG. 26 illustrates an example of a program in a loop part of a subtract-absolute-add operation. An absadd instruction directs that the specified register value is applied from the register file 115 to the low-order positions of the shifter 205 through the S5 bus 305. The shifter 205 performs sign extension on the value into 40 bits but does not shift the value to apply the value to the B latch 203. The value is subjected to the operation with the value in the accumulator 208 specified by the ALU 201, and the result of the operation is written back to the accumulator 208. The ALU 201 performs addition when the value in the B latch 203 is positive, and performs subtraction when the value is negative. The subtraction is implemented by inverting the data and providing a carry to the least significant bit. In this manner, one clock cycle is required to implement the absolute-add operation.

Figure 27:
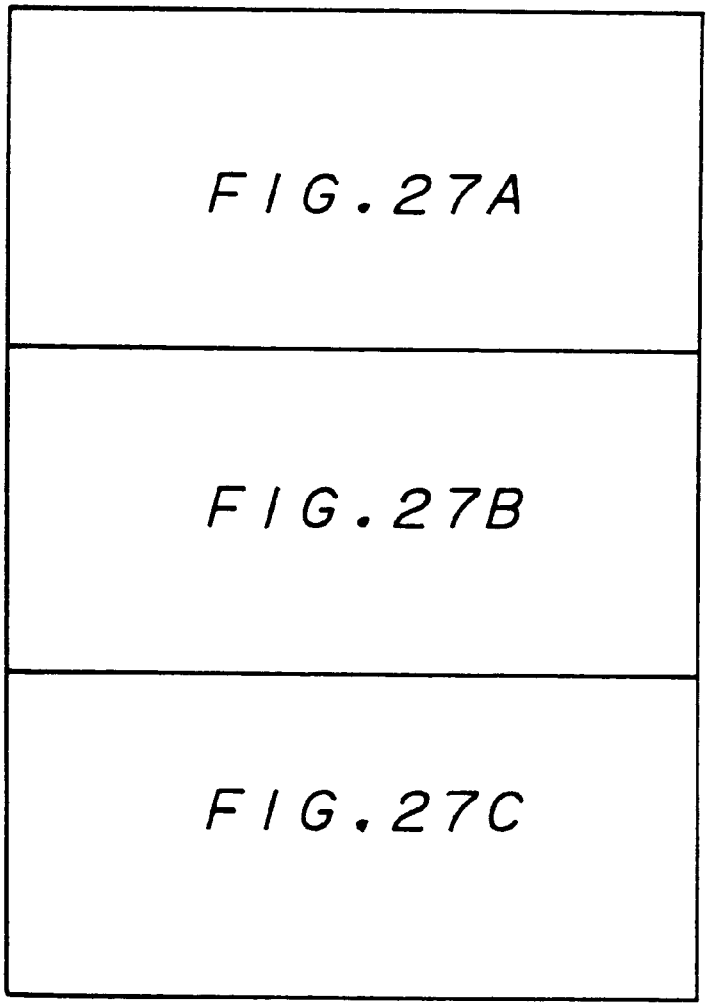
FIG. 27 shows respective positions of FIGS. 27A to 27C.
Figure 27A:
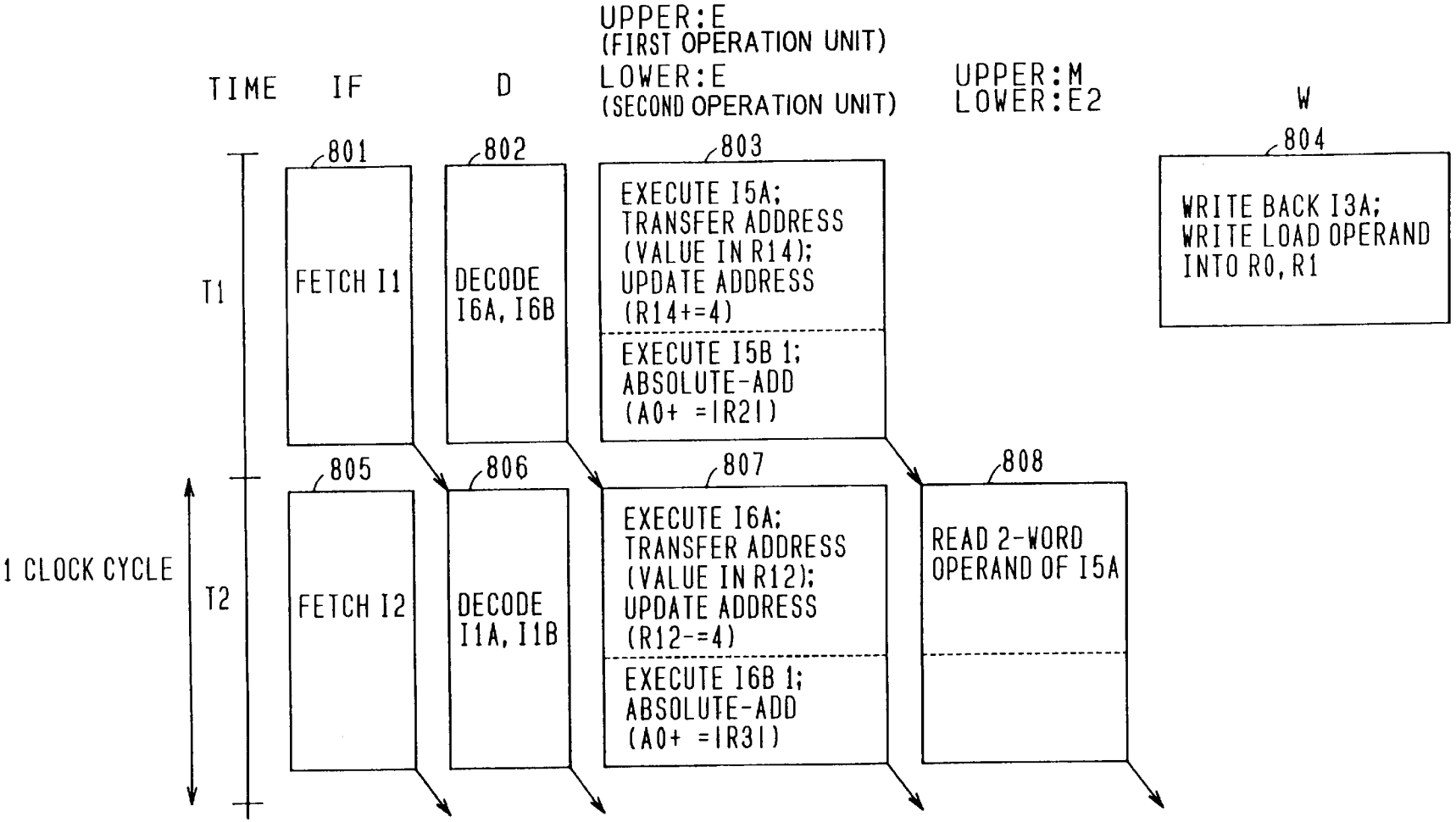
FIGS. 27A to 27C illustrate a flow of processing in the loop of the program of the ubtract-absolute-add operation for the data processor according to the first preferred embodiment of the present invention.
Figure 27B:
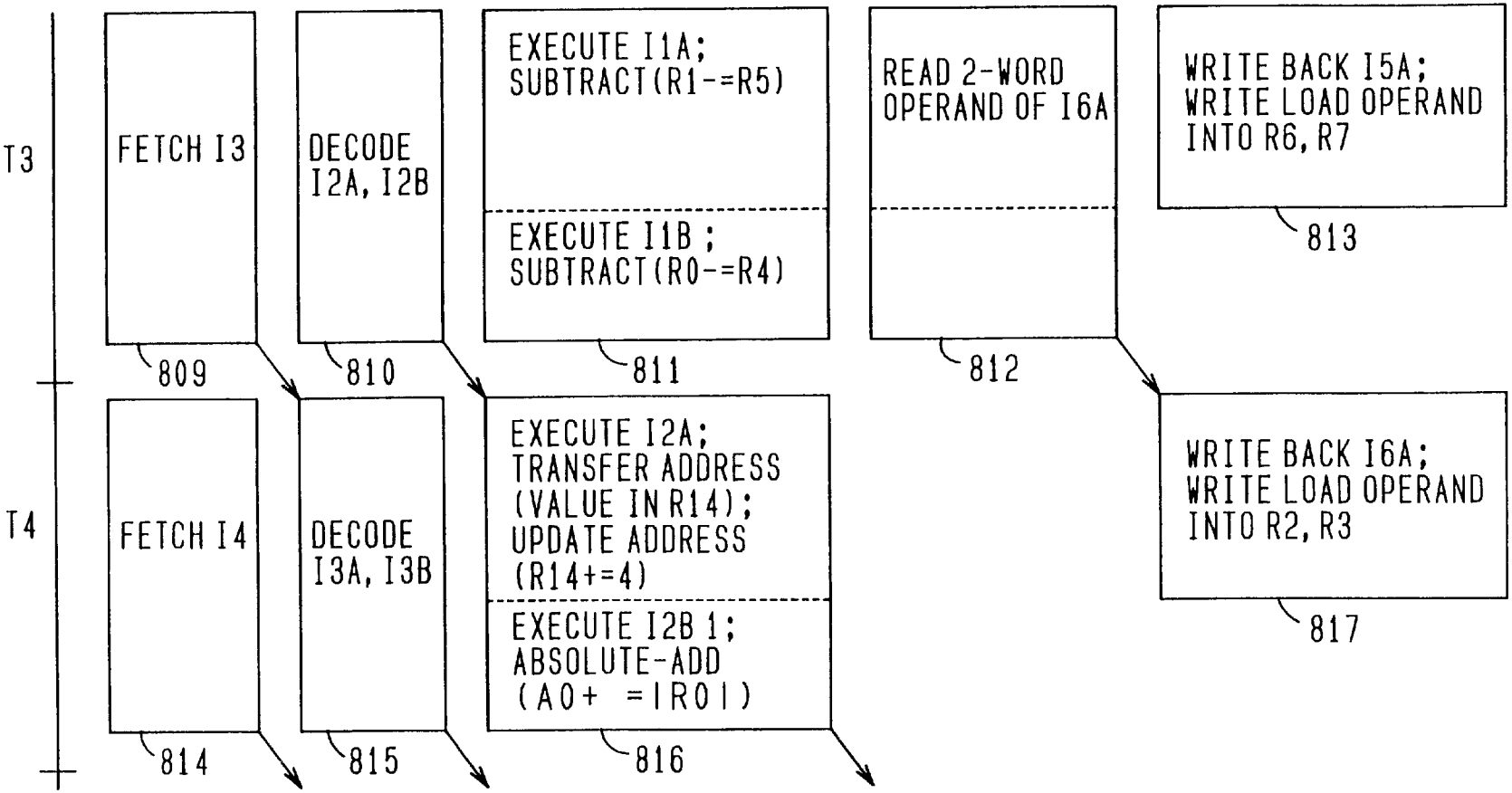
Figure 27C:
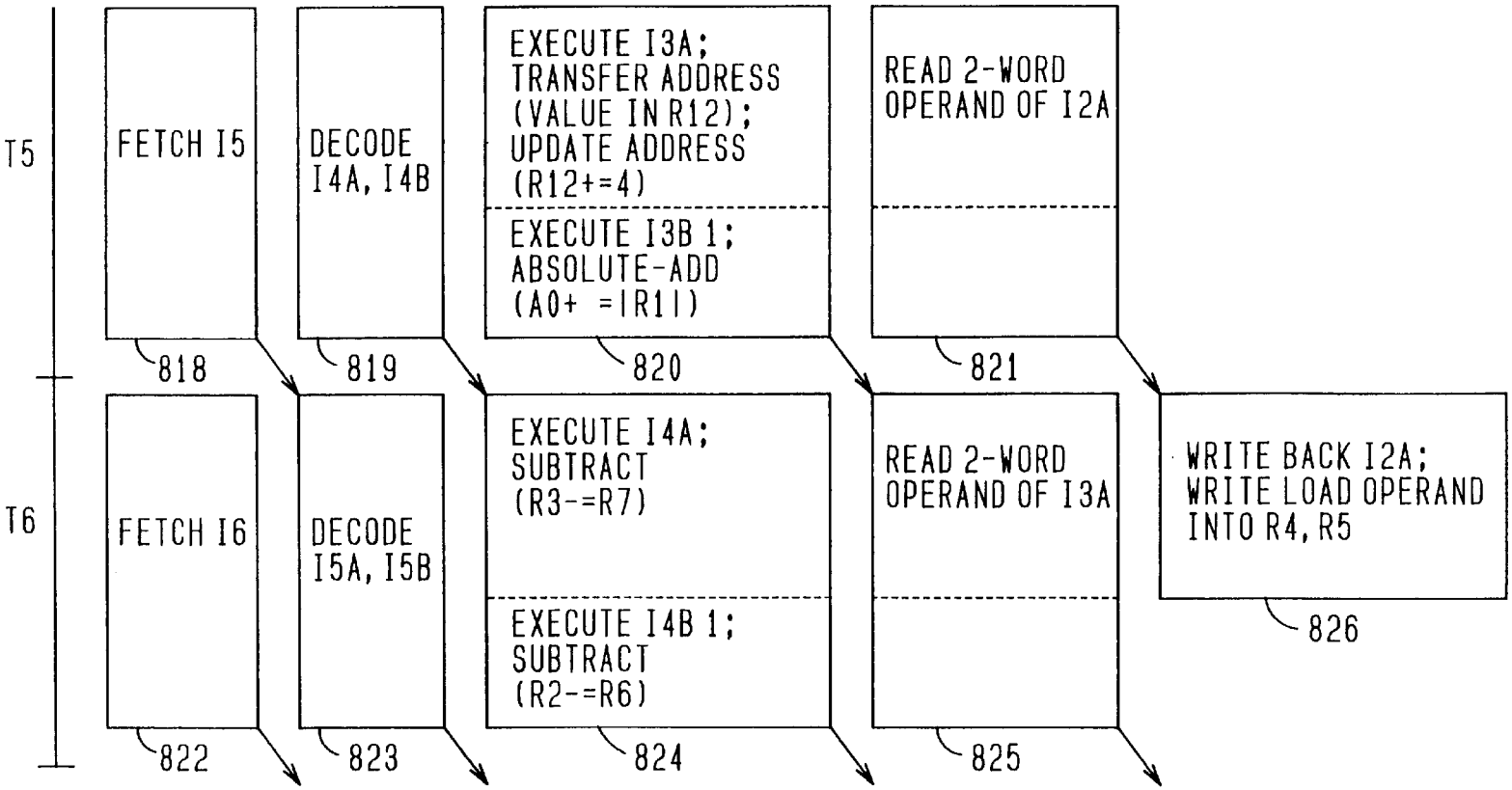

FIG. 27 (FIGS. 27A to 27C) illustrates a flow of processing in the loop. The 2-word load instruction is executed in parallel with the absolute-add instruction of the result of subtraction. During T3 cycle, data are loaded to the registers R6 and R7 in response to the LD2W instruction of I5a (813). Then, during T4 cycle, data are loaded to the registers R2 and R3 in response to the LD2W instruction of I6a (817). During T6 cycle, the value in the register R7 is subtracted form the value in the register R3 in response to the instruction indicated by I4a, and the result of subtraction is written back to the register R3. Further, the value in the register R6 is subtracted from the value in the register R2 in parallel in response to the instruction indicated by I4b, and the result of subtraction is written back to the register R2 (824). In this manner, four subtract-absolute-add operations are implemented in 6 cycles.

Second Preferred Embodiment

Figure 28:
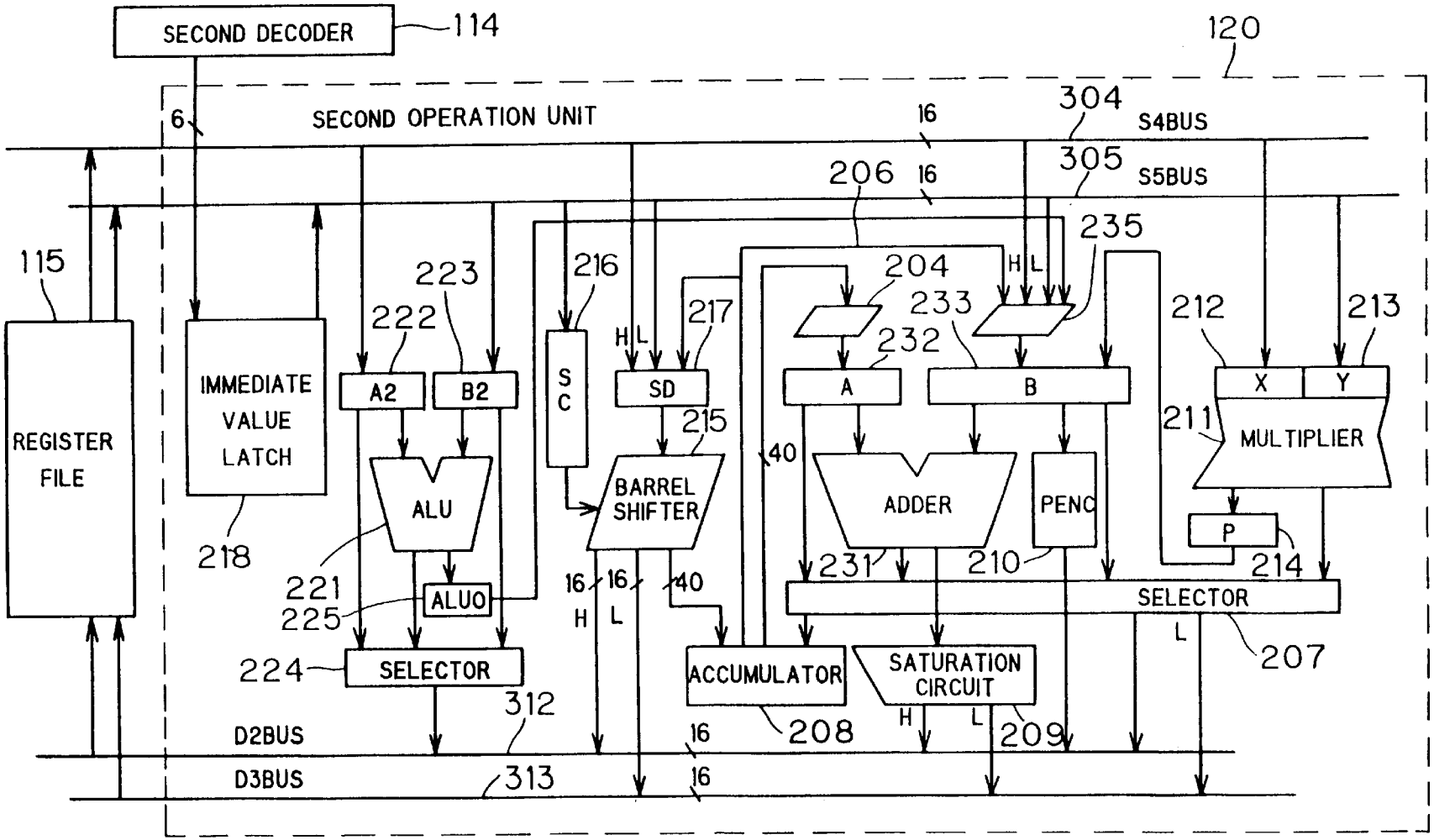
FIG. 28 is a detailed block diagram of the second operation unit for the data processor according to a second preferred embodiment of the present invention.

FIG. 28 is a block diagram of a second operation unit 120 for the data processor according to a second preferred embodiment of the present invention corresponding to the second operation unit 117 of the first preferred embodiment. Other units of the data processor of the second preferred embodiment are similar in construction to those of the first preferred embodiment. The second operation unit 120 differs from the second operation unit 117 of the first preferred embodiment in that it includes an ALU 221 operable independently of an adder 231 for performing the multiply-add operation. This allows the execution of the addition and subtraction of the multiply-add/multiply-subtract instructions and other arithmetic and logic operations without interference of hardware.

The ALU 221 performs a 16-bit arithmetic and logic operation. An A2 latch 222 connected to the S4 bus 304 and a B2 latch 223 connected to the S5 bus 305 are input latches for the ALU 221. An ALUO latch 225 is an output latch for the ALU 221. A selector 224 selects the output from the ALU 221, the value in the A2 latch 222, or the value in the B2 latch 223 to write back the selected value to the register file 115 through the D2 bus 312. The output from the ALUO latch 225 may be set to the low-order positions and subjected to sign extension by a shifter 235. A B latch 233 selectively receives the output from the shifter 235 or the value in the P latch 214 serving as the output latch of the multiplier 211. An A latch 232 receives data from the accumulator 208 through the shifter 204. Other elements of the second operation unit 120 are substantially identical with those of the second operation unit 117 of the first preferred embodiment.

Figure 31:
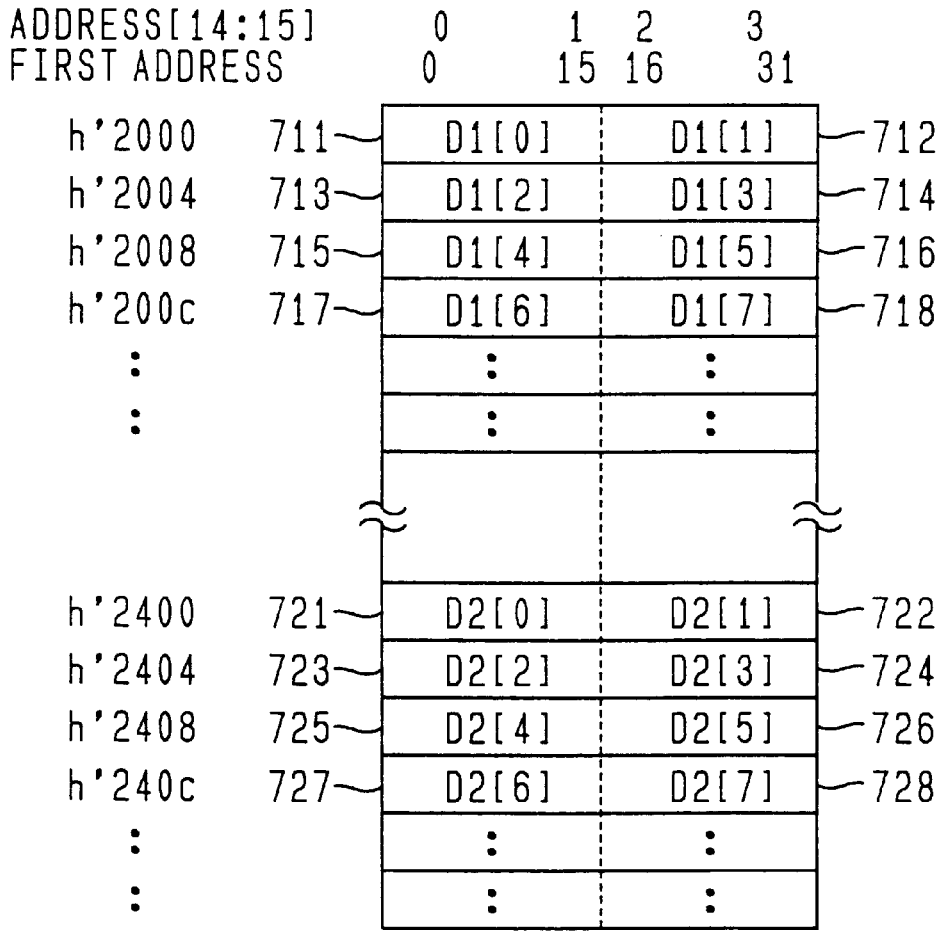
FIG. 31 illustrates mapping of the internal data memory in relation to data in the program of the subtract-square-add operation for the data processor according to the second preferred embodiment of the present invention.

An example of processing is described below. FIG. 29 illustrates an exemplary program of a subtract-square-add operation. Initialization is performed at 701, the loop processing at 702, and the post-processing at 703. FIG. 30 illustrates the contents of the internal instruction memory corresponding to the loop part. The subtract-square-add operation of D1[i] and D2[i] is performed. The register R12 holds the address of D1[i], and the register R14 holds the address of D2[i]. The registers R0 to R3 hold the data D1[i], and the registers R4 to R7 hold the data D2[i]. All instructions are executed in parallel. Six cycles are required to execute the processing four times. FIG. 31 illustrates mapping of the internal data memory with respect to the data. The respective data are 16 bits in length. The data D1[i] and D2[i] are stored in different areas.

Figure 32:
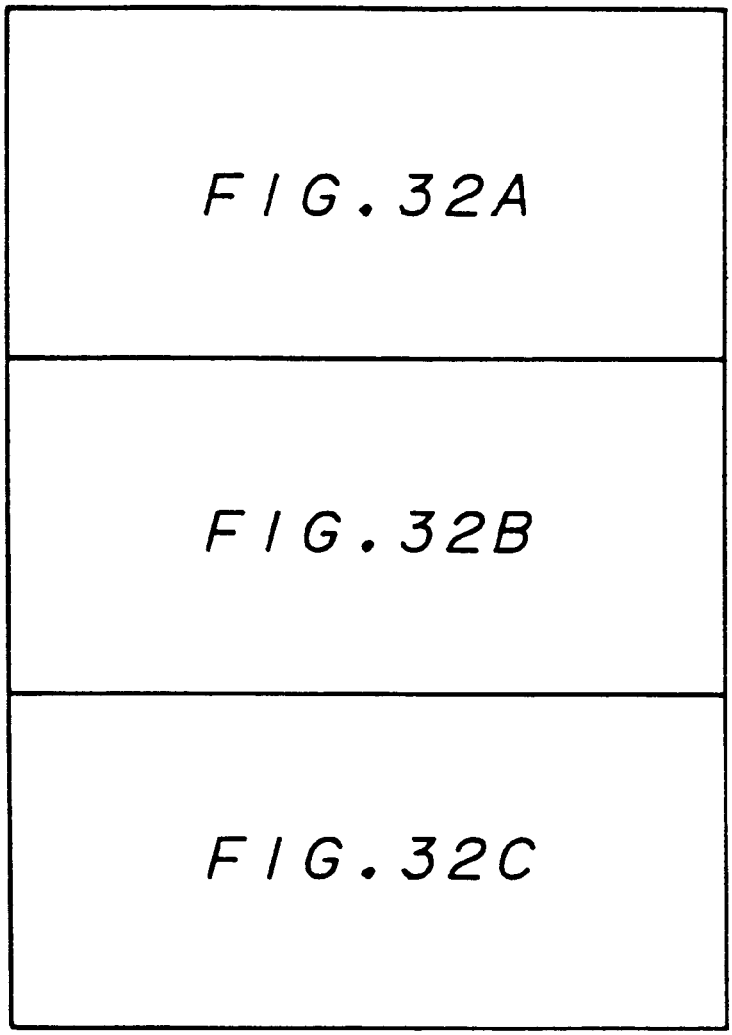
FIG. 32 shows respective positions of FIGS. 32A to 32C.
Figure 32A:
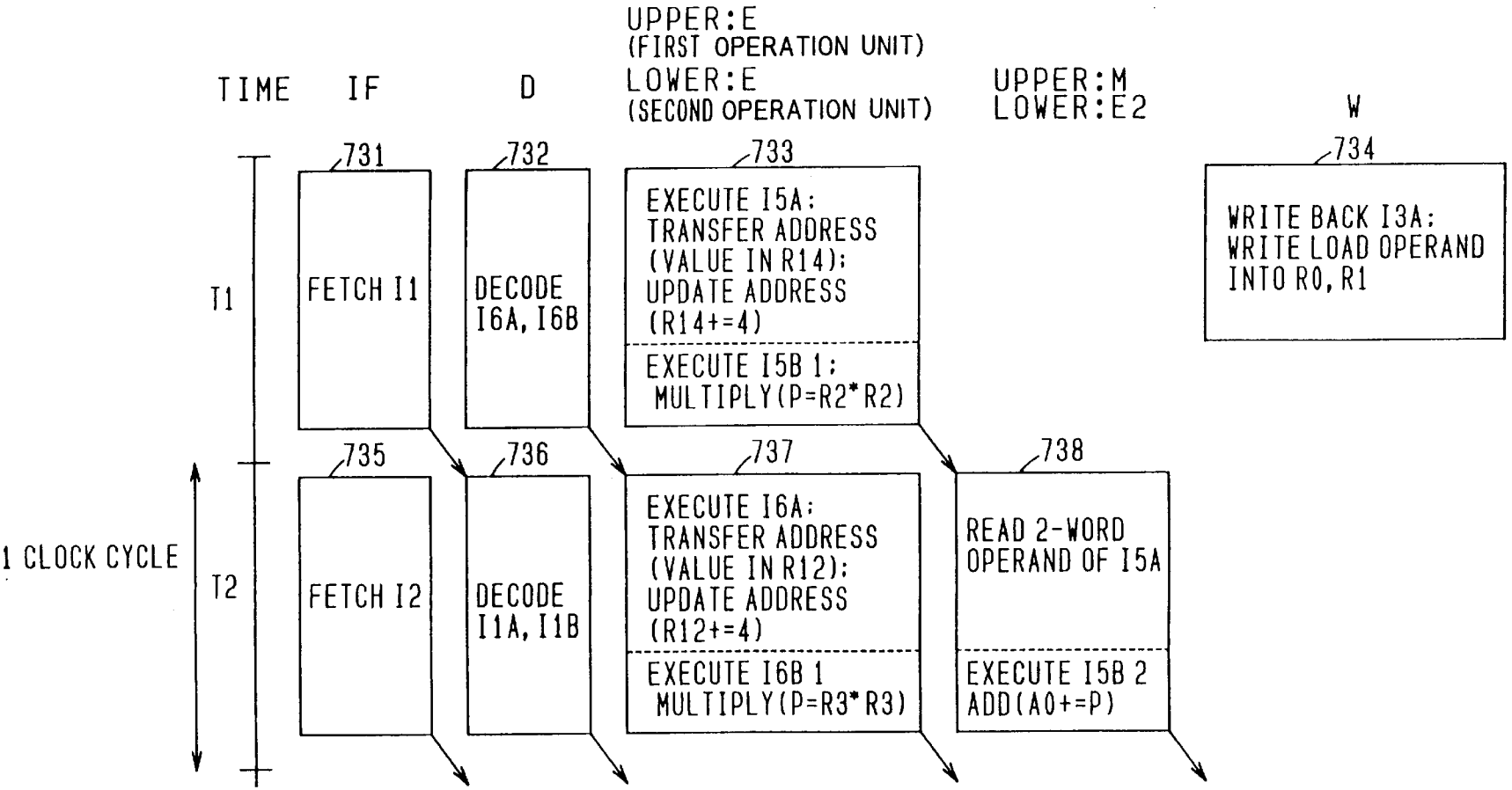
FIGS. 32A to 32C illustrate a flow of processing in the loop of the program of the subtract-square-add operation for the data processor according to the second preferred embodiment of the present invention.
Figure 32B:
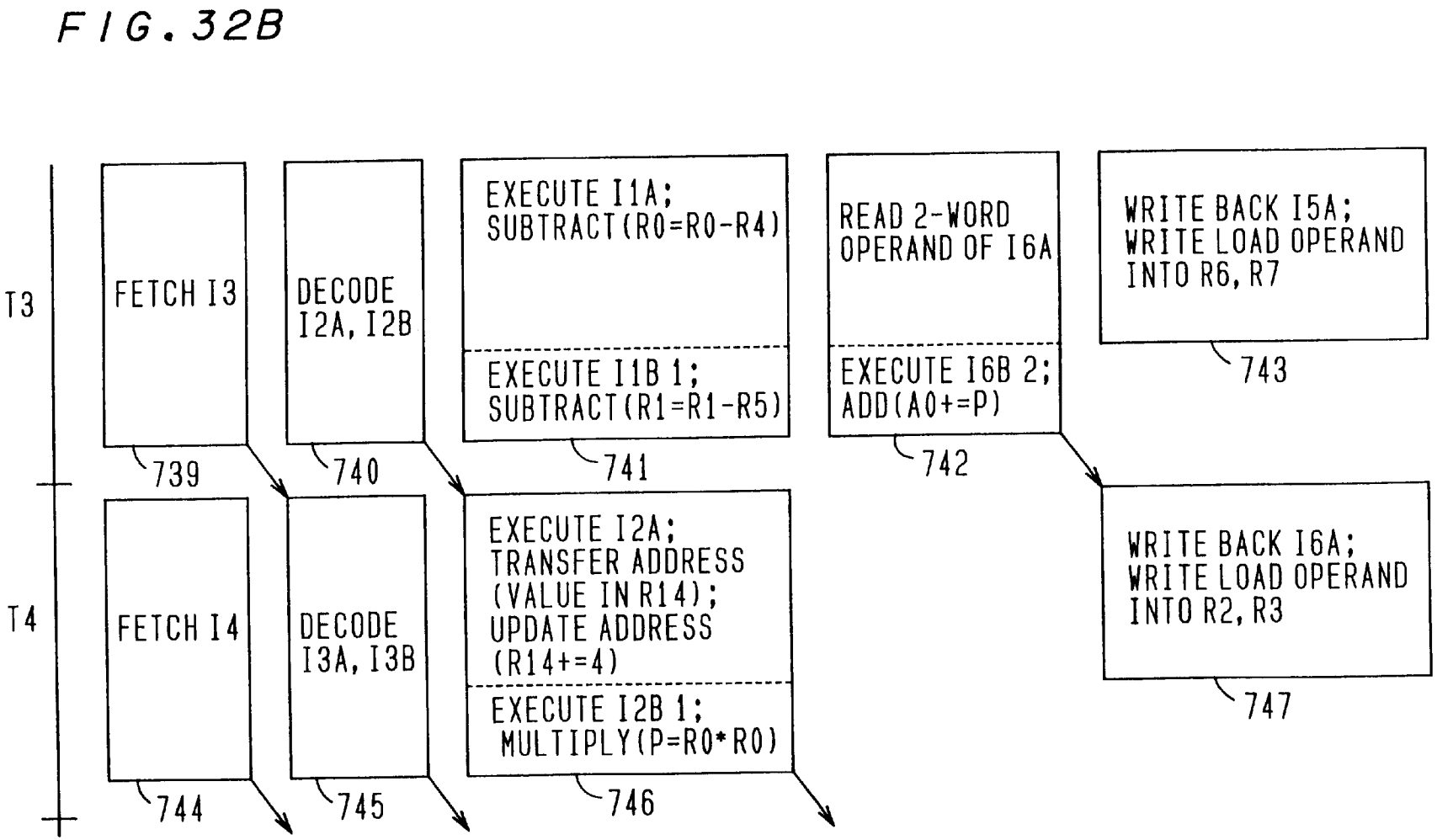
Figure 32C:
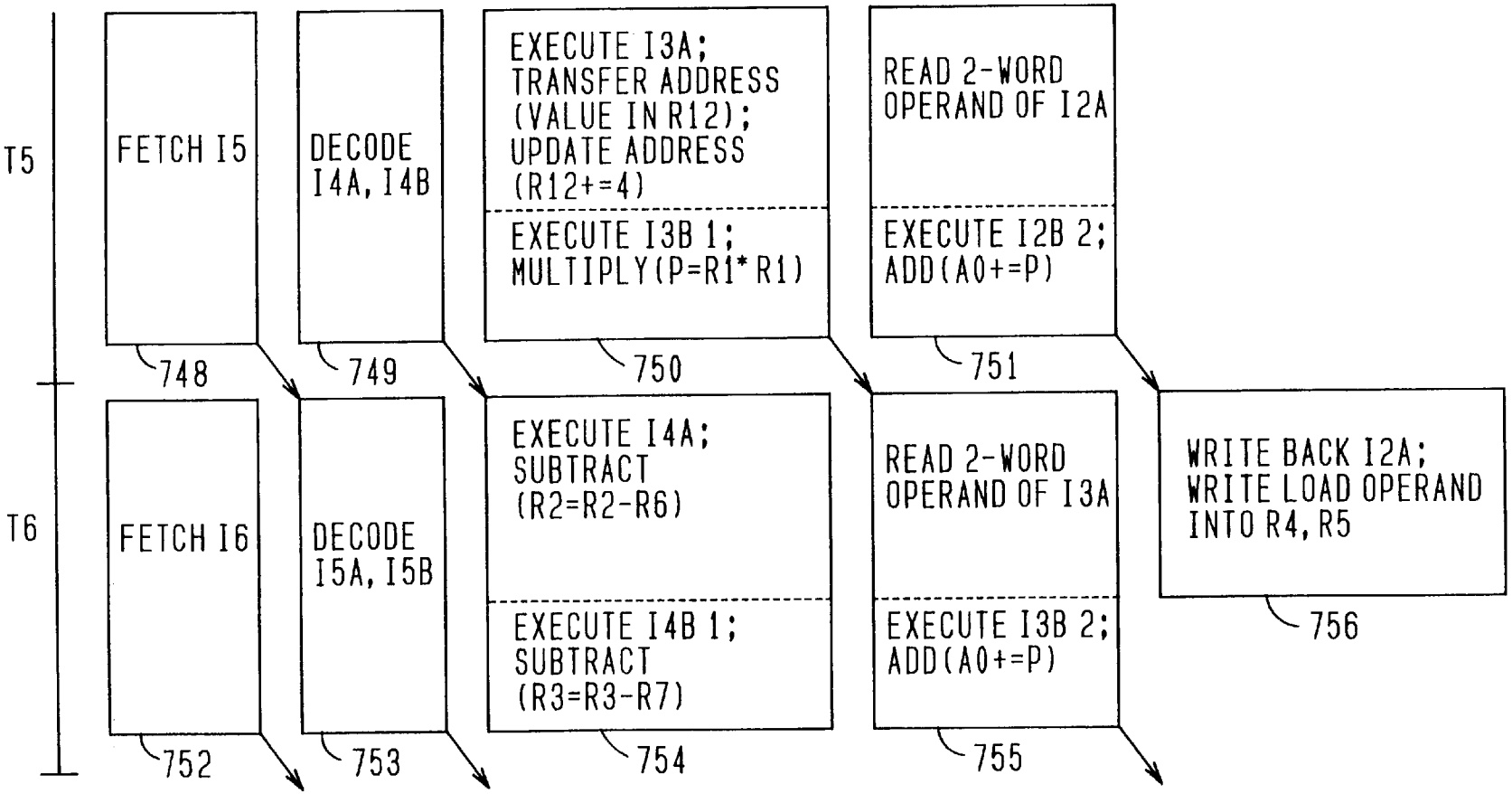

FIG. 32 (FIGS. 32A to 32C), illustrates a flow of processing in the loop. For example, the adder 231 and the ALU 221 execute the addition (746) of the multiply-add operation and the subtraction (745) for determining the difference in parallel during T6 period.

The data processor of the second preferred embodiment may more efficiently process the subtract-absolute-add operation described in the first preferred embodiment. FIG. 33 illustrates the contents of the internal instruction memory corresponding to the loop part. The register R12 holds the address of a first data array, and the registers R0 to R5 hold the data thereof. The register R14 holds the address of a second data array, and the registers R6 to R11 hold the data thereof. An daadd instruction is an instruction for determining the subtract-absolute-add operation, and the result of the operation is held in the accumulator. This instruction, like the multiply-add operation instruction, directs that two-stage pipeline processing is executed.

Figure 34:
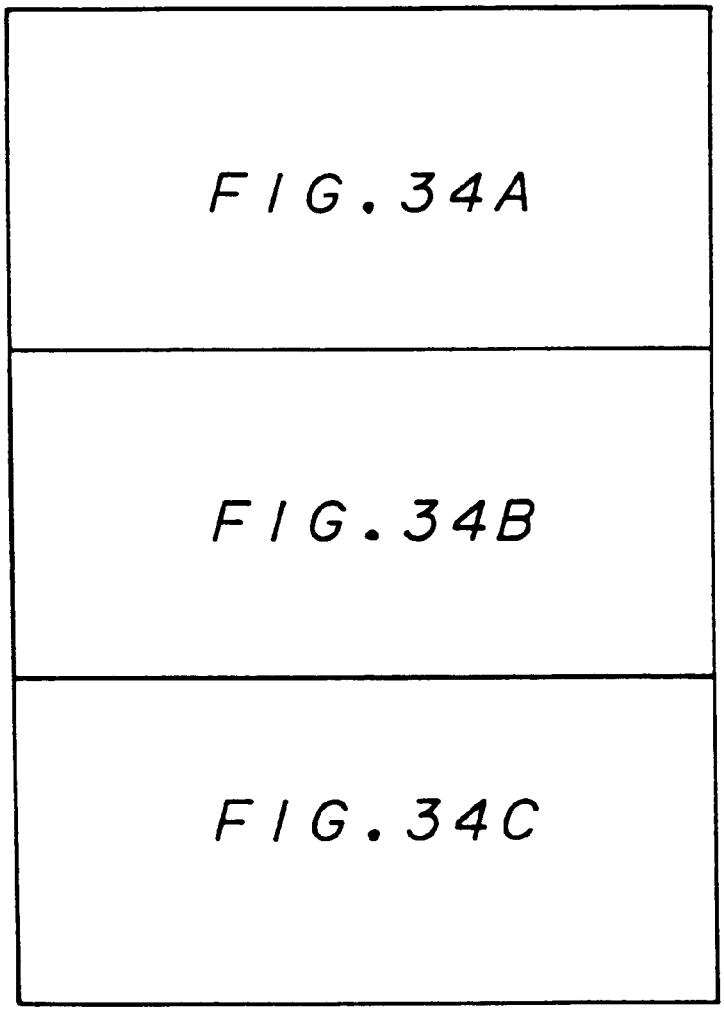
FIG. 34 shows respective positions of FIGS. 34A to 34C.
Figure 34A:
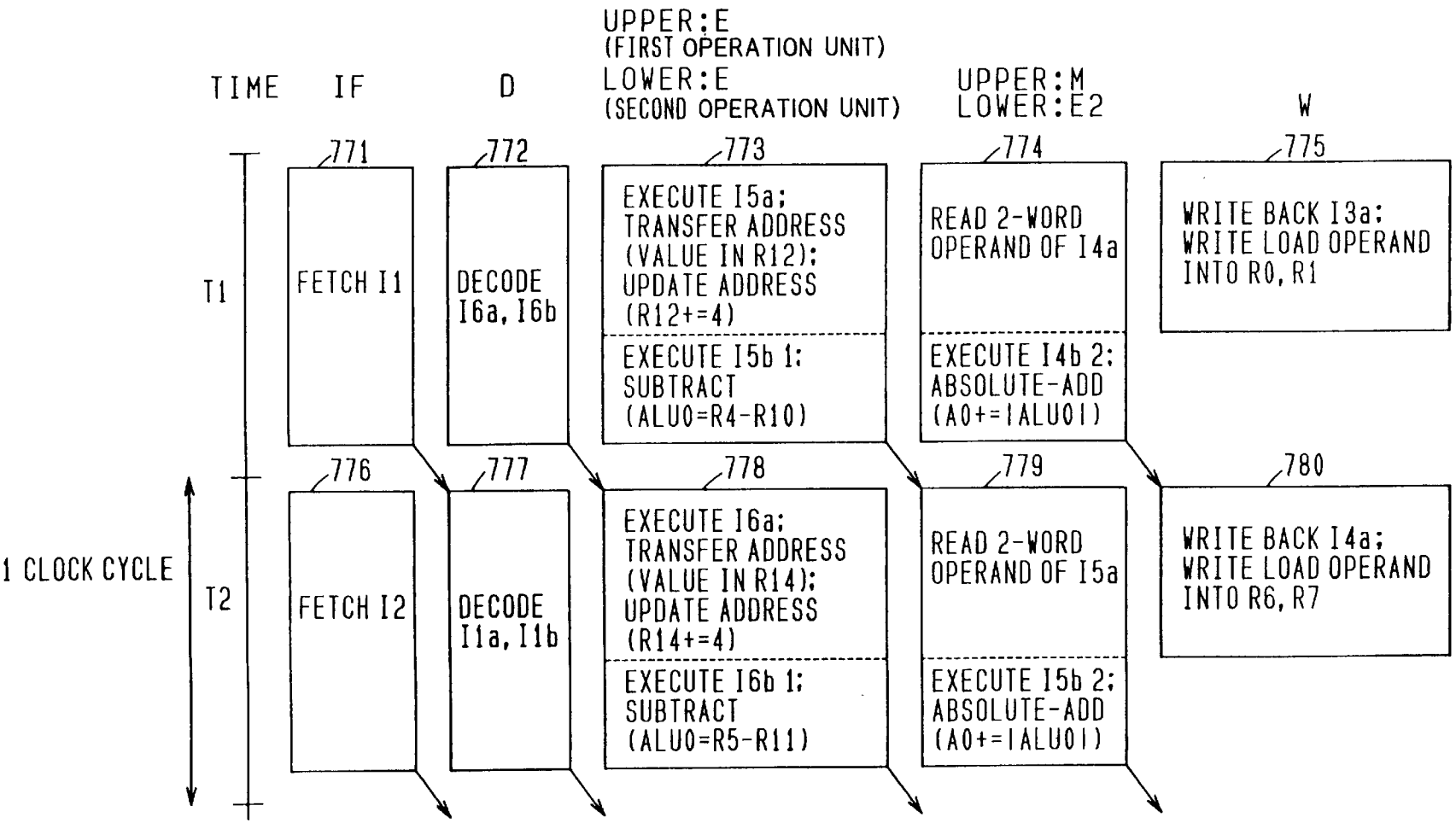
FIGS. 34A to 34C illustrate a flow of processing in the loop of the program of the subtract-absolute-add operation for the data processor according to the second preferred embodiment of the present invention.
Figure 34B:
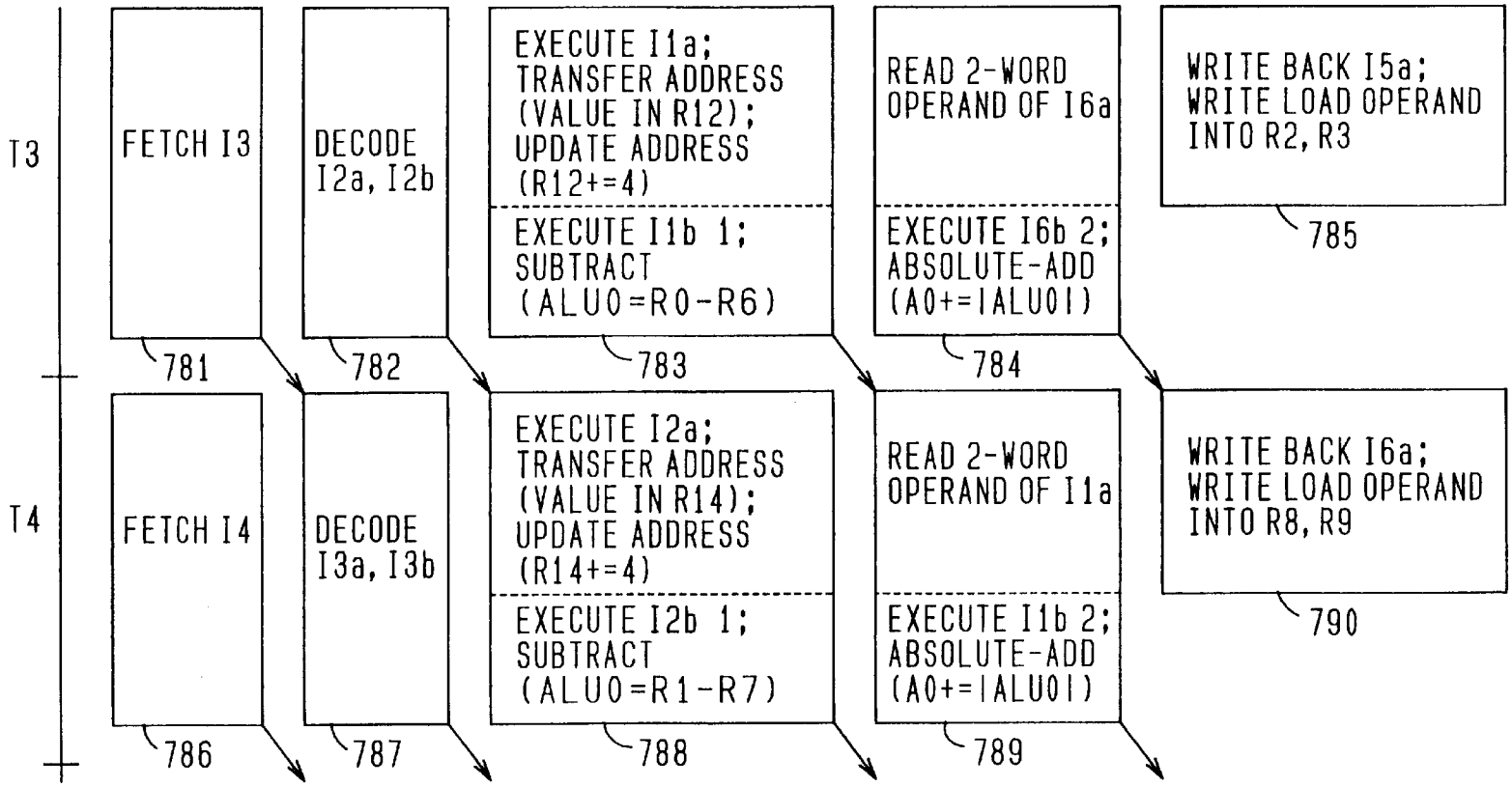
Figure 34C:
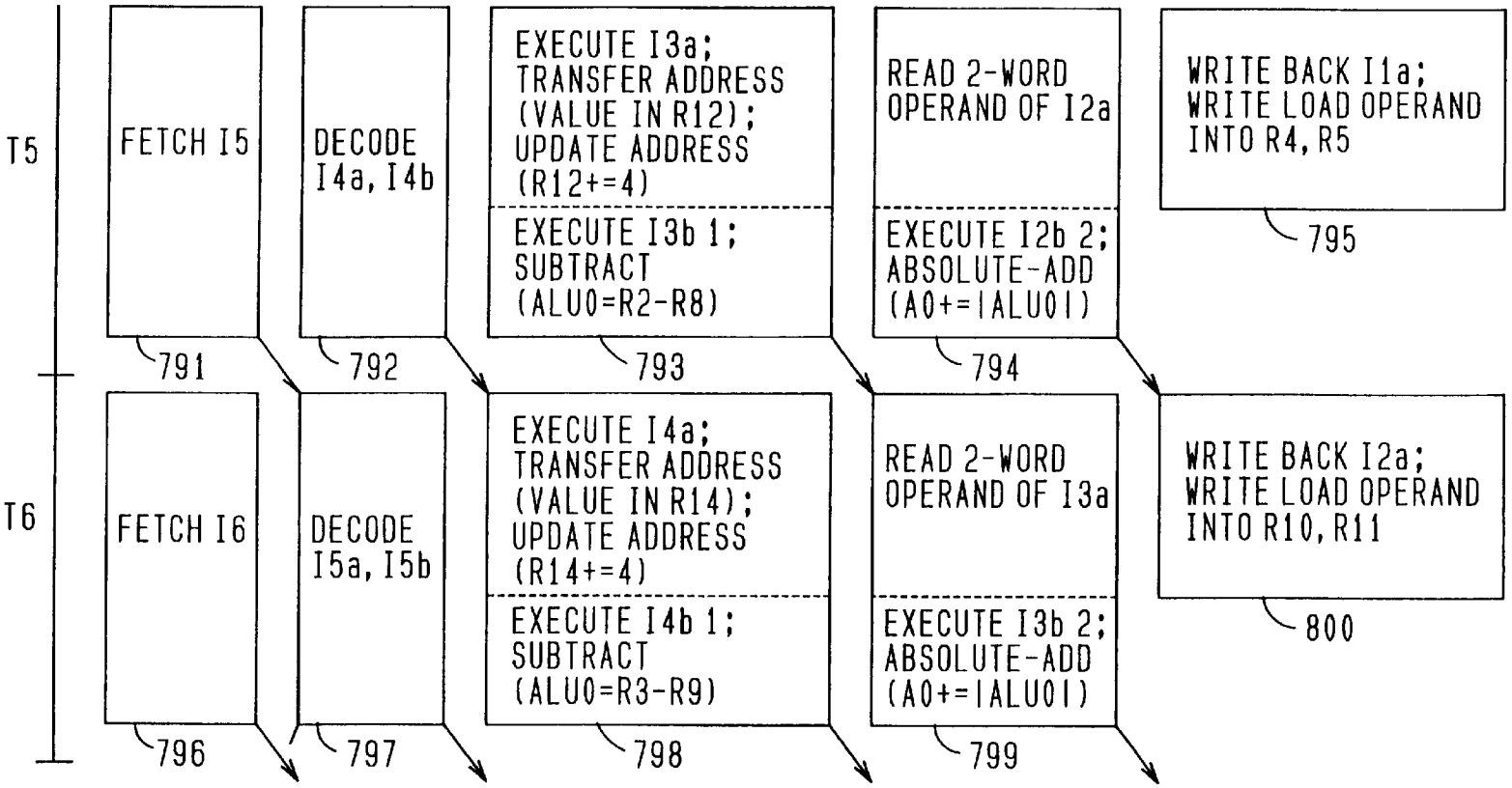

FIG. 34 (FIGS. 34A to 34C) illustrates a flow of processing in the loop. The processing conditions in FIG. 34 are substantially similar to those in the case of the FIR filter described in the first preferred embodiment. The subtract-absolute-add operation is executed in FIG. 34 in place of the multiply-add operation. That is, multiplication is replaced with subtraction, and the addition is replaced with the absolute-add operation. In this manner, the throughput of the processing is such that one subtract-absolute-add operation is executed per cycle.

Third Preferred Embodiment

Figure 35:
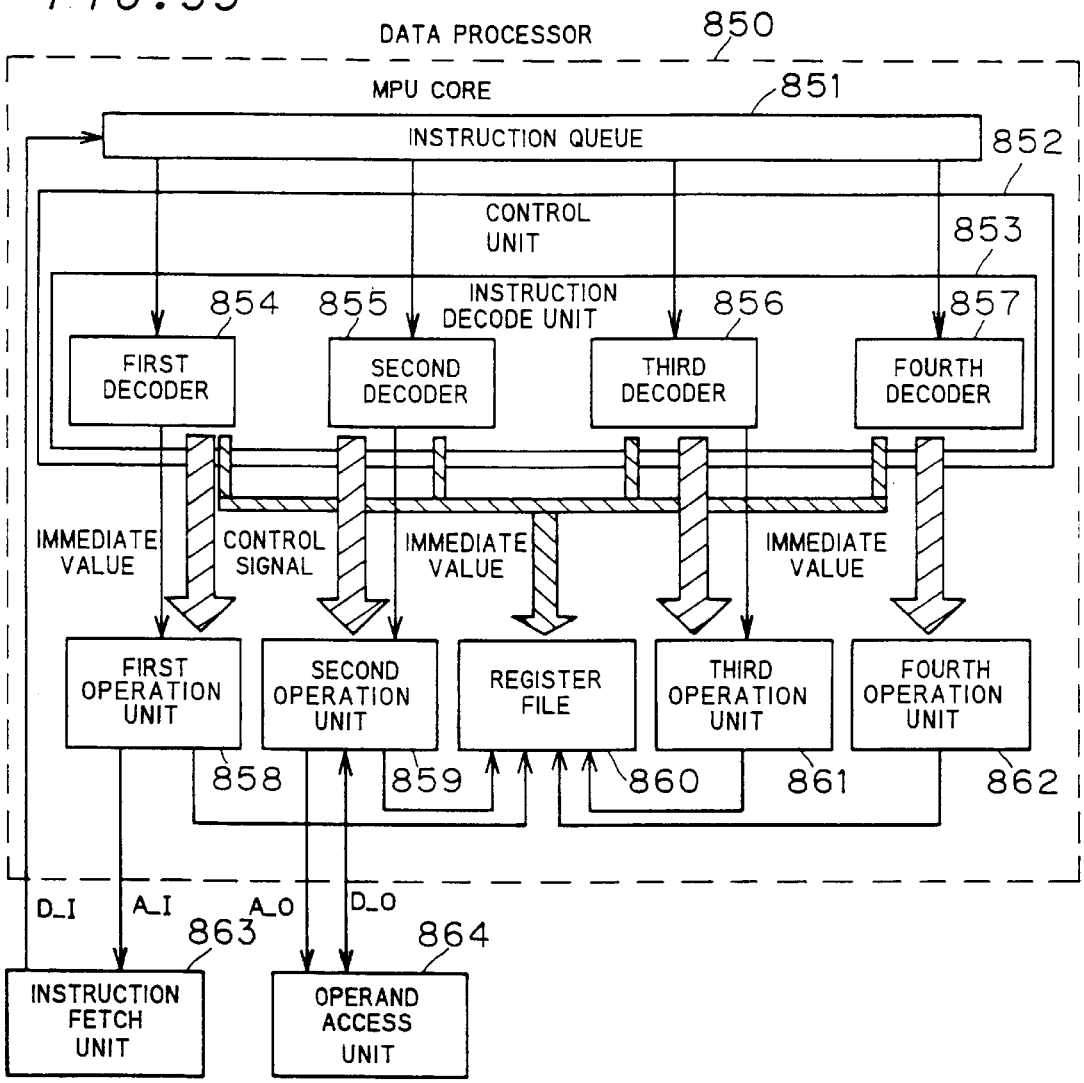
FIG. 35 is a functional block diagram of the data processor according to a third referred embodiment of the present invention.

FIG. 35 is a functional block diagram of the data processor according to a third preferred embodiment of the present invention. An MPU 850 is an MPU core. An instruction fetch unit 863 and an operand access unit 864 are substantially similar to the instruction fetch unit 102 and operand access unit 104 of the data processor of the first preferred embodiment. The instruction data which are 64 bits in length are applied to the instruction fetch unit 863. The bus interface unit and the like are not shown in FIG. 35.

The MPU core 850 comprises an instruction queue 851, a control unit 852, a register file 860, a first operation unit 858, a second operation unit 859, a third operation unit 861, and a fourth operation unit 862. The instruction queue 851 is an FIFO-controlled instruction buffer for holding a maximum of two 64-bit instructions. The first operation unit 858 includes an incrementor, a decrementor, and an adder and performs management of the PC value, calculation of the branch target address, and repeat control. The second operation unit 859 includes an ALU and an alignment circuit and performs operand address generation, updating of the pointer, arithmetic and logic operations, transfer, comparison, holding and alignment of loaded data, and holding and alignment of data to be stored. The third operation unit 861 includes an ALU and a shifter, and performs operation processing such as arithmetic and logic operations, transfer, comparison and shift. The fourth operation unit 862 includes a multiply-add operation unit, a shifter, and an accumulator, and mainly performs the multiply-add and multiply-subtract operations and accumulator shift. In this manner, the MPU core 850 has the four independent [arithmetic] *operation* units connected to the register file.

Figure 36:
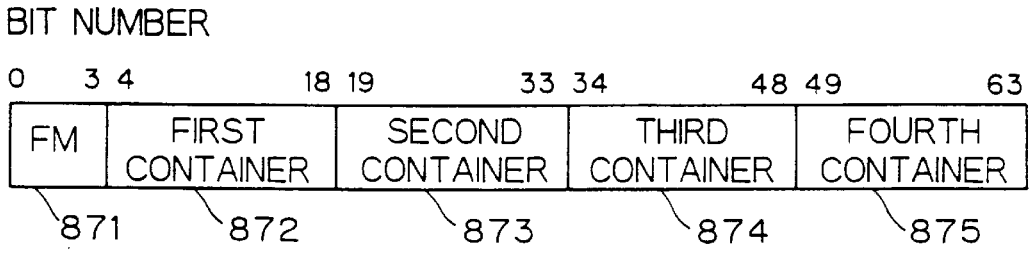
FIG. 36 illustrates an instruction format for the data processor according to the third preferred embodiment of the present invention.

The control unit 852 includes an instruction decode unit 853. The instruction decode unit 853 has four decoders. FIG. 36 illustrates an instruction format processed by the data processor of the third preferred embodiment. FM bits 871 having a 4-bit format are divided into two 2 bits for specifying the formats of the combination of first and second containers 872 and 873 and the combination of third and fourth containers 874 and 875 in the same manner as in the data processor of the first preferred embodiment. Each of the first to fourth containers 872 and 875 is expressed in 15 bits.

The first decoder 854 mainly decodes the operation code of the first container 872 to produce control signals for the register file 860 and first operation unit 858. The branch instruction is mainly specified in the field of the first container 872. The second decoder 855 mainly decodes the operation code of the second container 873 to produce control signals for the register file 860 and second operation unit 859. The load/store instruction, arithmetic and logic operation instruction, transfer instruction, and comparison instruction are mainly specified in the field of the second container 873. The third decoder 856 mainly decodes the operation code of the third container 874 to produce control signals for the register file 860 and third operation unit 861. The arithmetic and logic operation instruction, transfer instruction, comparison instruction, and shift instruction are mainly specified in the field of the third container 874. The fourth decoder 857 mainly decodes the operation code of the fourth container 875 to produce control signals for the register file 860 and fourth operation unit 862. The multiply-add operation instruction is mainly specified in the field of the fourth container 875.

Such an arrangement allows greatly sophisticated parallel processing. The present invention is applicable also in such a case. For example, to execute the subtract-square-add operation, the second, third, and fourth operation units 859, 861, 862 may execute the load, subtraction, and absolute-add operation in parallel, respectively, to provide the throughput of processing such that one subtract-square-add operation is executed per cycle. Similarly, the IFFT processing is also executed at high speeds. According to the present invention, the number of arithmetic units is not limited but may be determined on the basis of a trade-off between required performance and costs. If the throughput of data transfer is insufficient, four words should be transferred in parallel. If the number of registers is insufficient, the number of registers should be increased which requires the increase in bit length.

For improvement in the throughput of the multiply-add operation, a plurality of operation units should have multiply-add operation units to increase the number of operands to be transferred. The present invention is also applicable in this case.

Fourth Preferred Embodiment

Figure 37:
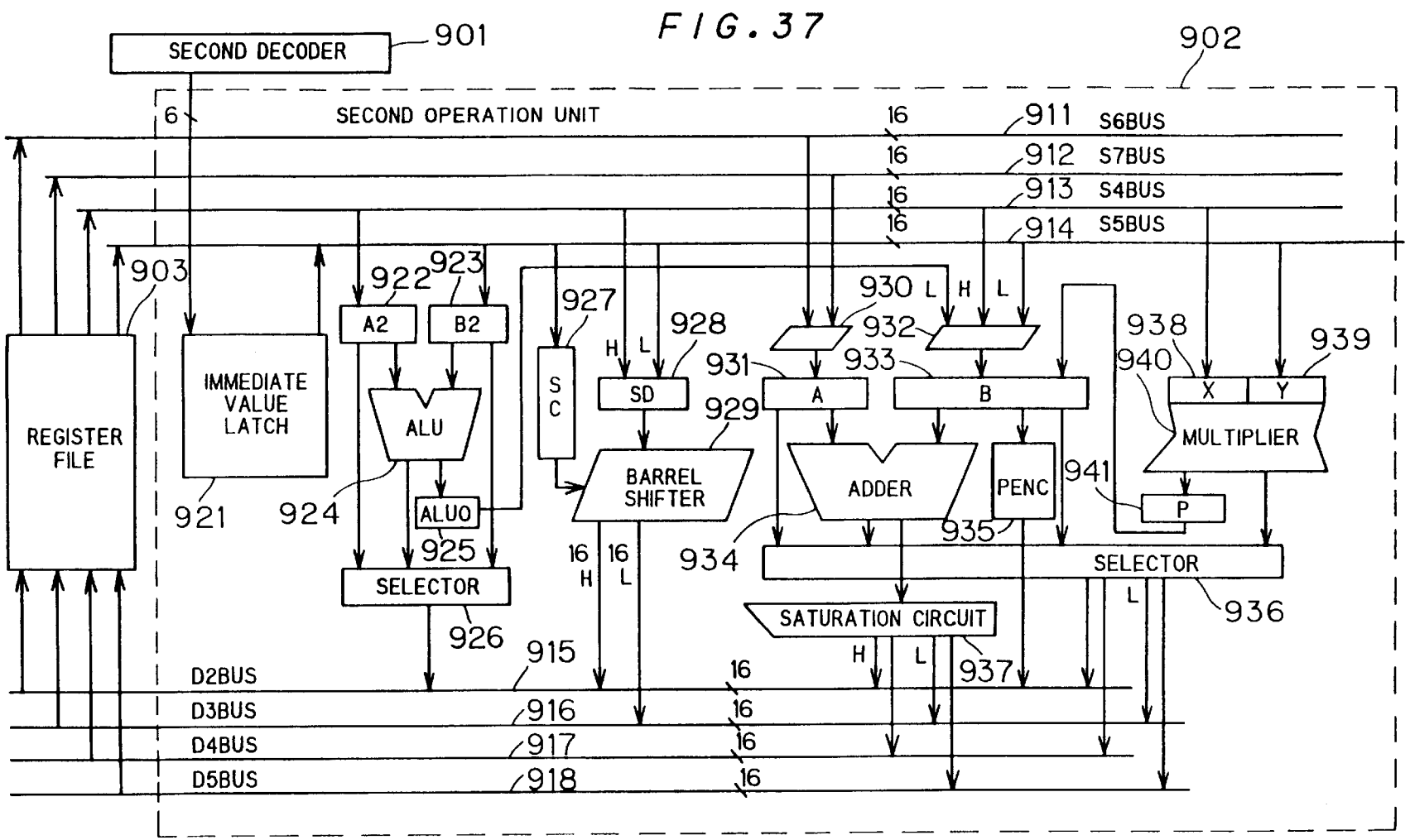
FIG. 37 is a block diagram of the second operation unit for the data processor according to a fourth preferred embodiment of the present invention.

FIG. 37 is a block diagram of the second operation unit 120 of the data processor according to a fourth preferred embodiment of the present invention corresponding to the second operation unit 117 of the data processor of the first preferred embodiment. Other units of the data processor of the fourth preferred embodiment are substantially identical in construction with those of the first preferred embodiment.

In the fourth preferred embodiment, the result of the multiply-add operation is stored in the register for each operation, and no guard bits are provided. Additional guard bits may be provided if required in terms of operation accuracy.

FIG. 38 illustrates an instruction format for the data processor of the fourth preferred embodiment wherein the instruction is 64 bits in length. The instruction comprises 2 FM bits 941, a 31-bit left-hand container 942, and a 31-bit right-hand container 943. FIG. 39 illustrates a basic format of each container which is basically a 3-operand format including three fields: two source register number specification fields 946 and 947, and one destination register number specification field 945. There are provided 64 registers, and the register number is specified in a 6-bit field.

The basic pipeline processing of the fourth preferred embodiment is similar to that of the first preferred embodiment, and the description thereof will be dispensed with. An S4 bus 913, an S5 bus 914, a D2 bus 915, and a D3 bus 916 operate at the E stage 403. These buses mainly transfer operand values of an ordinary integer operation instruction and the like. An S6 bus 911, an S7 bus 912, a D4 bus 917, and a D5 bus 918 operate at the E2 stage 406. These buses mainly transfer accumulated value. An adder 934 and its input and output units operate at the E stage 403 and E2 stage 406, but other arithmetic units and latches operate at the E stage 403.

A "mac" instruction for multiply-add operation is a 3-operand instruction. The processing specifications of "mac Rdest, Rsrc1, Rsrc2" are such that the register value specified by Rsrc1 and the register value specified by Rsrc2 are multiplied together and the result of multiplication is added to the value in the pair of registers specified by Rdest. The hardware processing is described in detail. First, at the E stage 403, the register values specified by Rsrc1 and Rsrc2 are transferred from a register file 903 through the S4 bus 913 and S5 bus 914 to an X latch 938 and a Y latch 939, respectively. A multiplier 940 performs multiplication, and the P register 941 holds the result of multiplication. Then, at the E2 stage 406, the values in the pair of registers specified by Rdest is applied to an A latch 931 from the register file 903 through the S6 bus 911, the S7 bus 912, and the shifter 930. The value in the P register 941 is applied to a B latch 933. The adder 934 adds the values in the A latch 931 and B latch 933 together. The result of addition is outputted through a saturation circuit 937 to the D4 bus 917 and D5 bus 918, and written back to the pair of registers specified by Rdest in the register file 903.

FIG. 40 illustrates an example of the program in a loop part of the FIR filter. The 2-word load instruction and the multiply-add operation instruction are decoded in parallel and executed in parallel. This achieves one multiply-add operation per cycle in the same manner as in the data processor of the first preferred embodiment except that the result of the multiply-add operation is written back to the register file for each operation.

In this manner, the technique of the present invention is also effective when the cumulative result of the multiply-add operations is held in the register. The operands are not bypassed herein, but a bypass path may be provided as required.

Fifth Preferred Embodiment

In the data processor of the above described preferred embodiments, one word is assumed to be 16 bits in length. However, one word may be any number of bits in length. For example, audio processing requires about 24 bits in length, and one word may be 24 bits in length. One word may be 32 bits long in terms of alignment with a processor. In this case, the multiplier may not necessarily be of 1-word by 1-word form, but a multiplier of a size essential in terms of the accuracy of an application to be processed should be selected and implemented.

Sixth Preferred Embodiment

In the data processor of the above described preferred embodiments, the multiply-add operation is subjected to two-stage pipeline processing. However, the last addition stage of the multiplier and the adder for addition may be merged to execute the multiply-add operation in one cycle. Additionally, for high-speed operation, the multiplication may be performed by 2-stage pipeline to permit the multiply-add operation to be performed by 3-stage pipeline. Other pipelines may be freely selectable. For instance, the E stage 403 and M stage 404 may be merged into one pipeline stage for processing. Further, to improve the operating frequency, write back operation to the register may be performed in the different pipeline stage from E stage. In addition, data may be bypassed from the write path to the register, which is effective for high-speed processing.

Seventh Preferred Embodiment

In the above described preferred embodiments of the present invention, the microprocessor of VLIW architecture is illustrated as an example. However, the technique of the present invention is also applicable to a superscalar RISC processor and the like programmed if the details of hardware are noted and the conditions for parallel processing are seized. The difference is that the parallel execution is encoded in the program or the hardware determines whether or not the parallel execution is permitted. The FM bits may be absent in the VLIW architecture. The instructions may be always executed in parallel. In this case, the operation which is not executed in parallel should be set to NOP.

While the invention has been described in detail, the foregoing description is in all aspects illustrative and not restrictive. It is understood that numerous other modifications and variations can be devised without departing from the scope of the invention.

We claim:

1. A data processor comprising:

a first memory for storing an instruction including a first operation code and a second operation code;

a second memory for storing data values;

a first decoder receiving said first operation code from said first memory for decoding said first operation code;

a second decoder receiving said second operation code from said first memory for decoding said second operation code, said first and second operation codes being decoded in parallel;

a register file including a plurality of registers for storing data values to be transferred from and to said second memory;

an operation unit for receiving a first data value stored in a first register of said register file to perform an arithmetic operation using said first data value in response to a first control signal, said first control signal being a decoded result of said first operation code output from said first decoder; and an operand access unit for performing a memory access to transfer in parallel second and third data values stored in said second memory to second and third registers of said register file, respectively, in response to a second control signal, said second control signal being a decoded result of said second operation code output from said second decoder, said memory access of said operand access unit and said arithmetic operation of said operation unit are performed in parallel.

2. The data processor of claim 1, wherein said second and third data values each are n bits in length, where n is an integral number, and said second and third data values are combined together into a 2n-bits data value when said second and third data values are transferred to said register file.

3. The data processor of claim 1, wherein said operation unit comprises:

a multiplier for multiplying together a fourth data value stored in a fourth register of said register file and said first data value; and an adder for adding together at least a result from said multiplier and a value stored in said register file to cause said register file to store a result from said adder.

4. The data processor of claim 1, wherein said operation unit comprises:

a multiplier for multiplying together a fourth data value stored in a fourth register of said register file and said first data value, an accumulator for holding an accumulated data value which is a result of an operation, and an adder for adding together at least a result from said multiplier and the accumulated data value held in said accumulator to cause said accumulator to hold a result from said adder.

5. The data processor of claim 1, wherein said operation unit receives a fourth data value stored in a fourth register of said register file, said arithmetic operation in said operation unit including a multiplying operation of said first and fourth data values and an adding operation at least on a result of said multiplying operation and a fifth data stored in said register file or an accumulator provided with said operation unit;

said operand access unit causes an operand address to be applied to said second memory simultaneously with the multiplying operation of said operation unit in a first period, and causes said second and third data values to be transferred from said second memory in response to the operand address simultaneously with the adding operation of said operation unit in a second period following said first period.

6. The data processor of claim 5, wherein said operand address is stored in a fifth register of said register file and operand access unit causes said fifth register to be updated into another operand address in said first period.

7. A data processor comprising:

a first memory for storing an instruction including a first operation code and a second operation code;

a second memory for storing data values;

a first decoder receiving said first operation code from said first memory, for decoding said first operation code;

a second decoder receiving said second operation code from said first memory, for decoding said second operation code, said first and second operation codes being decoded in parallel;

a register file including a plurality of registers for storing data values to be transferred from and to said second memory;

an operation unit for receiving a first data value stored in a first register of said register file to perform an arithmetic operation using said first data value in response to a first control signal, said first control signal being a decoded result of said first operation code output from said first decoder; and an operand access unit for performing a memory access to transfer in parallel second and third data values stored respectively in second and third registers of said register file to said second memory in response to a second control signal, said second control signal being a decoded result of said second operation code output from said second decoder, said memory access of said operand access unit and said arithmetic operation of said operation unit are performed in parallel.

8. The data processor of claim 7, wherein said second and third data values each are n bits in length, where n is an integral number, and said second and third data values are combined together into a 2n-bits data value when said second and third data values are transferred to said second memory.

9. The data processor of claim 7, wherein said operation unit comprises:

a multiplier for multiplying together a fourth data value stored in a fourth register of said register file and said first data value, and an adder for adding together at least a result from said multiplier and a value stored in said register file to cause said register file to store a result from said adder.

10. The data processor of claim 7, wherein said operation unit includes a multiplier for multiplying together a fourth data value stored in a fourth register of said register file and said first data value, an accumulator for holding an accumulated data value which is a result of an operation, and an adder for adding together at least a result from said multiplier and the accumulated data value held in said accumulator to cause said accumulator to hold a result from said adder.

11. A data processor comprising:

a memory for storing data;

a first instruction decoder receiving first and second operation codes, for decoding said first and second operation codes to output first and second control signals respectively;

a second instruction decoder receiving third and fourth operation codes, for decoding said third and fourth operation codes to output third and fourth control signals, respectively, said first and third operation codes being decoded in parallel and said second and fourth operation codes being decoded in parallel;

a register file connected to said memory and including a plurality of registers each for storing at least one of data and an operand address;

an operation unit for performing an arithmetic operation on the data stored in said register file; and a memory access device operated in parallel with said operation unit for causing said operand address stored in said register file to be applied to said memory and for updating said operand address, wherein, in a first processing, first and second decoders receive said first and third operation codes respectively, and executed in parallel are processing of:

(a) said operation unit to receive first data stored in a first register of said register file to perform an arithmetic operation in response to said first control signal, and (b) said memory access device to cause a first operand address stored in a second register of said register file to be applied to said memory to cause second data stored in said memory to be transferred to a third register of said register file and to update said first operand address to write a second operand address into said second register in response to said third control signal, and wherein, in a second processing, said first and second decoders receive said second and fourth operations codes respectively, and executed in parallel are processing of:

(c) said operation unit to receive said second data stored in said third register of said register file to perform an arithmetic operation in response to said second control signal, and (d) said memory access device to cause said second operand address stored in said second register of said register file to be applied to said memory to cause third data stored in said memory to be transferred to a fourth register of said register file and to update said second operand address to write a third operand address into said second register in response to said fourth control signal, said first processing and said second processing being executed by pipeline control.

12. A method of processing data by a data processor which includes a memory for storing data, a register file connected to said memory and including a plurality of registers each for storing at least one of data and an operand address, an operation unit for receiving the data stored in said register file to perform an arithmetic operation, and a memory access device for causing the operand address stored in said register file to be applied to said memory, said method comprising the steps of:

(a) transferring, in parallel, first and second data stored in a first area of said memory to first and second registers of said register file, respectively;

(b) transferring, in parallel, third and fourth data stored in a second area of said memory to third and fourth registers of said register file, respectively;

(c) applying said first data stored in said first register and said third data stored in said third register to said operation unit to perform an arithmetic operation of said first and third data by said operation unit; and (d) applying said second data stored in said second register and said fourth data stored in said fourth register to said operation unit to perform an arithmetic operation of said second and fourth data by said operation unit.

13. The method of claim 12, further comprising the steps of:

(e) transferring, in parallel, fifth and sixth data stored in a third area of said memory to fifth and sixth registers of said register file, respectively; and (f) transferring, in parallel, seventh and eighth data stored in a fourth area of said memory to seventh and eighth registers of said register file, respectively, wherein one of the steps (c) and (d) is executed in parallel with at least one of the steps (e) and (f).

14. The method of claim 13, wherein said third area is the same as said first area, and said fourth area is the same as said second area.

15. The method of claim 12, wherein said first and second data each are n bits in length, where n is an integral number, and wherein said first and second data are combined together into 2n-bit data when said first and second data are transferred to said register file.

16. The method of claim 12, wherein the step (c) comprises the sub-steps of:

multiplying said first and third data together; and adding data stored in a ninth register to the result of multiplication to store the result of addition as ninth data in said ninth register, and wherein the step (d) comprises the sub-steps of:

multiplying said second and fourth data together; and adding said ninth data stored in said ninth register to the result of multiplication to store the result of addition in said ninth register.

17. A data processor comprising:

an instruction decoder for decoding first and second operation codes to output first and second control signals, respectively;

a register file including a plurality of registers;

a memory for storing data;

an operand access unit for performing a first memory access to transfer first and second data in parallel from a first area of said memory to said register file in response to said first control signal, and performing a second memory access to transfer third and fourth data in parallel from a second area of said memory to said register file in response to said second control signal; and an operation unit receiving said first to fourth data from said register file, for performing a first arithmetic operation on said first and third data and a second arithmetic operation on said second and fourth data.

18. The data processor of claim 17, wherein said first arithmetic operation is a multiplying operation on said first and third data and said second arithmetic operation is multiplying operation on said second and fourth data, and said operation unit generates a value which is a result of adding a result of said first arithmetic operation, a result of said second arithmetic operation and fifth data in said register file or an accumulator provided with said operation unit.

19. The data processor of claim 17, wherein said instruction decoder decodes third and fourth operation codes to output third and fourth control signals, respectively;

said operation unit performs said first arithmetic operation in response to said third control signal and performs said second arithmetic operation in response to said fourth control signal.

20. The data processor of claim 17, wherein said first to fourth data have the same data lengths.

21. The data processor of claim 17, a first operand address is stored in a register of said register file, said operand access unit causes said first operand address to be applied to said memory and said register to be updated into a second operand address in response to said first control signal, and causes said second operand address stored in said register to be applied to said memory in response to said second control signal.

22. The data processor of claim 17, wherein:

a first operand address is stored in a first register of said register file, and a second operand address is stored in a second register of said register file, and said operand access unit causes said first operand address to be applied to said memory and said first register to be updated into a third operand address in response to said first control signal, and causes said second operand address to be applied to said memory and said second register to be updated into a fourth operand address in response to said second control signal.

23. A data processor comprising:

a first decoder for decoding operation codes including first and second operation codes;

an operand access unit for outputting a first address to receive in parallel first and second data values included in a first area of a memory in accordance with decoding the first operation code by said first decoder, and for outputting a second address to receive in parallel third and fourth data values included in a second area of the memory in accordance with decoding the second operation code by said first decoder; and an operation unit coupled to said operand access unit and receiving said first to fourth data values, for calculating a first product of said first and third data values, and a second product of said second and fourth data values.

24. The data processor of claim 23, further comprising:

a first register for storing the first address and outputting the first address to said operand access unit;

a second register for storing the second address and outputting the second address to said operand access unit; and an address calculator, for calculating a third address on the basis of the first address in a first period in accordance with decoding the first operation code by said first decoder to write back the third address to said first register, and calculating a fourth address on the basis of the second address in a second period following the first period in accordance with decoding the second operation code by said first decoder to write back the fourth address to said second register.

25. The data processor of claim 24, wherein:

said address calculator calculates the third address by adding the first address with a predetermined value and calculates the fourth address by adding the second address with the same value as the predetermined value.

26. The data processor of claim 23, wherein:

said operation unit includes an accumulator, said operation unit calculating a sum of a value stored in said accumulator, the first product and the second product.

27. The data processor of claim 23, further comprising:

a second decoder operative in parallel with said first decoder, for decoding operation codes, wherein an operation unit calculates the first product in accordance with decoding [the] *a* third operation code by said second decoder, and the second product of said second and fourth data values in accordance with decoding [the] *a* fourth operation code by said second decoder.

28. A method of processing data by a data processor connected to a memory and executing instructions described in a program, said method comprising the steps of:

transferring in parallel first and second data values included in a first area of the memory to said data processor;

transferring in parallel third and fourth data value included in a second area of the memory to said data processor;

calculating a product of the first and third data values in the data processor; and calculating a product of the second and fourth data values in the data processor.

*29. A data processor comprising:*

*a first decoder configured to receive a decode a first operation code specifying a data load operation;*

*a second decoder configured to receive and decode a second operation code specifying a multiply-add operation;*

*a first operation unit configured to provide a memory with an operand address of said first operation code, at least one said operand address configured to cause plural operand data to be loaded in parallel from the memory in response to a first control signal being a decoded result of said first operation code output from said first decoder;*

*a plurality of registers configured to receive and store data values included in operand data loaded from the memory; and*

*a second operation unit configured to receive data values from said registers, and to perform the multiply-add operation in response to a second control signal being a decoded result of said second operation code output from said second decoder;*

*wherein said multiply-add operation includes a multiplying operation of one by another of the data values received by the second operation unit, and an adding operation utilizing a result of said multiplying operation.*

*30. A data processor comprising:*

*a first decoder configured to receive and decode a first operation code specifying a data load operation;*

*a second decoder configured to receive and decode a second operation code specifying a multiply-add operation;*

*a plurality of registers including a register configured to store an operand address of said first operation code*

*and to output the operand address to a memory to cause, for at least one said operand address, plural operand data to be loaded in parallel from the memory, said plurality of registers including different two registers configured to receive and store first and second data values, respectively, included in the plural operand data loaded in parallel from the memory;*

*an arithmetic unit configured to generate a new operand address using the operand address and to update contents of the register storing the operand address into the new operand address in response to a first control signal being a decoded result of the first operation code output from said first decoder; and*

*an operation unit configured to receive third and fourth data values stored in different two of said plurality of registers, respectively, and to perform the multiply-add operation in response to a second control signal being a decoded result of said second operation code output from said second decoder;*

*wherein said multiply-add operation includes a multiplying operation of the third data value by the fourth data value and an adding operation utilizing a result of said multiplying operation.*

*31. A data processor comprising:*

*a first decoder configured to receive and decode a first operation code specifying a data load operation;*

*a second decoder configured to receive and decode a second operation code specifying a multiply-add operation;*

*a first operation unit configured to provide a memory with an operand address of said first operation code to cause, for at least one said operand address, plural operand data to be loaded in parallel from the memory in response to a first control signal being a decoded result of said first operation code output from said first decoder;*

*a register file configured to store first and second data values which are included in the plural operand data loaded in parallel from the memory; and*

*a second operation unit configured to receive third and fourth data values stored in said register file and to perform the multiply-add operation in response to a second control signal being a decoded result of said second operation code output from said second decoder;*

*wherein said multiply-add operation includes a multiplying operation of the third data value by the fourth data value and an adding operation utilizing a result of said multiplying operation; and*

*wherein said second operation code has an operand specifying field capable of specifying one of the first and second data values as the third data value, and a data value different from said first and second data values as the fourth data value.*

*32. A data processor comprising:*

*a first decoder configured to receive and decode a first operation code specifying a data load operation;*

*a second decoder configured to receive and decode a second operation code specifying a multiply-add operation;*

*a register file configured to store an operand address of said first operation code and to output the operand address to a memory to cause, for at least one said operand address, plural operand data to be loaded in parallel from the memory, said register file further configured to store first and second data values which are included in the operand data loaded in parallel from the memory;*

*an arithmetic unit configured to generate a new operand address using the operand address and to update the operand address stored in said register file into the new operand address in response to a first control signal being a decoded result of the first operation code output from said first decoder; and*

*an operation unit configured to receive third and fourth data values stored in said register file and to perform the multiply-add operation in response to a second control signal being a decoded result of said second operation code output from said second decoder;*

*wherein said multiply-add operation includes a multiplying operation of the third data value by the fourth data value and an adding operation utilizing a result of said multiplying operation; and*

*wherein said second operation code has an operand specifying field capable of specifying one of the first and second data values as the third data value, and a data value different from said first and second data values as the fourth data value.*

*33. The data processor according to claim 29, wherein:*

*said first decoder sequentially decodes operation codes including said first operation code and specifying operations to be executed; and*

*said second decoder, operative in parallel with said first decoder, sequentially decodes operation codes including said second operation code and specifying operations to be executed.*

*34. The data processor according to claim 29, wherein:*

*said plurality of registers have a same bit length; and*

*said second operation code is capable of specifying each of said plurality of registers as an operand of said second operation code.*

*35. The data processor according to claim 29, wherein:*

*said data load operation is a plural-operand data load operation; and*

*each operand address of said first operation code is configured to cause plural operand data to be loaded in parallel from the memory.*

*36. The data processor according to claim 29, wherein:*

*data values included in the plural operand data loaded from the memory are stored in different respective registers in the plurality of registers.*

*37. The data processor according to claim 30, wherein:*

*said data load operation is a plural-operand data load operation; and*

*each operand address of said first operation code is configured to cause plural operand data to be loaded in parallel from the memory.*

*38. The data processor according to claim 31, wherein:*

*said first decoder sequentially decodes operation codes including said first operation code and specifying operations to be executed; and*

*said second decoder, operative in parallel with said first decoder, sequentially decodes operation codes including said second operation code and specifying operations to be executed.*

*39. The data processor according to claim 31, wherein:*

*said data load operation is a plural-operand data load operation; and*

*each operand address of said first operation code is configured to cause plural operand data to be loaded in parallel from the memory.*

*40. The data processor according to claim 31, wherein:*

*data values included in the plural operand data loaded from the memory are stored in different respective registers in the register file.*

*41. The data processor according to claim 32, wherein:*

*said data load operation is a plural-operand data load operation; and*

*each operand address of said first operation code is configured to cause plural operand data to be loaded in parallel from the memory.*

*42. The data processor according to claim 32, wherein:*

*data values included in the plural operand data loaded from the memory are stored in different respective registers in the register file.*

*43. A data processor for loading values A1 to Am and values D1 to Dm, and for performing a calculation:*

$$\sum_{i=1}^{m} Ai \cdot Di$$

*in accordance with a program having a plurality of operation codes, wherein i and m are positive integers, said data processor comprising:*

*a first decoder configured to decode a first operation code in the program;*

*a second decoder configured to decode a second operation code in the program in parallel with the decoding of the first operation code by said first decoder;*

*a first operation unit configured to output an operand address to a memory in response to a decoded result of the first operation code, the first operation unit configured to load values Ah and Aj in parallel from the memory for at least one said operand address, wherein h and j are different integers among 1 to m; and*

*a second operation unit configured to perform a multiply-add operation in response to a decoded result of the second operation code output from said second decoder, the multiply-add operation including a multiply operation of a value Ak by a value Dk, wherein k is an integer among 1 to m other than h and j, and an adding operation of a result of the multiply operation to a value held in a register or in an accumulator.*

*44. The data processor according to claim 43, wherein:*

*said first operation code specifies a plural-operand data load operation; and*

*each operand address of said first operation code is configured to cause plural operand data to be loaded in parallel from the memory.*

*45. A data processor for loading values A1 to Am and values D1 to Dm, and for performing a calculation:*

$$\sum_{i=1}^{m} Ai \cdot Di$$

*in accordance with a program having a plurality of operation codes, wherein i and m are positive integers, said data processor comprising:*

*a first arithmetic operation circuit configured to multiply a value Aj by a value Dj and to multiply a value Ak by a value Dk, wherein j and k are integers;*

*a second arithmetic operation circuit configured to add a value Pk=Ak·Dk to a value held in a register or in an accumulator; and*

*an operand access unit configured to output an operand address to a memory, and to load a value Ah and a value An in parallel in accordance with at least one said operand address, wherein h and n are integers; and*

*a control unit configured to control said first and second arithmetic operation circuits and said operand access unit in accordance with the program so that the multiplication of Aj·Dj, the addition of the value Pk to the value held in the register or in the accumulator, and the loading of the values Ah and An, are performed in parallel.*

*46. The data processor according to claim 45, wherein:*

*each operand address is configured to cause plural operand data to be loaded in parallel from a memory.*

*47. A data processor for executing a program, the data processor comprising:*

*storage devices configured to store data values;*

*a first arithmetic operation unit configured to perform a multiplying operation utilizing data values stored in said storage devices;*

*a second arithmetic operation unit configured to perform an adding operation utilizing data values stored in said storage devices;*

*an operand access unit configured to output an operand address to a memory and to load plural operand data in parallel for at least one said operand address; and*

*a control unit configured to control said first and second arithmetic operation units and said operand access unit, depending on said program, so that a result of the multiplying operation, a result of the adding operation unit, and the loaded plural operand data, are stored in parallel in said storage devices.*

*48. The data processor according to claim 47, wherein:*

*data values included in the plural operand data loaded by the operand access unit are stored in different respective registers in said storage devices.*

* * * * *